US012459198B2

(12) United States Patent
Karklinsh

(10) Patent No.: US 12,459,198 B2
(45) Date of Patent: Nov. 4, 2025

(54) SYSTEMS FOR THREE-DIMENSIONAL PRINTING

(71) Applicant: Robert Karklinsh, Los Angeles, CA (US)

(72) Inventor: Robert Karklinsh, Los Angeles, CA (US)

( * ) Notice: Subject to any disclaimer, the term of this patent is extended or adjusted under 35 U.S.C. 154(b) by 168 days.

(21) Appl. No.: 18/137,059

(22) Filed: Apr. 20, 2023

(65) Prior Publication Data

US 2024/0351277 A1   Oct. 24, 2024

(51) Int. Cl.
  *B29C 64/209*   (2017.01)
  *B33Y 30/00*   (2015.01)
  *B29C 64/118*   (2017.01)

(52) U.S. Cl.
  CPC .......... *B29C 64/209* (2017.08); *B33Y 30/00* (2014.12); *B29C 64/118* (2017.08)

(58) Field of Classification Search
  CPC ...... B29C 64/209; B29C 64/118; B33Y 30/00
  See application file for complete search history.

(56) References Cited

U.S. PATENT DOCUMENTS

| 2004/0076073 | A1 | 4/2004 | Yao et al. |
| 2004/0089971 | A1 | 5/2004 | Hartman |
| 2016/0303802 | A1* | 10/2016 | Meshorer ................ B29C 48/02 |
| 2019/0217541 | A1* | 7/2019 | Duro Royo ............ G05B 15/02 |
| 2022/0118698 | A1 | 4/2022 | Triastek |
| 2023/0226761 | A1* | 7/2023 | Casas Alvarez ....... B33Y 40/00 425/375 |

FOREIGN PATENT DOCUMENTS

ES   2884002 B2 *   4/2022   ............... B29C 8/05

OTHER PUBLICATIONS

Translation of ES2884002B2 (Year: 2022).*

* cited by examiner

*Primary Examiner* — JaMel M Nelson
*Assistant Examiner* — Erica Hartsell Funk
(74) *Attorney, Agent, or Firm* — Boris Leschinsky

(57) ABSTRACT

A printhead for three-dimensional printing features a mixing cavity and a mixing rotor with a mixing portion disposed within the mixing cavity. The mixing rotor is operated by a motor to mix at least one polymeric stream received in the mixing cavity. The system further includes a control valve having a seat and a valve stem. The valve stem is mounted such that at least a portion thereof traverses through a void made along the mixing rotor. A pressure-generating mechanism advances the polymeric stream in a downstream direction into the mixing cavity and further through the flow passage of the control valve toward the outlet of the printhead. Linear movement or rotation of the valve stem is used to control the form of the flow passage and, therefore, the flow of the polymeric stream through the printhead.

21 Claims, 27 Drawing Sheets

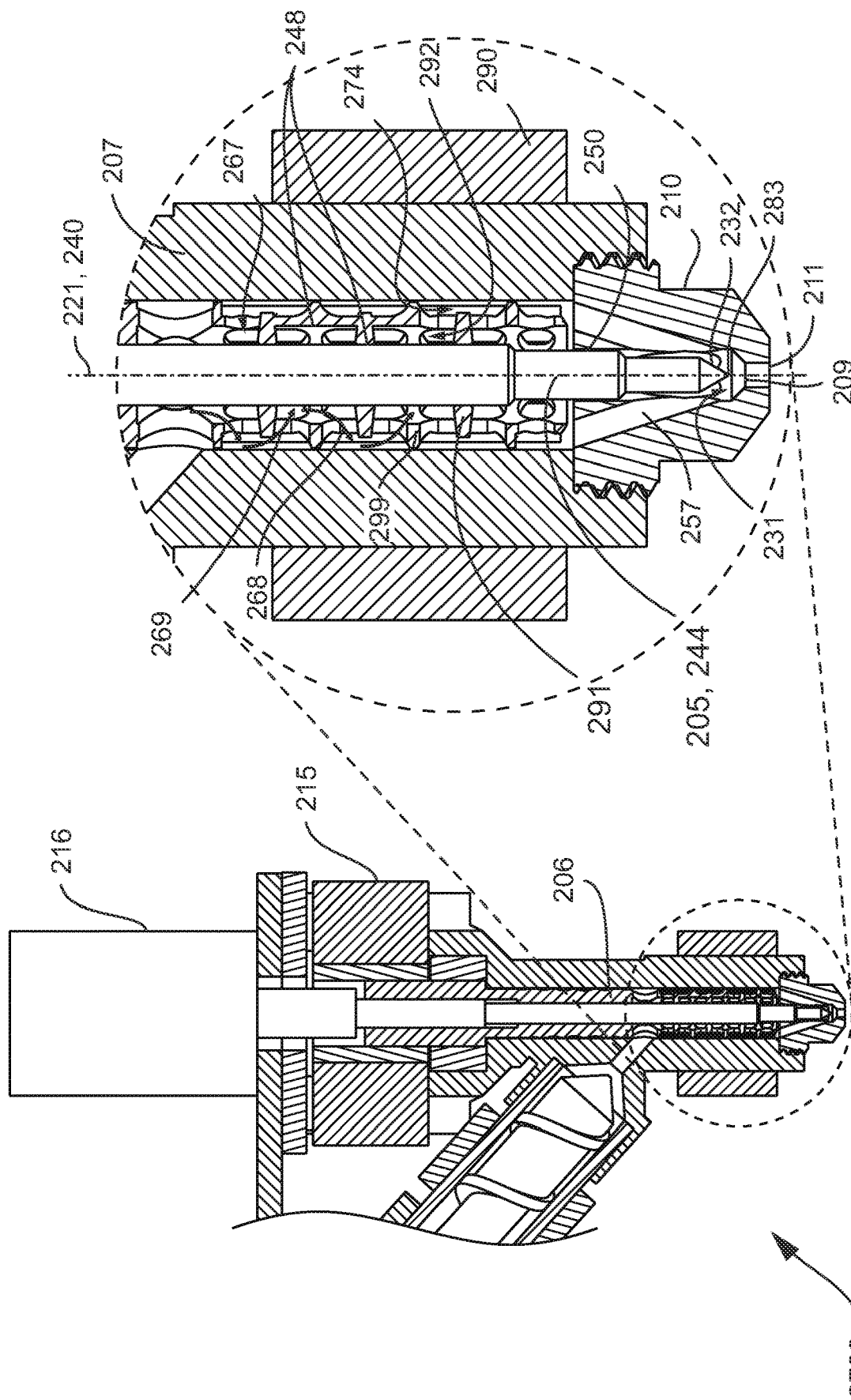

SYSTEMS FOR THREE-DIMENSIONAL PRINTING

FIELD OF THE INVENTION

The present disclosure generally relates to additive manufacturing, and, more specifically, to extrusion-based three-dimensional printing (3D printing).

BACKGROUND OF THE INVENTION

A typical extrusion-based 3D printing system uses raw materials in the form of a filament or granules that are processed with a printhead (also referred to as an extruder). Printheads known in the art can typically only implement extrusion processes with inherently weak mixing and plasticization characteristics. Moreover, printheads known in the art typically do not incorporate a control valve for active flow control. Incorporation of extensive mixing and plasticization characteristics as well as active flow control with a control valve into extrusion-based 3D printing is highly desirable for many applications, such as 3D printing of footwear from thermoplastic foams. Thus, there remains a need for improved systems for extrusion-based 3D printing.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended aspects, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings.

FIG. 27A shows a lateral partial sectional view of an exemplary embodiment of an extruder comprising a mixing rotor and a control valve.

DETAILED DESCRIPTION

The present invention provides systems for extrusion-based 3D printing, and in particular for kinds of extrusion-based 3D printing that are well known under abbreviations FDM, FFF, and FGF. As used herein, the term "feedstock material" refers to a raw material in the form selected from a group consisting of: a filament, granules; or to a composition of raw materials, the composition being in the form selected from a group consisting of: a filament, granules. In this document, a feedstock material that is a composition of raw materials is considered to be a raw material itself. In this document, the term "filament" refers to a raw material or a composition of raw materials in a continuous feed shape such as a rod, a wire, a strand, or a filament (as it is being used in the art). A filament may be flexible or rigid. A filament may have a transverse cross-section of various geometries, such as cylindrical, ellipsoidal, square, or any of a variety of shapes. Without limitation, filaments with equivalent circular diameters in a range from 0.5 mm to 10 mm (preferably in a range from 1.5 mm to mm, such as at least 1.5 mm, at least 2 mm, at least 2.5 mm, at least 3 mm, at least 3.5 mm, or up to 4 mm) can be used in the methods of the present invention.

In this document, the term "granules" refers to particles with equivalent spherical diameters of at least 0.2 mm (to differentiate them from powders). Granules may have various geometries, such as cubic, trapezoidal, cylindrical, ellipsoidal, spherical, or any of a variety of shapes. Without limitation, granules with the equivalent spherical diameters in a range from about 0.2 mm to about 10 mm (preferably in a range from about 0.8 mm to about 6 mm, such as at least 0.8 mm, at least 1 mm, at least 2 mm, at least 3 mm, at least 4 mm, at least 5 mm, or up to 6 mm) can be used in the methods of the present invention. In this document, saying that a raw material is provided in the form of a feedstock material means that at least a portion or the whole volume of the raw material is provided as a component of the feedstock material (including a case when the feedstock material is the raw material). In this document, describing one or more raw materials as being provided in the form of at least one feedstock material means that at least a portion or the whole volume of each said raw material is provided as a component of at least one said feedstock material (including a case when the feedstock material is the raw material). In embodiments, a raw material may be provided in other forms, such as in the form of liquid, in the form of powder, in the form of slurry, or the like, as the invention is not limited in this regard.

In this document, unless otherwise stated, the volumetric flow rate refers to the volume of material extruded per unit of time, and the mass flow rate refers to the mass of material extruded per unit of time.

Figure 1:
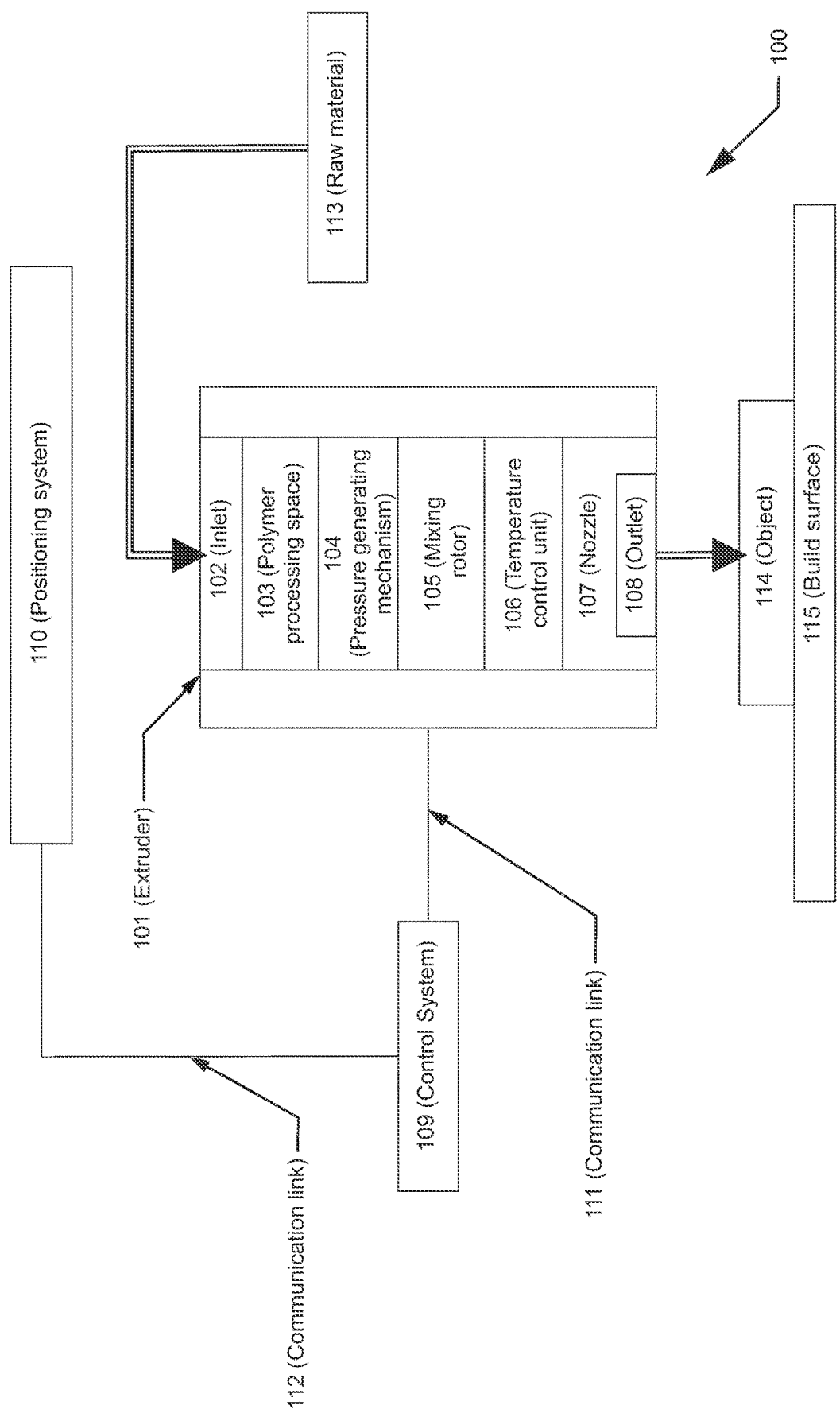
FIG. 1 shows a block diagram of an exemplary 3D printing system according to the present invention.
Figure 2:
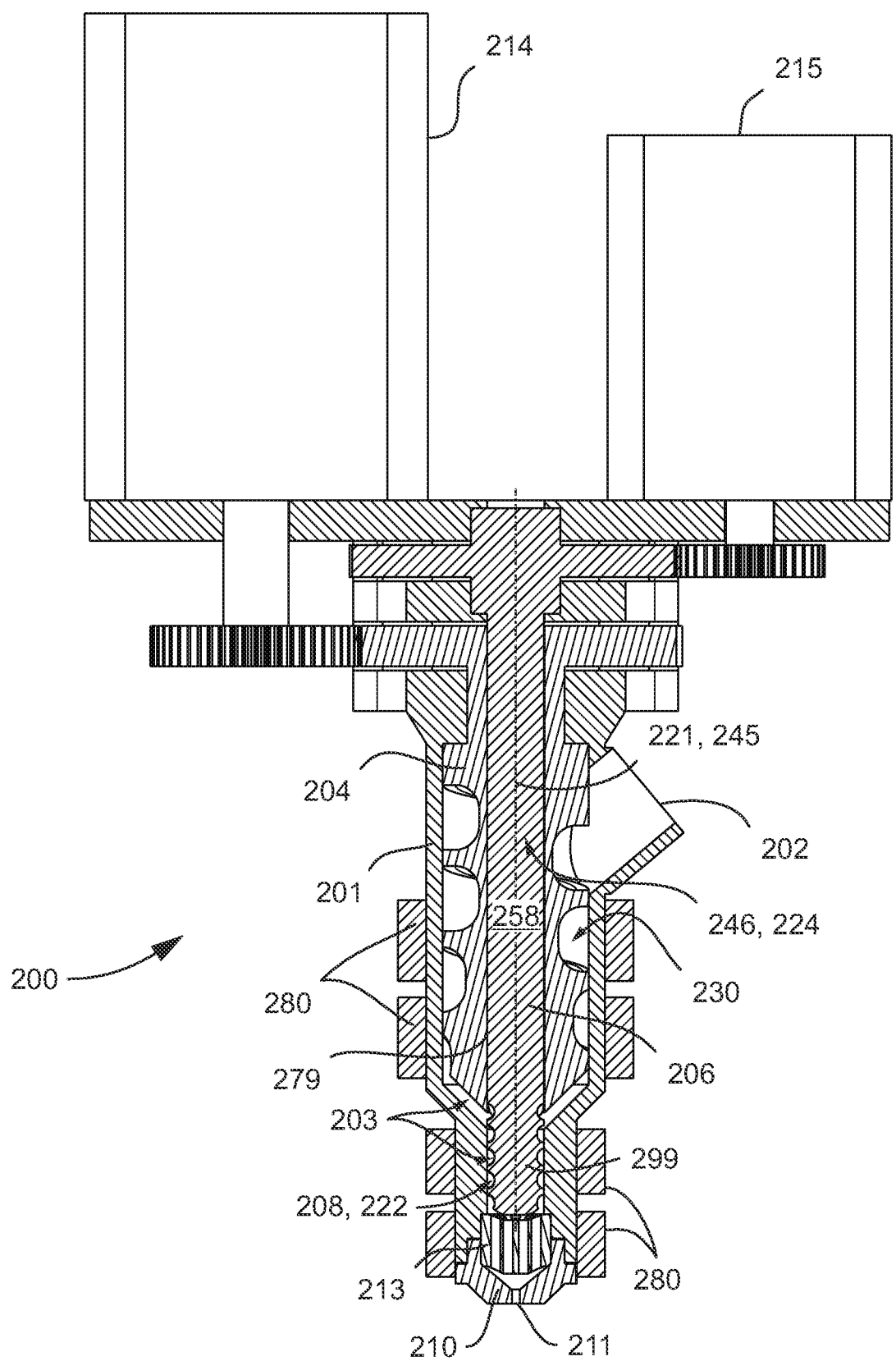
FIG. 2 shows a lateral partial sectional view of an exemplary embodiment of an extruder comprising a mixing rotor.

FIG. 1 is a block diagram of a 3D printing system 100 according to one set of embodiments. The 3D printing system 100 includes an extruder (in this document also referred to as "printhead") 101. The extruder 101 includes an inlet 102 adapted to receive one or more raw materials 113. Raw material 113 may be provided in the form of a feedstock material (that is in the form selected from a group consisting of one or more filaments and/or granules). Alternatively, or in addition, raw material 113 may be provided in the form of a liquid, in the form of a powder, in the form of a slurry or the like. The extruder 101 may comprise a plurality of inlets 102. For example, a first inlet 102 may be adapted to receive raw material 113 provided in the form of granules which may be blown into the first inlet 102 from a storage container by applying air pressure inside a flexible tube connecting the storage container and the extruder 101; while a second inlet 102 may be adapted to receive raw material 113 provided in the form of a filament which is pushed into the second inlet 102 through a flexible tube connecting a filament source with the extruder 101 by a filament feeder (In this document also referred to as filament drive mechanism). The extruder 101 further comprises at least one outlet 108 fluidly connected to at least one inlet 102 and configured to release a resultant stream of solidifying material, herein referred to as deposition material, from the extruder 101. The extruder may comprise a nozzle 107 defining the outlet 108. The nozzle 107 may be made as a portion of another part such as a barrel or mixing chamber; may be made as a separate part; or may be made as an assembly of a plurality of parts. For example, the nozzle 107 may include a nozzle insert defining the outlet 108. As another example, the nozzle 107 may include one or more moving parts at least partially defining the outlet 108 such that the size of the outlet 108 is varied by their positions and/or orientations.

In embodiments, the deposition material may be a thermoplastic resin. For example, the deposition material may be a thermosetting resin, such as a photocurable thermosetting resin. in other examples, the deposition material may be a polymeric foam, such as a polymeric foam having a thermoplastic resin and/or a thermosetting resin in the composition of the matrix material. In further embodiments, where the nozzle 107 has multiple exit orifices configured to release the deposition material from the extruder 101, it is understood that they together form a single outlet 108. The extruder 101 may have a plurality of nozzles. In embodiments, the extruder 101 may have two nozzles 107 having outlets 108 configured to release different deposition materials. The 3D printing system 100 may further include a build surface 115 on which an object 114 is to be formed as hereinafter set forth. In other embodiments, the build surface 115 may be a flat surface of a base member of the 3D printing system 100 (not shown). Alternatively, the build surface 115 may be a surface that does not belong to a member of the 3D printing system. In other embodiments, the build surface 115 may be formed by a portion of a surface on which the 3D printing system 100 rests. For example, the build surface 115 may be formed by a surface of an auxiliary object, such as a shoe last, placed inside the 3D printing system 100.

The 3D printing system 100 may further include a positioning system 110 configured to position the nozzle 107 relative to the build surface 115. A variety of positioning systems are known in the art and suitable for use as the positioning system 110. For example, the positioning system 110 may include a Cartesian coordinate positioning system or X-Y-Z positioning system employing a number of linear controls to move independently in the X-axis, the Y-axis, and the Z-axis. Alternatively, or in addition, Delta positioning systems may be usefully employed. Alternatively yet, or in addition, robotic manipulators may be usefully employed. More generally, any positioning system 110 suitable for controlled positioning of the nozzle 107 relative to the build surface 115 may be usefully employed. For example, the nozzle 107 may be operably coupled to the positioning system 110 such that the positioning system 110 positions the nozzle 107. The build surface 115 may also, or instead, be operably coupled to the positioning system 110 such that the positioning system positions the build surface 115. Some other combinations of these techniques may be employed, such as by moving the nozzle 107 up and down for Z-axis control, and moving the build surface 115 within the X-Y plane to provide X-axis and Y-axis control. In some implementations, the positioning system may translate the build surface 115 along one or more axes, and/or may rotate the build surface 115. The positioning system 110 may include a number of electric motors to independently control the position of the nozzle 107 or the build surface 115 along each axis, e.g., an X-axis, a Y-axis, and a Z-axis. More generally, the positioning system 110 may include various combinations of stepper motors, encoded DC motors, gears, belts, pulleys, worm gears, threads, and the like. Any such arrangement suitable for controllably positioning the nozzle 107 or the build surface 115 may be adapted to use with the 3D printing system 100.

The 3D printing system 100 further includes a control system 109. The 3D printing system 100 may further include a communication link 111 that links the control system 109 with the extruder 101 to establish communication between the control system 109 and the extruder 101. The 3D printing system 100 may further include a communication link 112 that links the control system 109 with the positioning system 110 to establish communication between the control system 109 and the positioning system 110. The control system 109 may be configured to control the extrusion and the relative motion of the nozzle 107 relative to the build surface 115 to fabricate the object 114 on the build surface 115 by sequentially depositing a plurality of layers of the deposition material, wherein the deposition of a layer of the deposition material includes extruding the deposition material towards a deposition surface while moving the nozzle 107 relative to the build surface 115 to deposit the deposition material on the deposition surface. The control system 109 may execute instructions generated based on a three-dimensional model or any other digital representation of the object 114, the instructions defining the 3D printing process. The instructions may be generated externally and input to the control system 109. Alternatively, or in addition, the instructions may be generated by the control system 109 itself. For example, instructions may define the movement path of the nozzle 107 relative to the build surface 115, further referred as tool path. The tool path may be predefined. Alternatively, or in addition, a portion of the tool path may be generated and/or adjusted dynamically during the 3D printing process. The control system 109 may be a distributed system consisting of a plurality of subsystems. For example, the control system 109 may comprise a cloud-based subsystem, which may be configured to generate high-level instructions based on a three-dimensional model of the object 114. The control system 109 may further comprise a path planning subsystem connected to the cloud-based system over a wired or wireless interface, the path planning subsystem may interpret the high-level instructions received from the cloud-based system by generating low-level instructions corresponding to the tool path for motors of the positioning system 110 and transfer them to the positioning system 110 over the communication link 112. The control system 109 may be implemented using one or more controllers, mounted statically or for movement, interconnected over wired or wireless communication links.

During the three-dimensional printing process, if the deposition material is deposited on the build surface 115 (for example, the currently deposited layer is the first from the build surface 115), the term "deposition surface" refers to the build surface 115. Otherwise, the term "deposition surface" refers to a surface of a previously deposited deposition material. For example, during the deposition of a layer of a deposition material, a deposition surface may be formed by a surface of a previously deposited layer of the deposition material. As another example, a nozzle 107 of a first extruder 101 may deposit a first deposition material onto a deposition surface formed by a second deposition material earlier deposited by a nozzle 107 of a second extruder 101.

The extruder 101 further comprises an enclosed polymer processing space 103 fluidly connecting at least one inlet 102 with at least one outlet 108. The polymer processing space 103 is configured to allow a flow of one or more raw materials and/or their derivatives therein in a downstream direction from the inlet 102 toward the outlet 108. The polymer processing space 103 is bounded by a plurality of surfaces (note that these surfaces may dynamically change). These surfaces, in combination, are referred to as the boundary of the polymer processing space 103 (note that the boundary may change dynamically). Note that the polymer processing space 103 may have a dynamically changing form (also referred to as a configuration of the polymer processing space 103) depending on the positions and/or orientations of moving parts of the extruder at a given time. Also note that the polymer processing space 103 does not include volumes which are excluded from a flow of one or more raw materials and/or their derivatives during extrusion, such as a volume permanently occupied by a screw or a mixing rotor. The extruder 101 may have a plurality of polymer processing spaces 103. For example, the extruder 101 may have two polymer processing spaces 103 that are not fluidly connected to each other and configured to allow the advancement of streams of different raw materials 113. The extruder 101 may further comprise two nozzles 107, each having an outlet 108 that is fluidly connected to a separate inlet 102 with a separate polymer processing 103.

As used herein, the term "stream" in the context of one or more raw materials refers to an amount of said raw materials and/or their derivatives (including different forms or states of said raw materials) within the polymer processing space 103 that flows in the downstream direction from one or more inlets 102 towards one or more outlets 108. As used herein, the term "stream" in the context of one or more derivatives of raw materials refers to an amount of said derivatives and/or their derivatives within the polymer processing space 103 that flows in the downstream direction from one or more inlets 102 towards one or more outlets 108. When particular raw materials or derivatives of raw materials are not clear from the context, the term "stream" refers to a stream of at least one raw material and/or its derivatives selected from all raw materials processed by extruder 101. A stream may comprise other streams. For example, a stream may comprise a first stream of a first raw material and a second stream of a second raw material which are intermixed into a single fluid phase. Streams may change their state during the flow. For example, a stream of thermoplastic granules may change its state from solid to liquid under heating. Streams may also be combined and/or divided.

The extruder 101 further comprises at least one pressure-generating mechanism 104 configured to establish a stream of at least one raw material 113 within the polymer processing space 103 in a downstream direction from the inlet 102 towards the outlet 108. Establishing a stream of granules presupposes compressing the granules and conveying or pushing them in the downstream direction. Establishing a stream of a filament presupposes pushing it through the inlet 102 into the polymer processing space 103. The pressure-generating mechanism 104 may be a positive displacement pump, a dynamic pump, a drag flow pump, a Weissenberg effect pump, a pressurized vessel, or the like. The extruder 101 may comprise a plurality of pressure-generating mechanisms 104, possibly of different types, configured to establish streams of possibly different raw materials 113. The pressure-generating mechanism 104 may be connected to the control system 109 (for example, a motor of the pressure-generating mechanism may be connected to the control system 109) via the communication link 111 for providing control over the mass flow rate and/or the volumetric flow rate of streams established by the pressure-generating mechanism 104.

In embodiments where the raw material 113 is provided in the form of granules, the pressure-generating mechanism 104 may be selected from a group consisting of: a screw extrusion mechanism, a disk extrusion mechanism, a progressive cavity extrusion mechanism, a vane extrusion mechanism, a planetary extrusion mechanism, and a ram extrusion mechanism.

Screw extrusion mechanisms are well known from the art. The screw extrusion mechanism may be a single-screw extrusion mechanism and may include a screw and a motor (e.g., a stepper motor or an encoded DC motor) operably connected to the screw. The screw may be configured to rotate about a rotational axis within a barrel to establish a stream of granules within a portion of the polymer processing space 103 between the screw and the barrel. The single-screw extrusion mechanism may have a grooved barrel. In embodiments, the barrel may have one or more grooves formed in its inner surface that extend substantially helically or axially with respect to the rotational axis. Alternatively, or in addition, the barrel may have one or more slots extending substantially axially with respect to the rotational axis and, respectively, one or more limiting members disposed in the slots that limit the depth of the grooves. The limiting members may be actuated to adjust the depth of the grooves.

In another example, the screw extrusion mechanism may be a twin-screw extrusion mechanism and may include two intermeshing or non-intermeshing screws operably connected to one or more motors. The screws may be configured to rotate within a barrel, with each screw rotating about a rotational axis parallel or transverse to the rotational axis of the other screw and disposed with a lateral offset from it. This may be done to establish a stream of granules within a portion of the polymer processing space 103 between the screws and the barrel and between each screw and the barrel. As another example, the screw extrusion mechanism may be a tri-screw (triple screw) extrusion mechanism and may include three intermeshing or non-intermeshing screws defining at least two different pairs of adjacent screws. The screws may be operably connected to one or more motors. The screws may be configured to rotate within a barrel, with each screw rotating about a rotational axis parallel or transverse to the rotational axes of the other two screws. Each screw may be laterally offset from each of the other two screws, to establish a stream of granules within a portion of the polymer processing space 103 between each screw and the barrel and between the adjacent screws and the barrel.

As another example, the screw extrusion mechanism may be a planetary extrusion mechanism and may include a sun screw operably connected to a motor and may further include one or more planetary rotors. The sun screw may have a toothed section surrounded by a toothed inner surface of the barrel, while the planetary rotors may be disposed between the section and the inner surface. The planetary rotors may be configured to roll around the section as the sun screw rotates about a rotational axis. This may lead to a complex motion of rotation of the planetary rotors about their central axes that orbit around the rotational axis of the sun screw as it rotates. The sun screw and the planetary rotors may be configured to rotate within a barrel to establish a stream of granules within a portion of the polymer processing space between the sun screw and the barrel. It should be noted that the planetary extrusion mechanism may also be a single-screw extrusion mechanism or a twin-screw extrusion mechanism, or a tri-screw extrusion mechanism. In this case, respectively, the sun screw is the screw of a single-screw extrusion mechanism, one of the two screws of a twin-screw extrusion mechanism, or one of the three screws of a tri-screw extrusion mechanism.

Disk extrusion mechanisms are well known. For example, the disk extrusion mechanism may be a scroll extrusion mechanism (also referred to in the art as a flat screw extrusion mechanism) comprising a barrel and a disk (further referred to as a scroll). At least one of the barrel and the scroll is operably connected to a motor and configured to rotate about a rotational axis to establish a stream of granules between the scroll and the barrel. The scroll may have one or more grooves spirally turned around a rotational axis in its surface facing the barrel. Alternatively, or in addition, the scroll may have one or more grooves extending radially formed in its surface facing the barrel. The discharge port may be formed in the center of the scroll. Alternatively, or in addition, the discharge port may be formed in the barrel. The scroll extrusion mechanism may have a grooved barrel. For example, the barrel may have one or more grooves on its surface facing the scroll. in other examples, the grooves may be arranged annularly around the discharge port of the barrel located opposite to the center of the scroll and extend spirally or radially towards the periphery of the barrel. The stream of granules may be established in a direction from the periphery of the disk towards the discharge port along the grooves of the scroll or the barrel. The scroll may have an elongated central portion protruding along the rotational axis. The central portion may be cylindrically or conically shaped with respect to the rotational axis. The central portion may have a helical passageway formed around the rotation axis. The barrel may have an elongated cavity surrounding the central portion, the cavity extending from the surface facing the scroll along the rotational axis towards a discharge end of the barrel. The discharge port may be formed in the discharge end of the barrel. The helical passageway may be fluidly connected to the groove of the scroll or may be its extension; and configured to further advance the stream towards the discharge end of the barrel. The central portion and the barrel may be configured to operate as a single-screw extrusion mechanism providing additional pressure buildup and/or additional plasticization of the stream.

Progressive cavity extrusion mechanisms are relatively new in the art, but they share the same working principle with progressive cavity pumps, which are already well known in the art. For example, the progressive cavity extrusion mechanism may be a single-rotor progressive cavity extrusion mechanism and may comprise one substantially helical rotor operably connected to a motor. The helical rotor may be configured to rotate within a substantially helical inner cavity of a stator about a central axis of the rotor, while the rotation about the central axis due to structural constraints of the inner cavity causes the rotor and the central axis to rotate about a second axis. The shape of the rotor and the shape of the stator may lead to a plurality of cavities being formed between the rotor and the stator that are displaced axially as the rotor rotates to establish a stream of granules between the rotor and the stator. In embodiments, the rotor may comprise a segment formed by a circular shape having its center on a line that spirals about the central axis at a constant eccentric offset. In embodiments, this segment of the rotor may be surrounded by a segment of the inner cavity of the stator in the form of a two-start helical thread that extends in the same direction as that of the rotor thread. Each thread of the two-start configuration may have a pitch length double that of the rotor. The single-rotor progressive cavity extrusion mechanism may be a single eccentric rotor extrusion mechanism and may comprise the rotor having one or more cylindrical or straight segments eccentric with respect to the central axis. In embodiments, the rotor may have multiple alternatively disposed helical segments and a straight segment. The inner cavity of the stator may have multiple alternatively disposed helical segments and straight segments corresponding with that of the rotor.

The motion of the rotor causes the volume of a cavity between the straight segment of the rotor and the stator to periodically change-alternatively (i) along the axial direction and (ii) the radial direction. This, in turn, causes an exertion of pulsed volume deformation on granules in the cavity when cyclically compressed and released. This causes compression of the granules and pushes them in the downstream direction within the polymer processing space 103.

In yet another example, the progressive cavity extrusion mechanism may be a twin-rotor progressive cavity extrusion mechanism and may comprise two intermeshing substantially helical rotors operably connected to one or more motors. The rotors may be configured to rotate within an inner cavity of a stator in opposite directions about their respective central axes. The shape of the rotors and their rotation may lead to formation of a plurality of cavities between the rotors and the stator. These cavities are axially displaced as the rotors rotate to establish a stream of granules between the rotors and the stator. The twin-rotor progressive cavity extrusion mechanism may be a biaxial eccentric rotor extrusion mechanism and may comprise the two rotors having one or more cylindrical or straight segments eccentric with respect to their central axes. In embodiments, the rotors may have multiple alternatively disposed helical segments and straight segments, axially aligned between the rotors. The rotors may be engaged with their adjacent helical segments. The motion of the rotors causes the volume of a cavity between the adjacent straight segments of the rotors and the stator to periodically change, exerting pulsed volume deformation on granules in the cavity when cyclically compressed and released. This motion compresses the granules and pushes them in the downstream direction within the polymer processing space 103.

As a further example, the progressive cavity extrusion mechanism may be a tri-rotor progressive cavity extrusion mechanism and may comprise three substantially helical rotors defining at least two different pairs of adjacent rotors. The rotors may be operably connected to one or more motors. The rotors are configured to rotate within a stator's inner cavity such that the adjacent rotors are intermeshing and rotating in opposite directions about their central axes. The shape of the rotors and their rotation may lead to forming a plurality of cavities between the adjacent rotors and the stator. These cavities are axially displaced as the rotors rotate to establish a stream of granules between the rotors of these pairs and the stator. The tri-rotor progressive cavity extrusion mechanism may be a tri-axial eccentric rotor extrusion mechanism and may comprise the three rotors having one or more cylindrical or straight segments eccentric with respect to their central axes. In embodiments, the rotors may have multiple alternatively disposed helical segments and straight segments, axially aligned between the rotors. The adjacent rotors may be engaged with their adjacent helical segments. The resultant motion of the rotors causes the volume of a cavity between the adjacent straight segments of the rotors and the stator to periodically change, exerting pulsed volume deformation on granules in the cavity when cyclically compressed and released, thus compressing the granules and pushing them in the downstream direction within the polymer processing space 103.

Vane extrusion mechanisms are relatively new in the art but they share the same working principle with vane pumps which are well known in the art. The vane extrusion mechanism may comprise a stator and a rotor eccentrically and rotatably mounted within an inner cavity of the stator, wherein a plurality of slots is formed along the circumference of the rotor. A plurality of vanes may be arranged in the slots. The inner cavity of the stator may be divided with baffles into one or more chambers that are fluidly connected in series. A plurality of spaces between the stator and the rotor is formed. When the rotor rotates about a rotational axis, a pair of the vanes on the diameter of the rotor make reciprocating radial movements within the rectangular slot due to the outer top surface of the vane being restricted by the inner surface of the stator; consequently, the volume of the enclosed spaces increases and decrease periodically; whereas when the volume decreases, the granules are compacted and discharged from the stator or into the next chamber of the stator, thus establishing a stream of granules between the rotor and the stator.

Ram extrusion mechanisms are well known and may comprise a ram or a plunger slidably mounted within a barrel and configured to be moved by a motor, pneumatics, or hydraulics actuator against granules to compress the granules and push them in the downstream direction within the polymer processing space 103 to establish a stream of granules.

In embodiments where the raw material 113 is provided in the form of a filament, the pressure-generating mechanism 104 may be a filament drive mechanism. The filament drive mechanisms are well known. For example, the filament drive mechanism may comprise one or more drive wheels operably connected to a motor, the drive wheel configured to rotate about an axis and frictionally engage the filament to thereby push the filament through the inlet 102. The drive wheel may have teeth or grooves arranged circumferentially around the axis and configured to engage the filament. Alternatively, or in addition, the filament drive mechanism may comprise one or more threaded rods operably connected to a motor and configured to rotate about an axis and frictionally engage the filament to thereby push the filament through the inlet 102. In some embodiments, the threaded rods may be arranged annularly around the filament and configured to rotate about their thread axes and frictionally engage the filament to thereby push the filament through the inlet 102. The threaded rods may further have their thread axes positioned at an angle relative to the central axis of the filament passageway. The threaded rods may have their upper and lower ends supported in an annular mounting that is rotated about the central axis of the filament by the motor. The threaded rods may be rotated about the central axis of the filament as the result of the rotation of the mounting and may be further rotated about their thread axes as the result of the rotational about the central axis and engagement with the filament. Alternatively, or in addition, the filament drive mechanism may comprise one or more closed belts moving along a path having a portion extending along the central axis of the filament, the belts frictionally engaging the filament when they travel along said portion of the path to thereby push the filament through the inlet 102.

The pressure-generating mechanism 104 may be moved with the nozzle 107 relative to the build surface 115, or it may be fixed relative to the build surface 115. An example of the fixed pressure-generating mechanism 140 may be a Bowden-type filament drive mechanism which pushes a filament through a flexible tube connecting the pressure-generating mechanism 104 to a member of the extruder 101 comprising the nozzle 107 that is moved relative to the build surface 115.

The extruder 101 further comprises one or more temperature control units 106 thermally coupled to the polymer processing space 103 and configured to heat and/or cool streams within the polymer processing space 103. These may include electrical heaters coupled with temperature sensors. Temperature control units 106 may also include passageways for temperature control fluid and the like. The temperature control units 106 may be configured to maintain a set temperature profile along the polymer processing space. The control system 109 may be connected to the temperature control units 106, thereby providing control over the set temperatures and/or over actual temperatures. For example, the control system 109 may control the actual temperatures by adjusting the power of the temperature control units 106 to thereby remove differences between the set temperatures and the actual temperatures.

The extruder 101 may further comprise a mixing rotor 105 having one or more surfaces forming a portion of the boundary of the polymer processing space 103. The mixing rotor 105 is configured to rotate about a rotational axis (the rotational axis may move in space, for example, if the mixing rotor 105 performs a complex motion) to mix at least one stream within a passageway of the polymer processing space 103. The passageway may be entirely or partially bounded by said surfaces. The mixing rotor 105 may be operably connected to a motor (e.g., a stepper motor or a DC motor) providing the rotational power to the mixing rotor 105. The passageway is further referred to as mixing passageway (boundaries of the mixing passageway may change dynamically with the rotation of the mixing rotor 105). The mixing passageway may consist of a single passageway or a plurality of passageways. If all streams of granules (possibly melted by the time they enter the mixing passageway) received by the mixing passageway are established by at least one ram extrusion mechanism, or if all streams of feedstock materials received by the mixing passageway are streams of filaments, any mixing rotor 105 rotating about the rotational axis is said to operate independently. Otherwise, the mixing rotor 105 is said to operate independently if and only if all streams of granules (possibly melted by the time they enter the mixing passageway) received by its mixing passageway are established by one or more pressure-generating mechanisms 104 and the mixing rotor 105 rotates about the rotational axis at a higher rotational speed than the rotational speeds of all members of said pressure-generating mechanisms 104 selected from a group consisting of: the screw of a single-screw extrusion mechanism, the two screws of a twin-screw extrusion mechanism, the three screws of a tri-screw extrusion mechanism, the scroll (in case the scroll rotates) and the barrel (in case the barrel rotates) of a scroll extrusion mechanism, the sun screw and the planetary rotors (with respect to their rotation about their central axes) of a planetary extrusion mechanism, the rotor of a vane extrusion mechanism, the rotor (with respect to its rotation about its central axis) of a single-rotor progressive cavity extrusion mechanism, the two rotors (with respect to their rotation about their central axes) of a twin-rotor progressive cavity extrusion mechanism, the three rotors (with respect to their rotation about their central axes) of a tri-rotor progressive cavity extrusion mechanism; wherein at least one of said pressure-generating mechanisms 104 is selected from a group consisting of: a single-screw extrusion mechanism, a twin-screw extrusion-mechanism, a tri-screw extrusion mechanism, a scroll extrusion mechanism, a planetary extrusion mechanism, a vane extrusion mechanism, a single-rotor progressive cavity extrusion mechanism, a twin-rotor progressive cavity extrusion mechanism, a tri-rotor progressive cavity extrusion mechanism. In this document, the mixing rotor 105 which is capable of operating independently is said to be independent. The extruder 101 may comprise one or more mixing rotors 105. The control system 109 may be connected to the motor via the communication link 111, thereby providing control over the rotational speed of the mixing rotor 105.

The 3D printing system 100 may include a plurality of extruders 101, which may be configured to operate with different raw materials 113. For example, the 3D printing system may include a first extruder 101 equipped with an independent mixing rotor 105 and configured to receive and process a raw material 113 in the form of granules containing a foaming agent to deposit a first polymeric foam. The 3D printing system may further include a second extruder 101 equipped with an independent mixing rotor 105 and configured to receive and process a raw material 113 in the form of a filament containing a foaming agent to deposit a second polymeric foam. The 3D printing system may further include one or more filament or granular extruders 101 not equipped with independent mixing rotors 105 and configured to receive and process raw materials 113 without a foaming agent, the filament or granular extruders further configured to deposit parts of the object 114 from a non-foamed deposition material or deposit a non-foamed deposition material next to the object 114 to support overhanging parts of the object 114 comprising the first and the second polymeric foams.

In one aspect, FIGS. 2-5 and 35 show different embodiments of an extruder of the present invention comprising a mixing rotor 206 (consistent with the description of extruder 101 in connection with FIG. 1) having an inner portion disposed in a through hole 246 formed in a screw 204 of a screw extrusion mechanism, further having a mixing portion disposed within a mixing cavity 208, and rotated through said through hole 246. The extruder may be used in 3D printing systems including the 3D printing system 100 described in connection with FIG. 1.

In another aspect, FIGS. 5-27B and 29 show different embodiments of an extruder of the present invention comprising a mixing rotor 206 (consistent with the description of extruder 101 in connection with FIG. 1) having a mixing portion 299 disposed within a mixing cavity 208; and a control valve, the control valve comprising a valve stem 205 at least partially disposed in a void 260 formed within the mixing rotor 206. The extruder may be used in 3D printing systems, including the 3D printing system 100 described in connection with FIG. 1.

Figure 34:
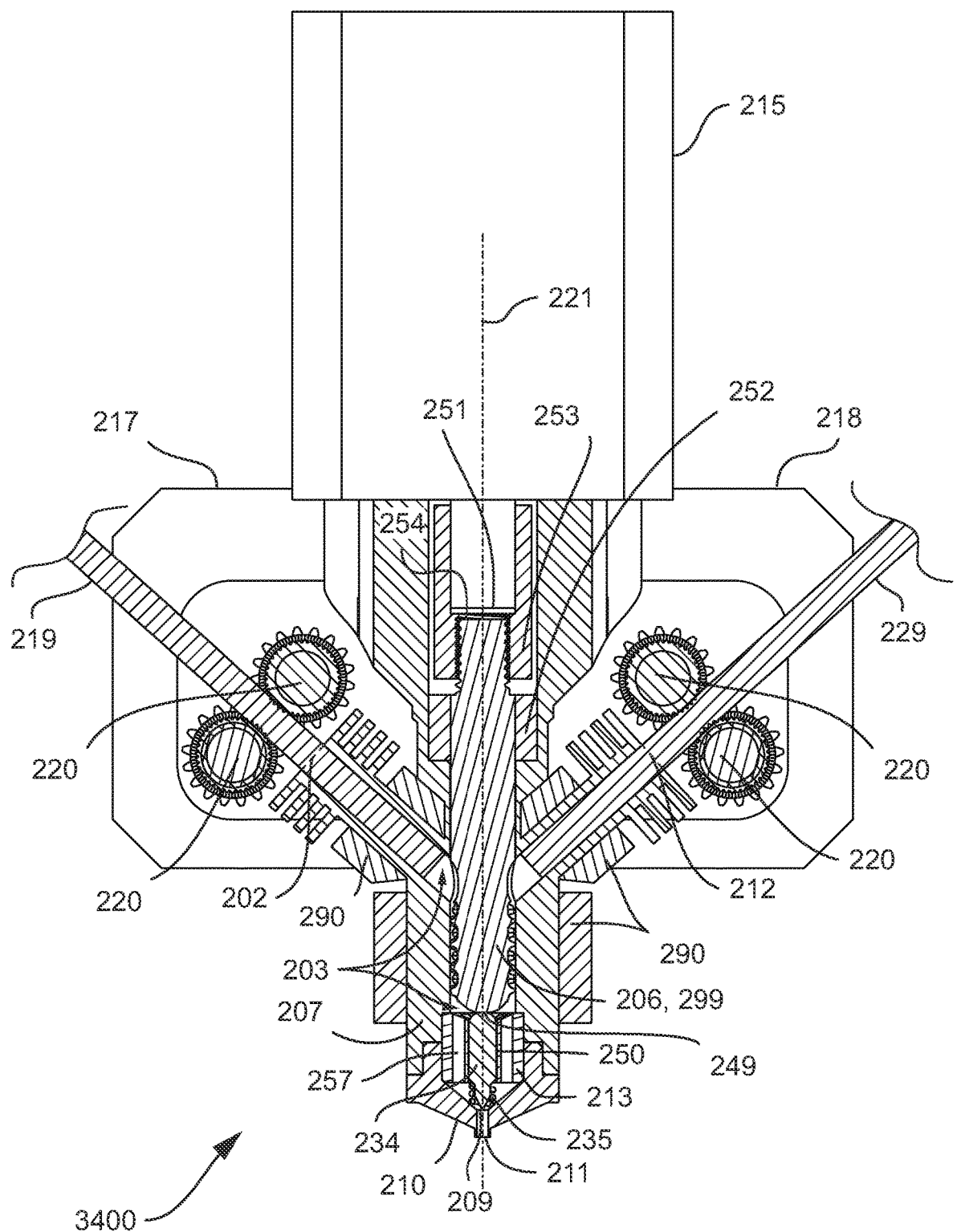
FIG. 34 shows a lateral partial sectional view of an exemplary embodiment of an extruder comprising a mixing rotor used as a movable member of a control valve.
Figure 35:
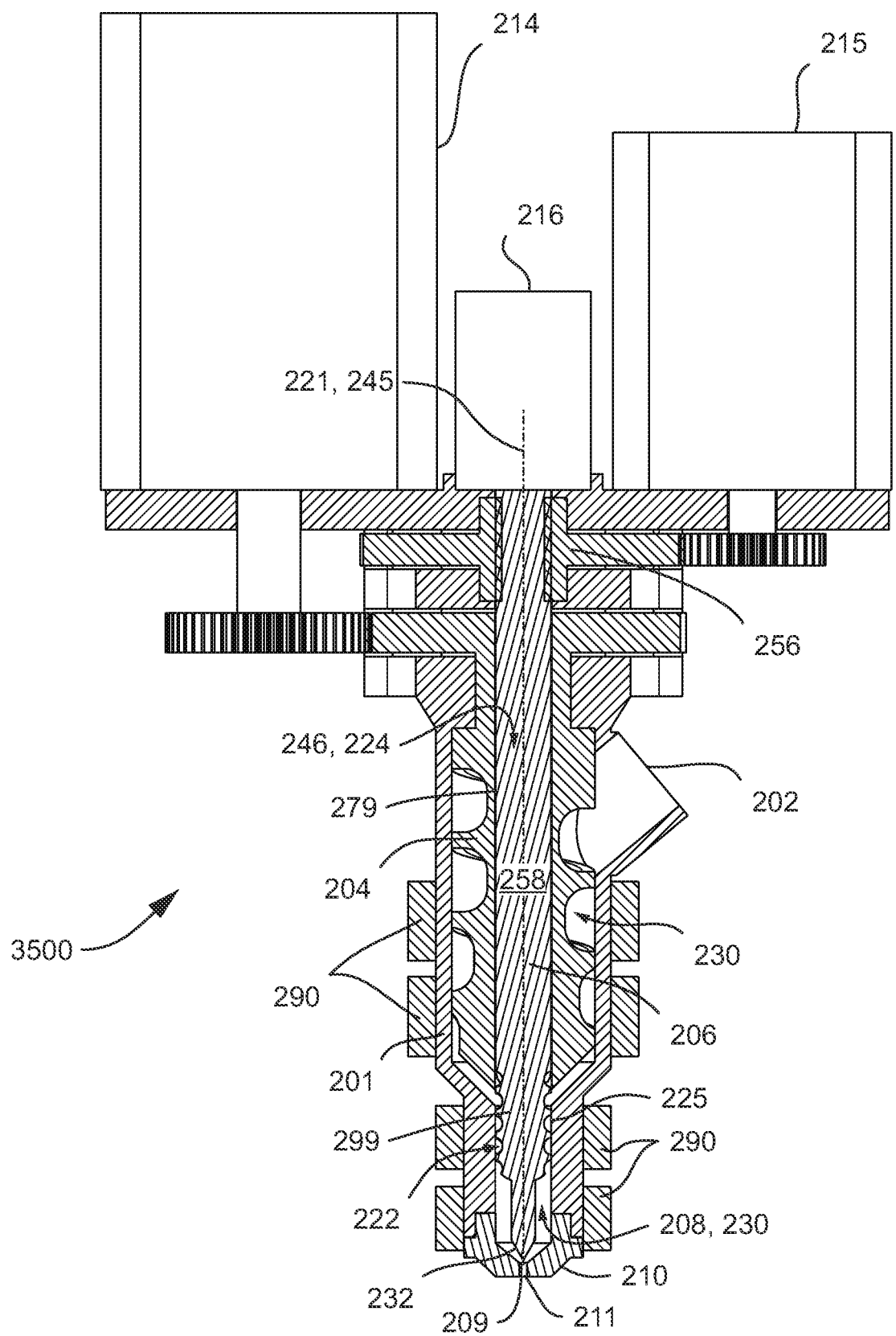
FIG. 35 shows a lateral partial sectional view of an exemplary embodiment of an extruder comprising a mixing rotor used as a movable member of a control valve.

In yet another aspect, FIGS. 28A, 28B, 34, and 35 show different embodiments of an extruder of the present invention comprising a mixing rotor 206 (consistent with the description of extruder 101 in connection with FIG. 1) and a control valve, the control valve comprising a movable member further comprising a stator 262 (FIGS. 28A and 28B) or a mixing rotor 206 (FIGS. 34-35). The extruder may be used in 3D printing systems including the 3D printing system 100 described in connection with FIG. 1.

In yet another aspect, FIGS. 30-33 show different embodiments of an extruder of the present invention comprising a control valve with a valve stem 205.

In yet another aspect, FIGS. 10-26 depict embodiments of a control valve of an extruder of the present invention independently from the pressure-generating mechanisms.

Embodiments of an extruder of the present invention may have different configurations of the pressure-generating mechanisms dependent on the forms of feedstock materials and, optionally, other raw materials to be processed by the extruder.

FIGS. 2-6, 9, 27-28, 30-33, and 35 depict embodiments of the extruder employing a screw extrusion mechanism for establishing streams of one or more feedstock materials provided in the form of granules. Although the depicted extruders 600, 700, 2700, 2800, 3000, 3100, 3200, 3300, and 3500 use a single-screw extrusion mechanism to establish a stream of granules, it should be understood by those skilled in the art that any pressure-generating mechanism capable of establishing a stream of granules through the polymer processing space of the extruder may be used instead or in addition. For example, the pressure generating mechanism for establishing a stream of granules may be selected from a group consisting of: a single-screw extrusion mechanism, a twin-screw extrusion mechanism, a tri-screw extrusion mechanism, a disk extrusion mechanism, a vane extrusion mechanism, a progressive cavity extrusion mechanism, a ram extrusion mechanism, and combinations thereof.

It is preferable to employ a pressure-generating mechanism configured for positive displacement conveying of granules in contrast to dragging conveying to establish a stream of granules. Positive displacement conveying in this document should be understood as conveying by (i) displacing a trapped volume within the polymer processing space of an extruder, and/or (ii) by exerting normal contact forces on granules where friction forces oppose conveying rather than drive it (for example, conveying mechanism in a single-screw extrusion mechanism with grooved barrel and in a scroll extrusion mechanism with grooved barrel).

One advantage of such a pressure-generating mechanism for 3D printing is that it may provide a substantially constant mass flow rate of the stream independent of the viscosity of the stream and the back pressure. This enables accurate control of the mass flow rate that is necessary, although not sufficient, for further control of the volumetric flow rate required for 3D printing. To facilitate positive displacement conveying of granules, the pressure-generating mechanism for establishing a stream of granules may be selected from a group consisting of: a single-screw extrusion mechanism with a grooved barrel, an intermeshing counter-rotating twin-screw extrusion mechanism, an intermeshing tri-screw extrusion mechanism, a scroll extrusion mechanism with a grooved barrel, a vane extrusion mechanism, and a progressive cavity extrusion mechanism.

Figure 8:
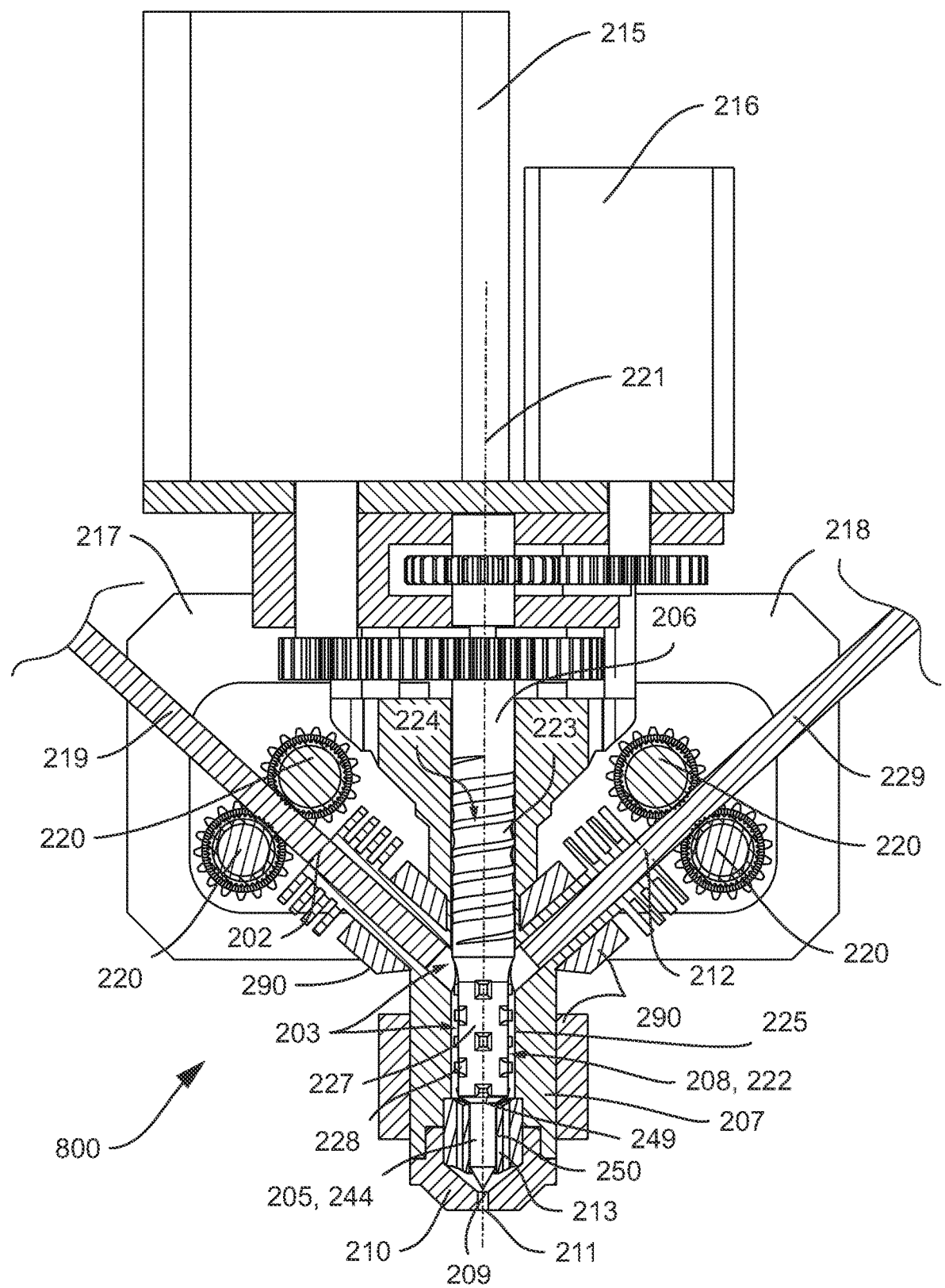
FIG. 8 shows a lateral partial sectional view of an exemplary embodiment of an extruder comprising a mixing rotor and a control valve.
Figure 9:
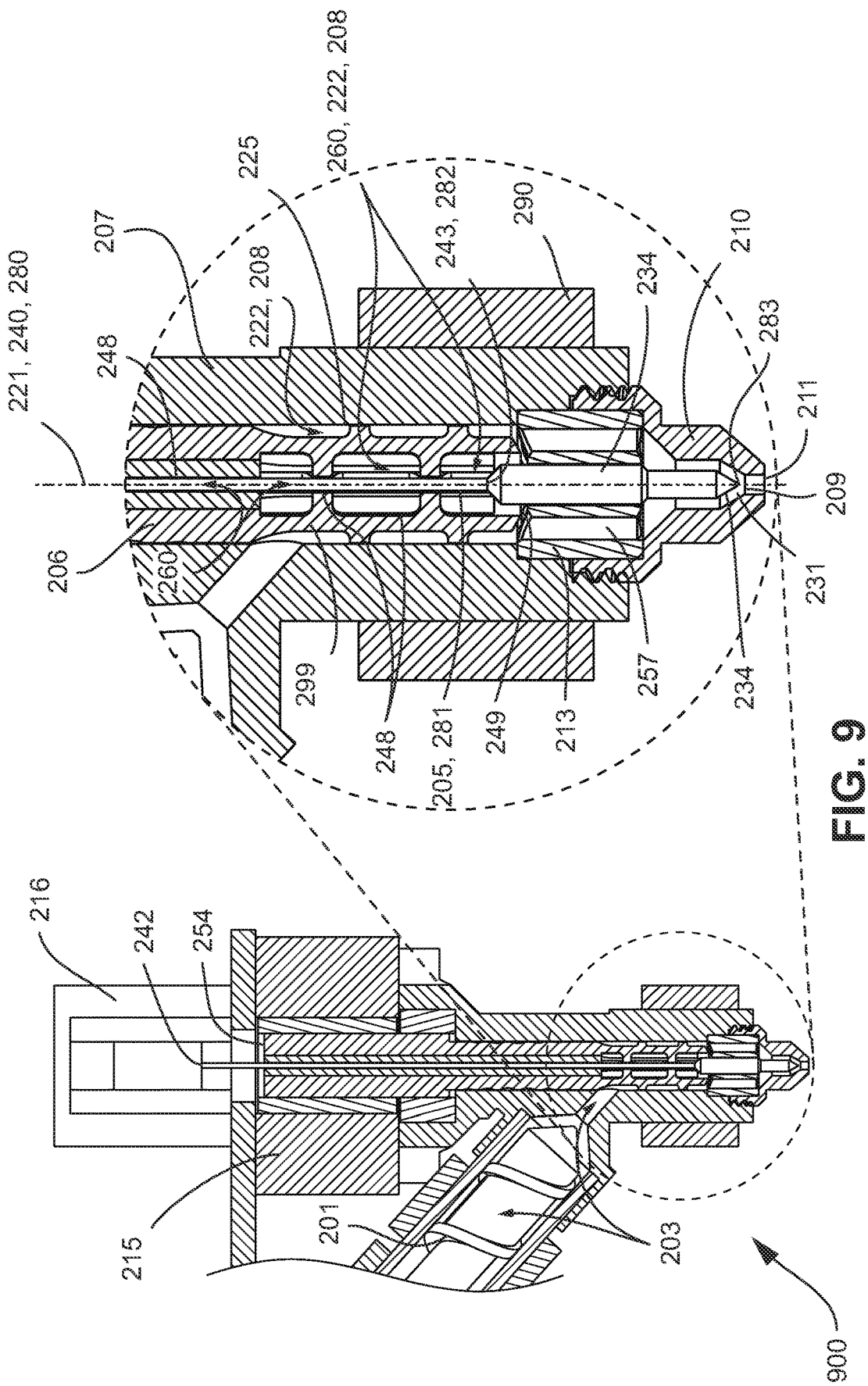
FIG. 9 shows another lateral partial sectional view of an exemplary embodiment of an extruder comprising a mixing rotor and a control valve.
Figure 10:
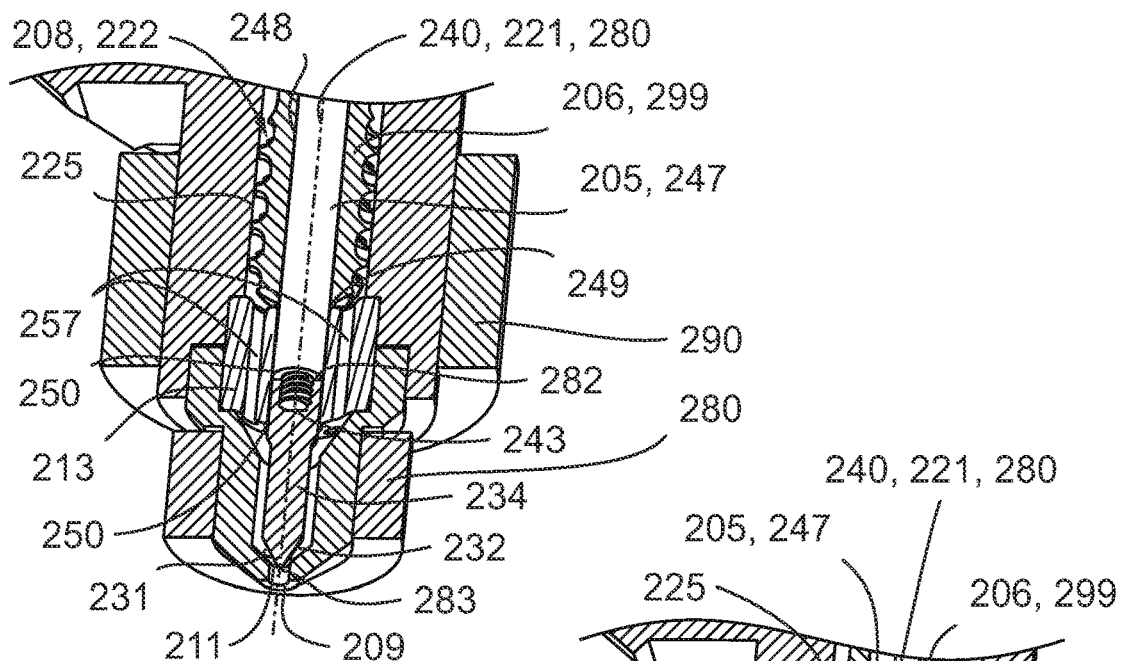
FIGS. 10-21 show isometric partial sectional views of different exemplary embodiments of an extruder comprising a control valve.
Figure 29:
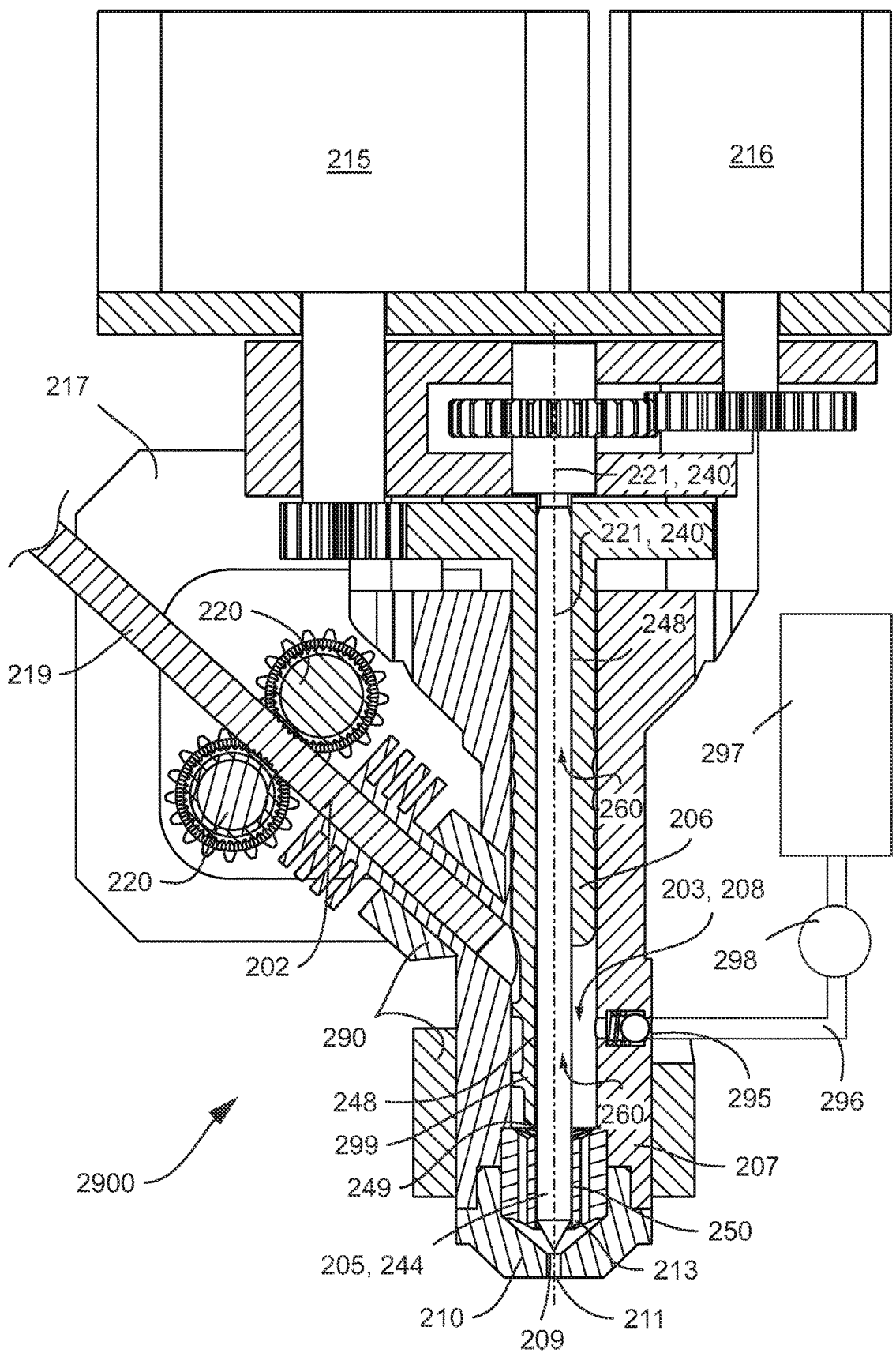
FIG. 29 shows a lateral partial sectional view of an example embodiment of an extruder comprising an additional inlet for a raw material provided in a fluid, gaseous or supercritical form.
Figure 30:
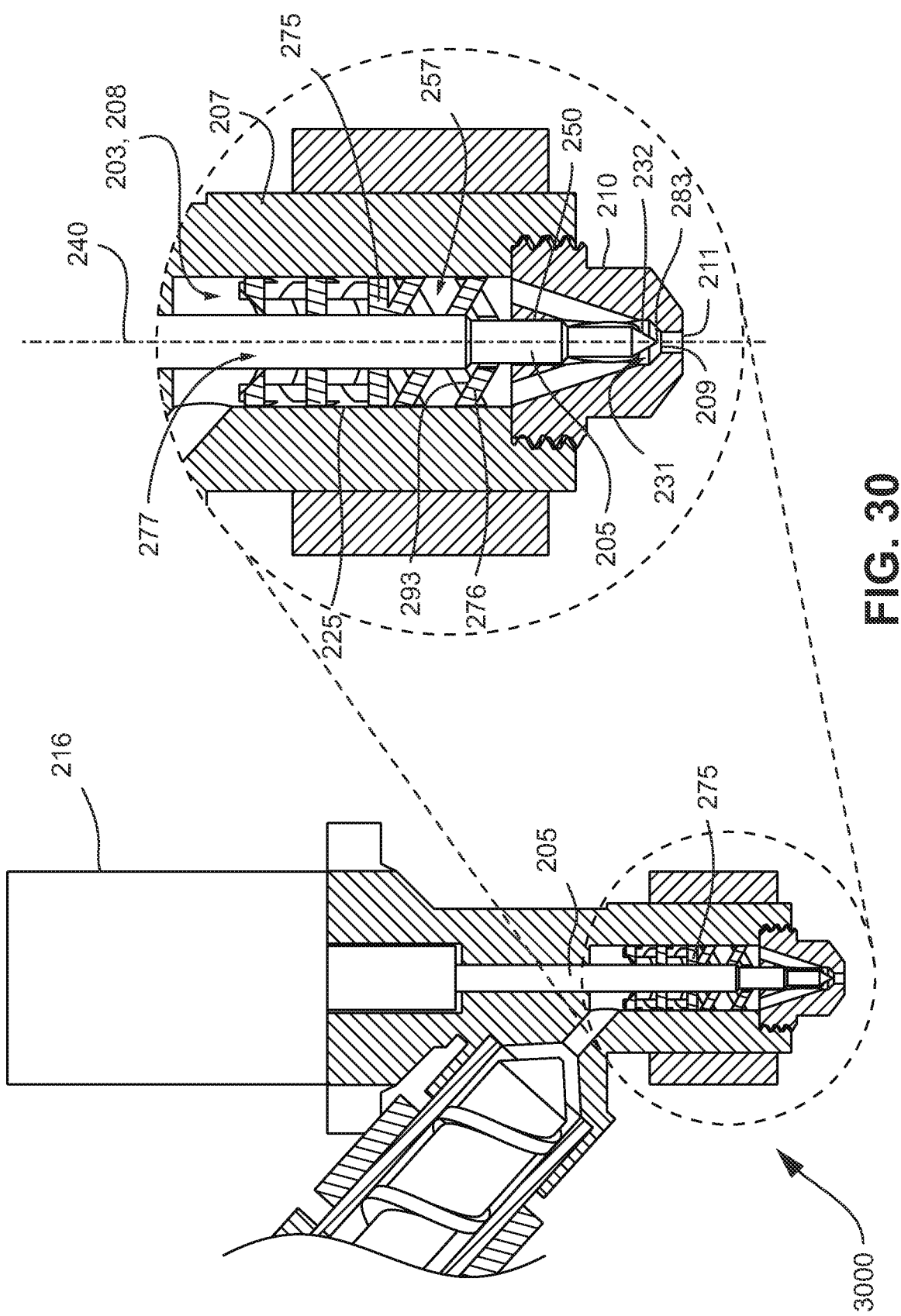
FIG. 30 shows a lateral partial sectional view of an exemplary embodiment of an extruder comprising a static mixer and a control valve.

FIGS. 8, 29, and 34 depict embodiments of the extruder employing a filament drive mechanism for establishing a stream of a feedstock material provided in the form of a filament. Although the extruders 700, 800, 2900, and 3400 use a filament drive mechanism comprising two drive wheels to establish a stream of filament, it should be understood by those skilled in the art that any filament drive mechanism, for example, those discussed in connection with FIG. 1, can be employed instead, or in addition, for establishing a stream of a filament.

Figure 7:
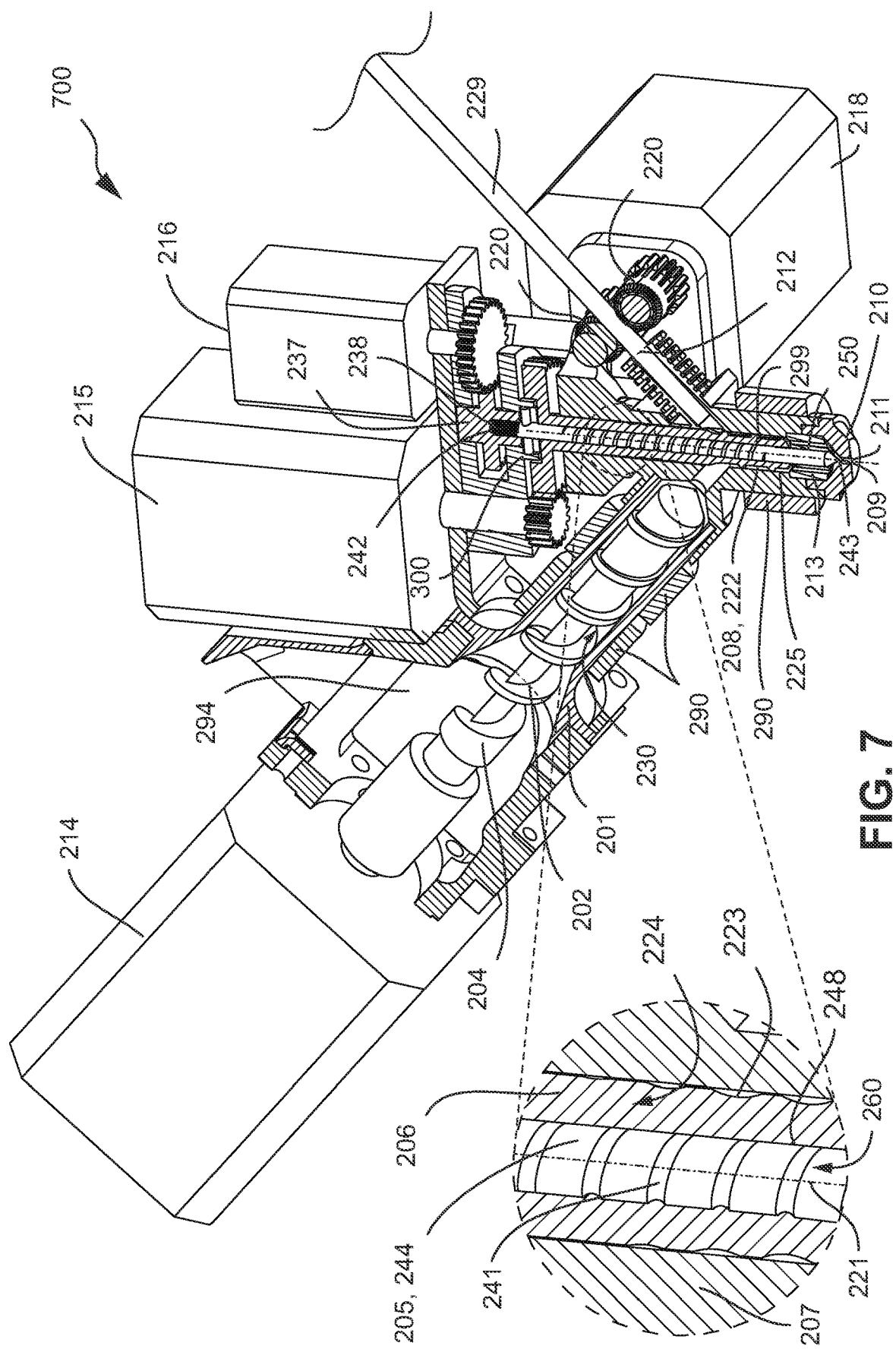
FIG. 7 shows an isometric partial sectional view of an exemplary embodiment of an extruder comprising a mixing rotor and a control valve.

An extruder of the present invention may comprise a plurality of pressure-generating mechanisms configured to establish streams of possibly different feedstock materials. FIG. 7 depicts an embodiment of the extruder employing a screw extrusion mechanism for establishing one or more streams of feedstock material in the form of granules and further employing a filament drive mechanism for establishing a stream of a feedstock material in the form of a filament.

An extruder of the present invention may comprise one or more inlets 202 configured to receive raw materials, such as feedstock materials. The extruder may further comprise one or more outlets 211 fluidly connected to at least one inlet 202 and configured to release a stream from an enclosed polymer processing space 203 of the extruder fluidly connecting the at least one inlet 202 to the outlet 211. The outlet 211 may be formed in a nozzle 210 of the extruder. For embodiments, where the nozzle 210 has multiple exit orifices configured to release the stream from the polymer processing space 203 of the extruder, it is understood that they together form the outlet 211.

The extruder may include a screw 204 mounted for rotation about a rotational axis 245 and may further include a screw cavity 230 extending generally along the rotational axis 245. The screw 204 may have a portion disposed within the screw cavity 230, the portion extending generally along the rotational axis 245. The screw cavity 230 may be fluidly connected to the inlet 202 of the extruder configured to receive one or more raw materials including granules. The extruder may include a barrel 201 having one or more inner surfaces at least partially defining the screw cavity 230. The barrel 201 may include the inlet 202 (best shown in FIGS. 2-3, 5-7). The barrel 201 may comprise one or more grooves (not shown) provided in the inner surface of the barrel 201. The barrel 201 may comprise one or more parts assembled together. The extruder may include a compartment 294 for containing the raw materials to be fed into the screw cavity 230 through inlet 202. The screw 204 may be operably connected to one or more motors 214 (also referred to as screw motors) providing rotational power to the screw 204. The barrel 201, the screw 204, and the motor 214 together may constitute a screw extrusion mechanism. For example, in embodiments comprising a single screw 204 within the screw cavity 230, the barrel, the screw 204 and the motor 214 together may constitute a single-screw extrusion mechanism (best shown in FIGS. FIGS. 2-7, 9, 27-28, 30-33, and 35). As another example, in embodiments comprising a pair of screws 204 disposed laterally adjacent to each other within the screw cavity 230 and rotated by a single motor 214 or each driven by a separate motor 214, the screws 204 together with the barrel 201 and the motors 214 may constitute a twin-screw extrusion mechanism. The screw extrusion mechanism may be configured to compress the granules and establish a stream of pelletized or melted granules within the screw cavity 230 and in a downstream direction from the inlet 202 toward the outlet 211. The motor 214 may be connected to a control system of a 3D printing system, which may be further configured to control the mass flow rate of the streams established by the screw extrusion mechanism by adjusting the rotational speed of the screw 204.

Figure 3:
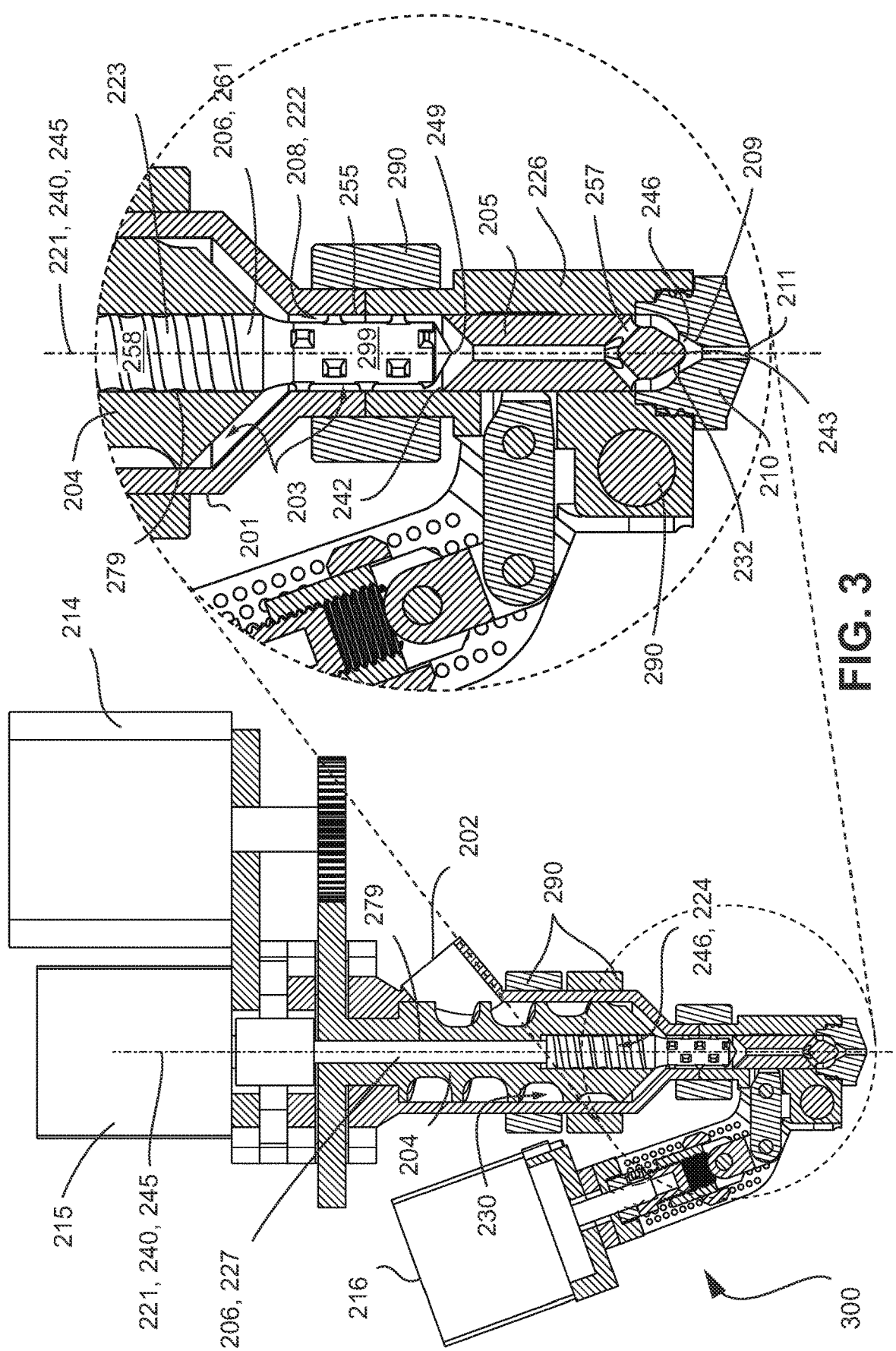
FIG. 3 shows a lateral partial sectional view of an exemplary embodiment of an extruder comprising a mixing rotor and a control valve.
Figure 4:
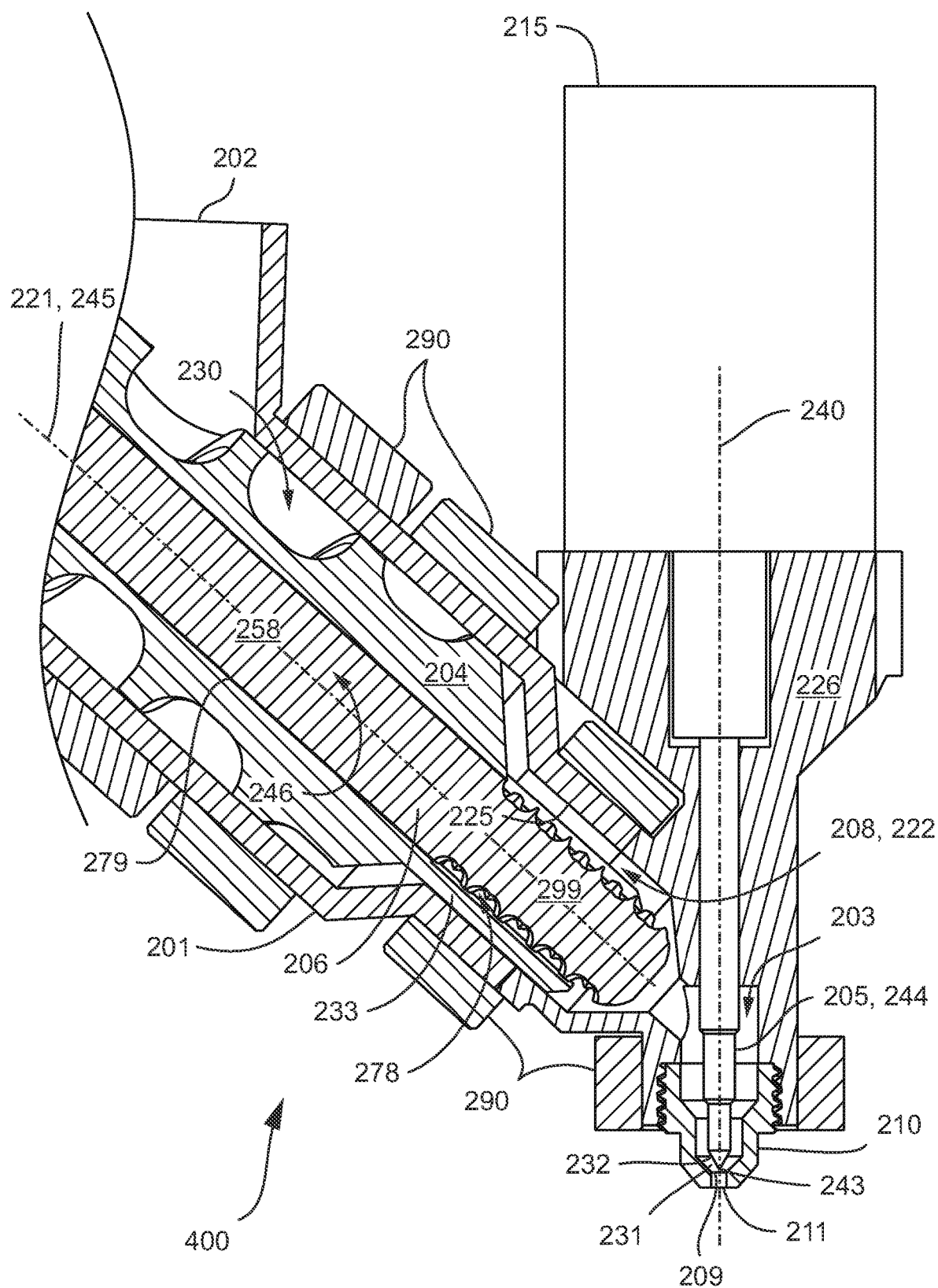
FIG. 4 shows a lateral partial sectional view of an exemplary embodiment of an extruder comprising a mixing rotor and a control valve.

The extruder may comprise a mixing cavity 208 fluidly connected to the inlet 202 and to the outlet 211. The mixing cavity 208 may have one or more inner surfaces 225. In embodiments, the mixing cavity 208 may be formed in the barrel 201, for example, as shown in FIGS. 2, 5, 26, 31, and 35. In embodiments, the extruder may comprise a mixing chamber 207 defining the mixing cavity 208, for example, as shown in FIGS. 6-9, 27, 28-30, and 34. In embodiments, the mixing cavity 208 may be defined by a plurality of parts assembled together. For example, as shown in FIGS. 3 and 4, a portion of the mixing cavity 208 may be defined by the barrel 201. Another portion of the mixing cavity 208 may be defined by a control valve body 226 connected to the barrel 201 (best shown in FIG. 3). The mixing cavity 208 may be fluidly connected to the screw cavity 230. In some embodiments, the mixing cavity 208 may be a portion of the screw cavity 230. In general, the mixing cavity 208 may have any shape and may be defined by one or more of arbitrary parts or assembly units of the extruder as long as they define the cavity permitting the installation of a mixing rotor 206 and/or a static mixer 275 therein as discussed below. A pressure-generating mechanism may be configured to establish a stream within the polymer processing space 203 in a downstream direction from the inlet 202 toward the mixing cavity 208 and further toward the outlet 211. For example, the extruder may comprise a screw extrusion mechanism configured to compress granules and establish a stream of the pelletized or melted granules within the polymer processing space 203 through the screw cavity 230 in a downstream direction from the inlet 202 toward the mixing cavity 208 and further through the mixing cavity 208 toward the outlet 211.

The extruder may include one (best shown in FIGS. 7 and 29) or a plurality (best shown in FIGS. 8 and 34) of filament drive mechanisms (filament feeders). The filament feeder may be configured to push a filament 219 through the inlet 202 and therefore establish a stream of the solid or melted filament 219 within the polymer processing space 203 in a downstream direction from inlet 202 toward the outlet 211. The filament feeder may comprise one or more rotating drive wheels 220 frictionally engaging the filament 219 and mounted for rotation as described in connection with FIG. 1. Alternatively, or in addition, the first filament feeder may comprise one or more threaded rods (not shown) frictionally engaging the filament 219 and mounted for rotation as described in connection with FIG. 1. The drive wheel 220 or the threaded rod may be rotated by a motor 217 operably connected thereto. The motor 217 may be connected to a control system of a 3D printing system which may be further configured to control the feed rate of the filament 219 (the mass flow rate of the filament 219 stream) by adjusting the rotational speed of the motor 217.

In embodiments comprising a plurality of pressure-generating mechanisms (best shown in FIGS. 7, 8 and 34), a first pressure-generating mechanism may establish a first stream of a first feedstock material within the polymer processing space 203 in a downstream direction from a first inlet 202 toward the outlet 211 and a second pressure-generating mechanism may establish a second stream of a second feedstock material within the polymer processing space 203 in a downstream direction from a second inlet 212 toward the outlet 211. The first and the second streams may be combined into a combined stream within the mixing cavity 208. Alternatively, or in addition, the streams may be combined into the combined stream upstream of the mixing cavity 208. The combined stream may further flow by a pressure applied by the pressure-generating mechanisms in combination. For example, as shown in FIG. 7, the first stream may be a stream of granules established by a screw extrusion mechanism driven by the motor 214 and the second stream may be a stream of a filament 229 established by a filament feeder driven by a motor 218. As another example, as shown in FIGS. 8 and 34, the first stream may be a stream of a first filament 219 established by a filament feeder driven by the motor 217 and the second stream may be a stream of a second filament 229 established by a filament feeder driven by the motor 218. The control system may further control the mass flow rate of the combined stream and, optionally, the concentrations of the streams within the combined stream by controlling the mass flow rate of each of the streams.

An extruder of the present invention may comprise a mixing rotor 206 mounted for rotation about a rotational axis 221. The mixing rotor 206 may have a proximal end 249 (closer to the outlet 211) and a distal end 254 (farther from the outlet 211) along the rotational axis 221. Furthermore, the mixing rotor 206 may have a portion (further referred to as a mixing portion 299) thereof disposed in the mixing cavity 208 and configured to mix one or more streams received therein. Preferably, the mixing rotor 206 may be elongated with respect to the rotational axis 221 such that the rotational axis 221 defines the longitudinal direction of the mixing rotor 206, generally extending along a major axis of the mixing rotor 206. A "major" dimension in this document corresponds to the greatest (longest) dimension of a part or a portion thereof. Alternatively, the mixing rotor 206 may have a lateral direction with respect to the rotational axis 221 extending along the major axis of the mixing rotor 206, such as if the mixing rotor 206 has a disk-like shape formed about the rotational axis 221. The rotational axis 221 may move in space relative to the mixing cavity 208, such as if the mixing rotor 206 performs a complex motion in more than one degrees of freedom relative to the mixing cavity 208. In some embodiments comprising a screw extrusion mechanism, the rotational axis 221 may be transverse to the rotational axis 245 of the screw 204 (best shown in FIGS. 6, 7, 9, and 27A-28B). In some embodiments, the rotational axis 221 of the mixing rotor 206 and the rotational axis 245 of the screw 204 may be parallel to each other and have a lateral offset. In one example, the barrel 201 may be disposed generally above the mixing chamber 207 and may be laterally offset from it such that the rotational axis 245 is parallel to the rotational axis 221. In embodiments, the rotational axis 221 of the mixing rotor 206 may coincide with the rotational axis 245 of the screw 204 (as best shown in FIGS. 2-5 and 35).

The mixing rotor 206 may be operably connected to at least one dedicated motor 215 (e.g., a stepper motor, DC motor, or AC motor) providing the rotational power to the mixing rotor 206. The connection between the motor 215 and the mixing rotor 206 may include various combinations of gears, belts, pulleys, worm gears, threads, flexible shafts, and the like, suitable for transmission of rotational power from the motor 215 to the mixing rotor 206. Alternatively, the mixing rotor 206 may be operably connected to the motor 214, providing the rotational power through a step-up gearbox. One or more motors providing the rotational power to the mixing rotor 206 are also referred to as mixer motors. The mixing rotor 206 may have any form suitable for mixing. For example, as shown in FIG. 8, the mixing rotor 206 may comprise a generally cylindrical or conical shaft 227 extending longitudinally and may comprise mixing elements 228 extending radially from the shaft, such as a pineapple mixer, a pin mixer or the like. In embodiments, an extruder of the present invention may comprise pins extending inwardly into the mixing cavity 208 from the inner surface 225. It may further comprise the mixing rotor 206 having mixing elements 228 extending outwardly towards the inner surface 225 that pass or "wipe" the pins periodically as the mixing rotor 206 is rotating. This provides high shear mixing in regions between the mixing elements 228 and the pins.

In another example, the mixing rotor 206 may constitute the sun rotor of a planetary mixer. Such planetary mixer may comprise a mixing rotor 206 having a teething on its outer surface and may be surrounded by the inner surface 225 having a teething facing the teething of the mixing rotor 206. There may be one or more planetary rotors disposed between the mixing rotor 206 and the inner surface 225 and configured to roll around the mixing rotor 206 as it rotates.

In another example yet, the mixing rotor 206 may constitute a cavity transfer mixer. There may be one or more circumferentially extending rows of outwardly extending cavities formed in the inner surface 225. The outer surface of the mixing rotor 206 may define one or more circumferentially extending rows of inwardly extending cavities that axially overlap with the rows of cavities provided in the inner surface 225.

In embodiments, a stator 262 may be positioned between the inner surface 225 of the mixing cavity 208 and the mixing rotor 206. The stator 262 may be annularly disposed about the mixing rotor 206. Stator 262 may be at least partially surrounding the mixing rotor 206. The stator 262 may be made as a single part or assembly unit, or it may comprise a plurality of members disposed circumferentially around the mixing rotor 206. The stator 262 may be made as a portion of the screw 204 as discussed below in greater detail. The stator 262 may have a generally cylindrical inwardly facing inner surface facing the mixing rotor 206 (best shown in FIGS. 28A and 28B). A plurality of rows of annularly extending flow channels 263 may be formed by the outer surface of the stator 262, the rows may be separated by outwardly extending rings 264. The mixing rotor 206 may further have a plurality of annular rows of inwardly extending cavities 265 formed by its outer surface and disposed circumferentially around the rotational axis 221. The annular rows may be separated by outwardly extending rings 266 which may engage the inner surface of the stator 262. Cavities 265 may be in fluid communication with the flow channels 263 through a plurality of apertures 267, which extend through the stator 225.

During mixing, a stream flowing axially through a first annularly extending flow channel 263 turns radially inward and enters the axially extending cavities 265 through the apertures 267, as shown by arrow 268. The stream then flows axially and then turns radially outward, and enters a second annularly extending flow channel located downstream of the first annularly extending flow channel, as shown by arrow 269. The process is then repeated. In embodiments, the stator 262 may be mounted statically relative to the inner surface 225 of the mixing cavity 208. In other embodiments, the stator 262 may be made as a floating sleeve positioned over the mixing rotor 206. In yet other embodiments, as shown in FIG. 28A, the stator 262 may be mounted for linear movement along the rotational axis 221 and may be moved by an actuator, as discussed below in greater detail. Alternatively, or in addition, the stator 262 may be mounted for rotation about the rotational axis 221 and may be rotated by an actuator about the rotational axis 221. For example, the extruder may comprise two mixing rotors 206 mounted coaxially, one of the two mixing rotors being the stator 262 disposed over the second mixing rotor 206 and rotated about the axis 221 in a direction opposite to the direction of rotation of the second mixing rotor 206.

As another example, the mixing rotor 206 may comprise a plurality of deflector elements 276 distributed within the mixing cavity 208, possibly intersecting the rotational axis 221 of the mixing rotor 206 (e.g., the mixing rotor 206 having a portion along the rotational axis 221 comprised entirely of deflector elements). The deflector element 276 defines a surface inclined to the rotational axis 221 such that a stream is deflected by the surface in a direction transverse to the rotational axis 221. The deflector elements 276 may divide streams passing through the mixing cavity 208 into smaller streams. They may further divide the smaller streams into even smaller streams and so forth. Streams may be recombined downstream, thereby providing distributive mixing. At the same time, the rotation of the mixing rotor 206 may provide dispersive mixing. The mixing rotor 206 may comprise a disk having a plurality of mixing elements 228 extending axially from the disk. More generally, any form of the mixing rotor 206 suitable for distributive and/or dispersive mixing may be employed.

One or more mixing rotors 206 may be mounted for rotation and at least partially disposed within the mixing cavity 208. In embodiments, there may be two tapered mixing rotors 206 disposed laterally adjacent to each other within the mixing cavity 208 such that the distance between the rotational axes 221 gradually decreases from the distal ends 254 of the mixing rotors 206 to the proximal ends 249 of the mixing rotors 206. For example, the mixing rotors 206 may be the screws of a conical twin-screw compounder. In other embodiments, there may be two mixing rotors 206 disposed laterally adjacent to each other within the mixing cavity 208 such that their rotational axes 221 are parallel to each other. For example, the mixing rotors 206 may be the screws of a parallel twin-screw compounder. The two or more mixing rotors 206 may rotate adjacently to each other to provide a high shear mixing in regions between the mixing rotors 206. As an example of an extruder having more than two mixing rotors 206, the sun rotor and a plurality of planetary rotors of a planetary mixer may all be the mixing rotors 206.

The mixing rotor 206 may comprise a plurality of members connected together. As shown in one example in FIG. 3, a section 261 with mixing elements 228 may be rigidly coupled to shaft 227, transmitting the rotational power from the motor 215 to the section 261. As another example, the mixing rotor 206 may comprise a shaft 227 and a plurality of sections 261 with mixing elements 228. Sections 261 may have a central through hole and be disposed over the shaft 227. Sections 261 may be further connected to the shaft 227 by having grooves or ridges formed in the inner surface of the central through hole engaging with ridges or grooves respectively formed in the outer surface of the shaft 227.

The mixing cavity 208 comprises a mixing passageway 222 (consistent with description of extruder 101 in connection with FIG. 1). For extruders shown in FIGS. 2-8, 10-13, 15, 18, 20, and 34-35, the mixing passageway 222 may be defined as a portion of the mixing cavity 208 between the inner surface 225 and the mixing rotor 206. For extruders shown in FIGS. 9, 14, 16, 17, 19, 21, 22A-26, and 29, where the mixing rotor 206 defines inner cavities which belong to the polymer processing space 203, the mixing passageway 222 may be defined as the intersection of the polymer processing space 203 and the mixing cavity 208.

As shown in FIGS. 2-5, and 35, the screw 204 may have a through hole 246 extending along the rotational axis 245 thereof. The through hole 246 may be formed generally coaxially with respect to the rotational axis 245. A portion or the whole volume of the through hole 246 may be defined by one or more inwardly facing surfaces 279. The mixing rotor 206 may further comprise a portion (also referred to as an inner portion 258) extending along the rotational axis 221 of the mixing rotor 206 and disposed within the through hole 246. As shown in FIGS. 2, 3, 5, and 35, the mixing portion 299 may be disposed outside the screw 204 (meaning that no portion of the screw 204 rotates about the mixing portion 299 with the rotation of the screw 204 about the rotational axis 245). Alternatively, as shown in FIG. 4, the screw 204 may comprise a stator portion 233 extending along the rotational axis 245 over the mixing portion 299, the stator portion 233 defining a mixing void 278 as a void space formed symmetrically around the rotational axis 245 and not intersecting the screw 204 during its rotation about the rotational axis 245, wherein the stator portion 233 rotates about the void space during the rotation of the screw 204. The mixing portion 299 may be further at least partially disposed within the mixing void 278. The stator portion 233 of the screw 204 may be annularly formed about the mixing portion 299 and may constitute the stator 262. For example, the stator portion 233 may be formed as a cylindrical tube disposed over the mixing portion 299 and further having a plurality of transverse apertures. The mixing rotor 206 may be mounted for rotation about the rotational axis 221 extending along the rotational axis 245 of the screw 204 such that the rotational power from the motor 215 is transferred to the mixing portion 299 through the inner portion 258. The through hole 246 may extend coaxially with respect to the rotational axis 245. The mixing rotor 206 may be mounted coaxially with the screw 204 such that the rotational axis 221 of the mixing rotor 206 coincides with the rotational axis 245 of the screw 204. In embodiments, the extruder may comprise a plurality of screws 204 and one or more of the screws 204 may have the through hole 246 extending along the rotational axis 245 thereof. For example, the extruder may comprise two screws 204 of a twin-screw extrusion mechanism mounted laterally adjacent to each other. One or two screws 204 of the twin-screw extrusion mechanism may further have the through hole 246 extending along the rotational axis 245 thereof. In embodiments comprising a plurality of the screws 204 having the through hole 246 and disposed laterally adjacent to each other, the extruder may further comprise a plurality of the mixing rotors 206 having the inner portions 258 disposed in the separate through holes 246 and having the mixing portions 299 disposed within the mixing cavity 208.

The mixing rotor 206 may comprise a portion axially disposed in a generally cylindrical or conical bore 224 fluidly connected to the mixing cavity 208, the bore 224 extending coaxially along the rotational axis 221, the portion having respectively a generally cylindrical or conical outwardly facing outer surface facing the inner surface of the bore 224. As shown in FIGS. 3, 7, and 8, one or more grooves 223 may be formed in the outer surface of the mixing rotor 206 extending helically with respect to the rotational axis 221. Alternatively, or in addition, the inner surface of the bore 224 may have one or more grooves formed therein and extending helically with respect to the rotational axis 221. The bore 224 may be formed in the mixing chamber 207 (best shown in FIGS. 6-9) or it may be formed in a separate part or assembly unit of an extruder of the present invention. In embodiments where the mixing rotor 206 is partially disposed within the through hole 246 of the screw 204, the bore 224 may be the through hole 246 of the screw 204 and the inner surface of the bore 224 may be the inwardly facing surface 279 of the screw 204, for example, as shown in FIGS. 2-5, and 35. During the rotation of the mixing rotor 206, the grooves 223 may provide pumping (viscous or drag pumping) of a polymeric melt which seeps between the mixing rotor 206 and the inner surface of the bore 224 under the action of pressure within the mixing cavity 208. The drag pumping generates a pressure opposing the pressure within the mixing cavity 208, thereby providing a seal to prevent the polymeric melt from leaking further out of the mixing cavity 208 between the mixing rotor 206 and the inner surface of the bore 224.

Preferably, in embodiments, the mixing rotor 206 may be independent as defined in connection with FIG. 1 and as best shown in FIGS. 2-9, 27A, 28A, 29, 34 and 35. Pressure-generating mechanisms providing positive displacement conveying generally may not at the same time provide sufficient plasticization and mixing for desktop 3D printing because of low rotational speeds of their rotating members such as the screw 204 inherent to desktop 3D printing. One advantage of using the independent mixing rotor 206 is that it can provide quality distributive and/or dispersive dynamic mixing even at flow rates inherent to desktop 3D printing, such as in a range from 0.2 $cm^3$/min to about 20 $cm^3$/min, where static mixing generally cannot be usefully employed because of low energy of the flow. Another advantage of using the independent mixing rotor 206 is that it may be used to control the plasticization and mixing of streams independently from the mass flow rate of extrusion.

The mixing rotor 206 may be configured to rotate without producing substantial deviations in the discharge pressure, which is especially beneficial to 3D printing. This can be achieved by using a configuration of the mixing rotor 206, which does not contribute to the discharge pressure. For example, the surfaces of the mixing elements 228 that exert non-zero pressure along the rotational axis 221 of the mixing rotor 206 in the downstream direction of the polymer processing space 203 may be balanced by surfaces of the mixing elements 228 that exert equal non-zero pressure along the rotational axis 221 of the mixing rotor 206 in the upstream direction of the polymer processing space 203. In this case, the total pressure contributed to the discharge pressure may be approximately zero. The mixing rotor 206 may have a shaft with the central longitudinal axis coinciding with the axis of rotation 221 and further have cylindrical pins extending radially from the shaft.

Figure 31:
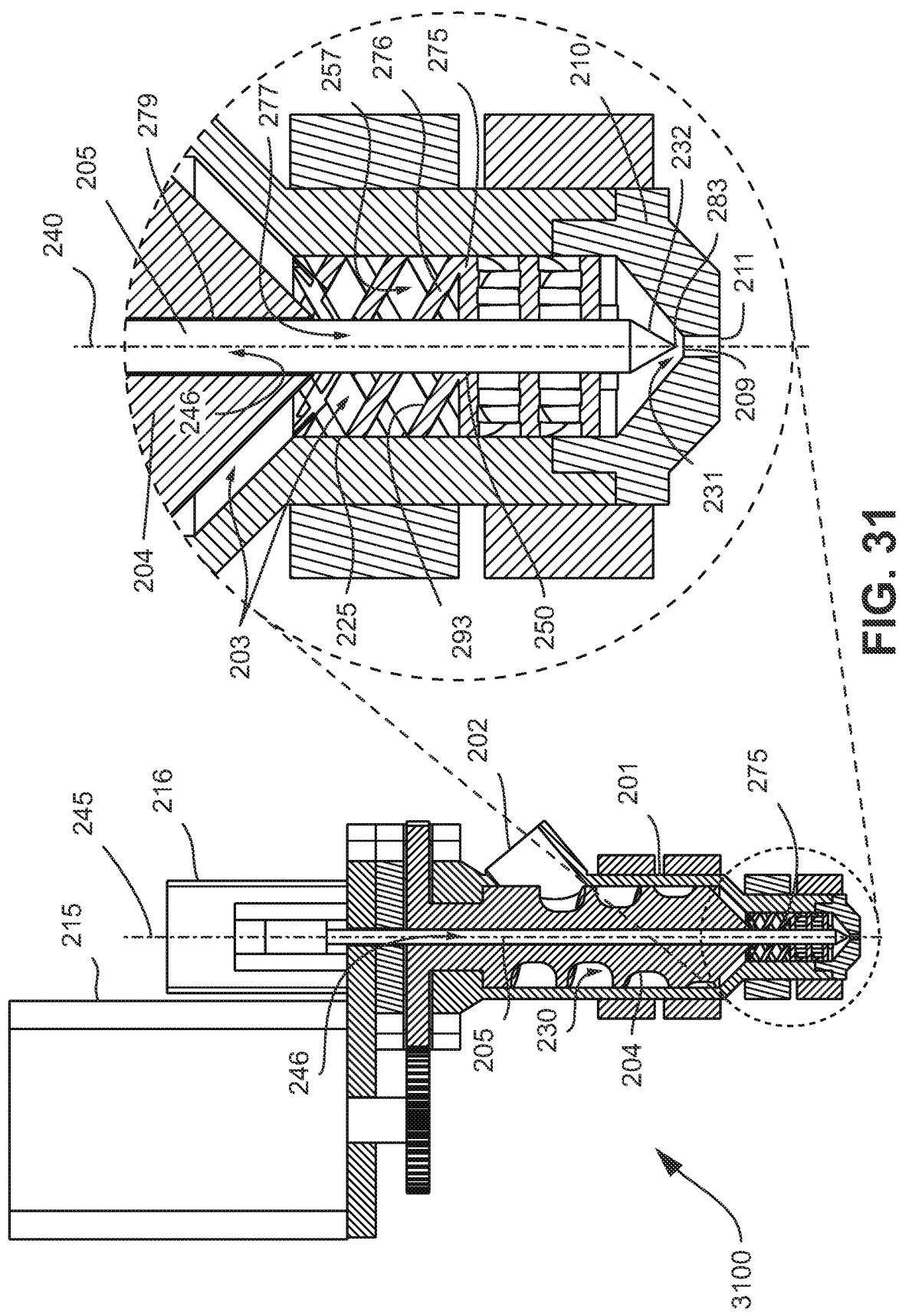
FIG. 31 shows a lateral partial sectional view of an exemplary embodiment of an extruder comprising a static mixer and a control valve.
Figure 32:
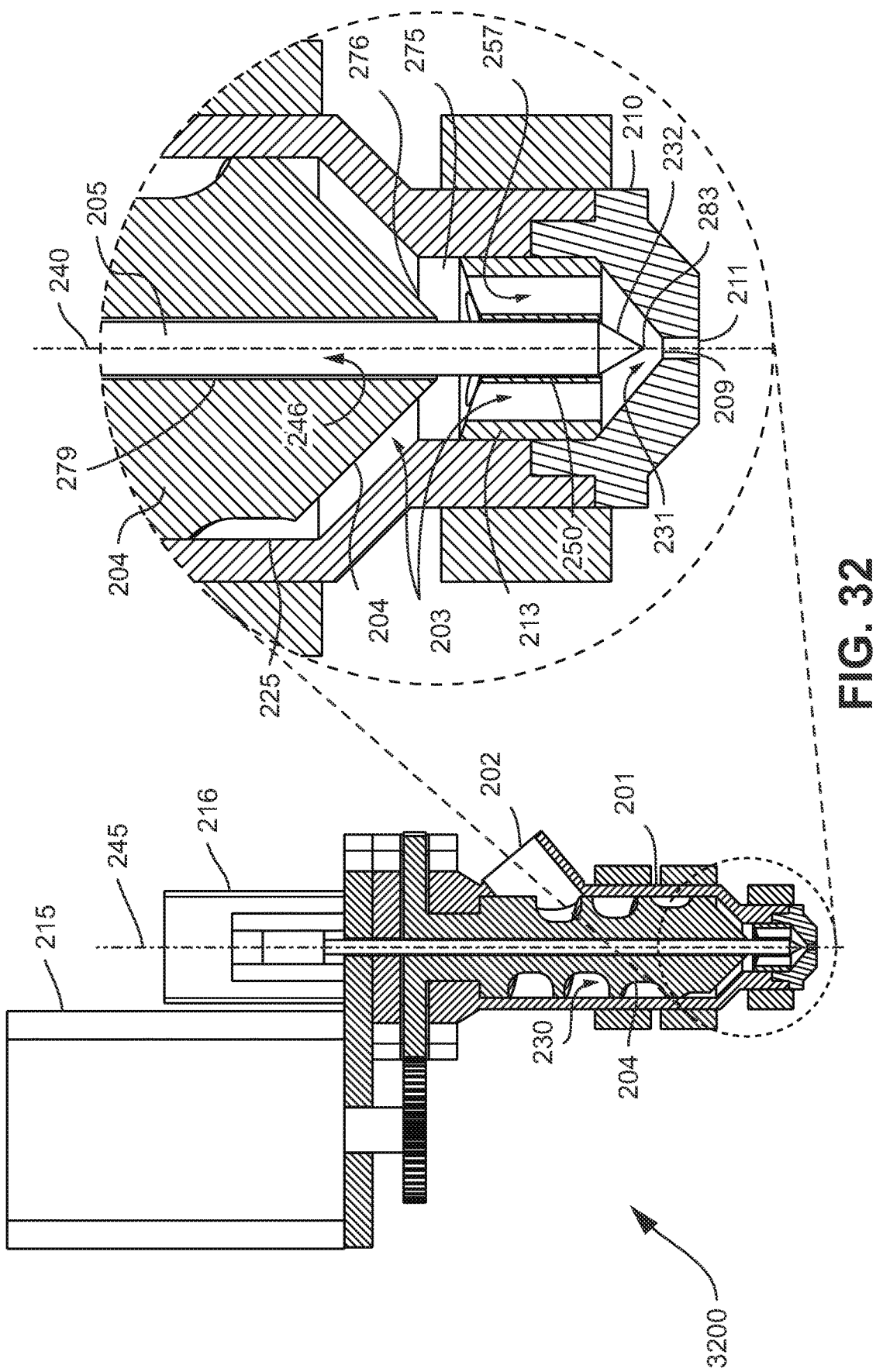
FIG. 32 shows a lateral partial sectional view of an exemplary embodiment of an extruder comprising a breaker plate and a control valve.

In embodiments, an extruder of the present invention may comprise a static mixer 275 (best seen in FIGS. 31 and 32). The static mixer 275 may comprise a plurality of deflector elements 276 distributed within the mixing cavity 208, the deflector element 276 defining a surface 293 inclined with respect to the rotational axis 221 such that a stream is deflected by the surface 293 in a direction transverse to the rotational axis 221. The deflector elements 276 may divide streams passing through the mixing cavity 208 into smaller streams and may further divide the smaller streams into even smaller and yet smaller streams. Such streams may be recombined downstream, thereby providing distributive mixing. More generally, any form of the static mixer 275 suitable for distributive and/or dispersive mixing may be employed. In some embodiments, the static mixer 275 may be employed together with the mixing rotor 206 and may be disposed upstream and/or downstream of the mixing passageway 222 of the mixing rotor 206.

Temperature control units 290 may be positioned, without limitation, along the barrel 201, the mixing chamber 207, the control valve body 225, and the nozzle 210; and may be used to maintain a set temperature profile along the polymer processing space 203. These may include electrical heaters coupled with temperature sensors. Temperature control units 290 may also include passageways for temperature control fluid, and the like. Temperature control units 290 may be connected to the control system (shown in FIG. 1) of the 3D printing system. They can be used to heat and/or cool a stream of pelletized or fluid materials within polymer processing space 203 to facilitate any of the following: (i) melting of the stream, (ii) facilitate activation of the foaming agent contained in the stream, (iii) control compression of the granules, (iv) control a degree of activation of the foaming agent, (v) control the viscosity of the stream, etc.

An extruder of the present invention may comprise at least one passageway 257 misaligned with respect to the rotational axis 221 (further referred to as the misaligned passageway 257). It may be located downstream of the mixing cavity 208 and upstream of the outlet 211. The polymer processing space 203 may include the misaligned passageway 257. In this document, saying that a passageway is misaligned with respect to an axis means that the passageway has a portion which is transverse to the axis or laterally offset with respect to the axis. The passageway 257 may be configured to stop the rotation of a stream flowing though or from the mixing cavity 208 caused by the rotation of the mixing rotor 206.

Figure 21:
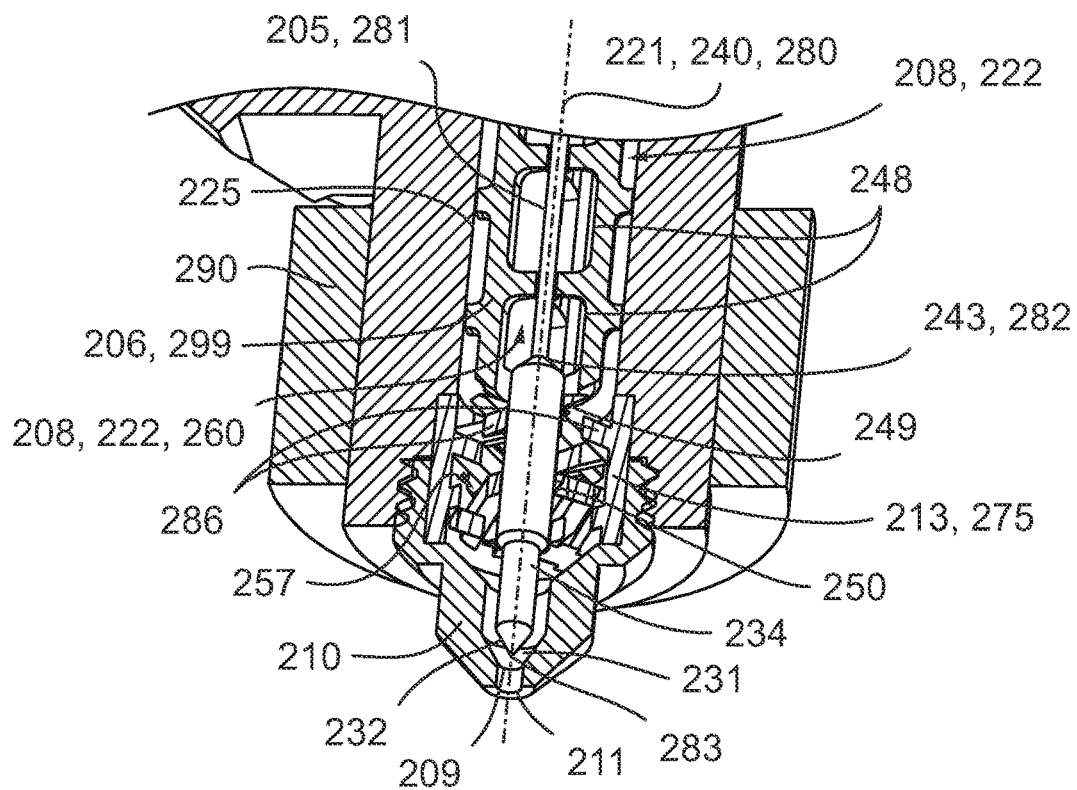

An extruder of the present invention may comprise a breaker plate 213 at least partially defining at least one misaligned passageway 257 (shown in FIGS. 2, 5-17, 21, 23, 29, and 32) such that one end on the misaligned passageway 257 is fluidly connected to the mixing cavity 208 and another end of the misaligned passageway 257 is fluidly connected to the outlet 211. The breaker plate 213 may define a plurality of misaligned passageways 257 distributed around the rotational axis 221, as shown in FIGS. 2, 5-17, 29, and 32. As another example, as shown in FIG. 21, the breaker plate 213 may comprise a plurality of deflector elements 286 having a surface inclined to the rotational axis 221, the deflector elements 286, in combination, defining a plurality of intersecting misaligned passageways 257. Such breaker plate 213 may constitute the static mixer 275 comprising the deflector elements 286 defining the surfaces configured to deflect a stream in a direction transverse to the rotational axis 221. The deflector elements 286 may divide streams passing through the breaker plate 213 or static mixer 275 into smaller streams, and may further divide the smaller streams into even smaller streams and so forth. Streams may be recombined downstream, thereby providing desired distributive mixing.

Figure 25:
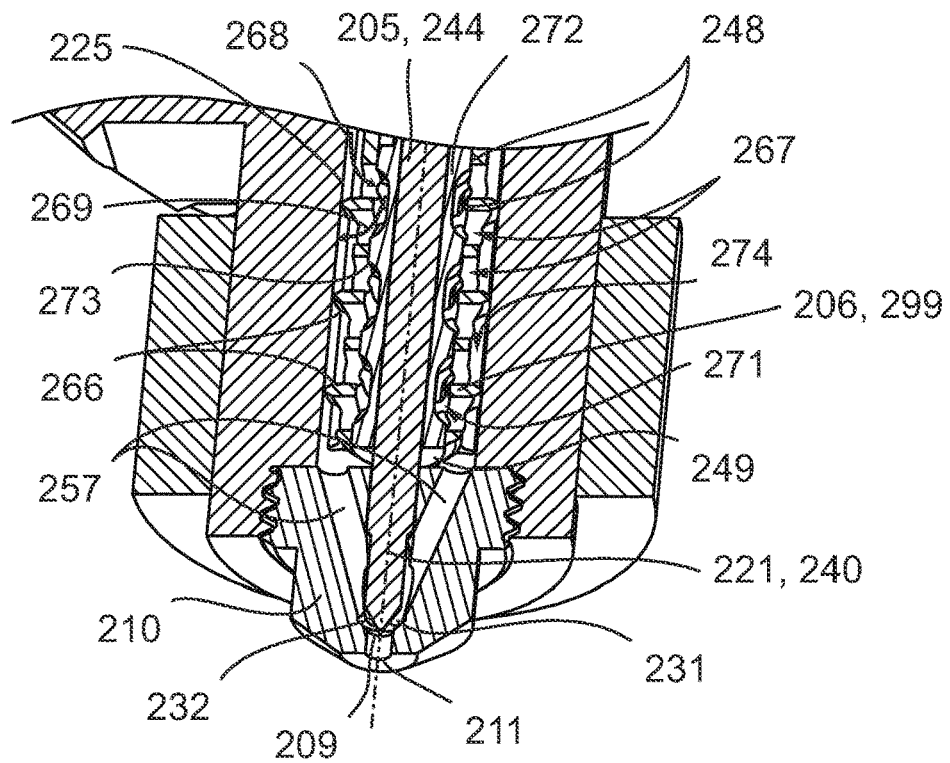
FIG. 25 shows an isometric partial sectional view of an exemplary embodiment of an extruder comprising a mixing rotor and a control valve.
Figure 26:
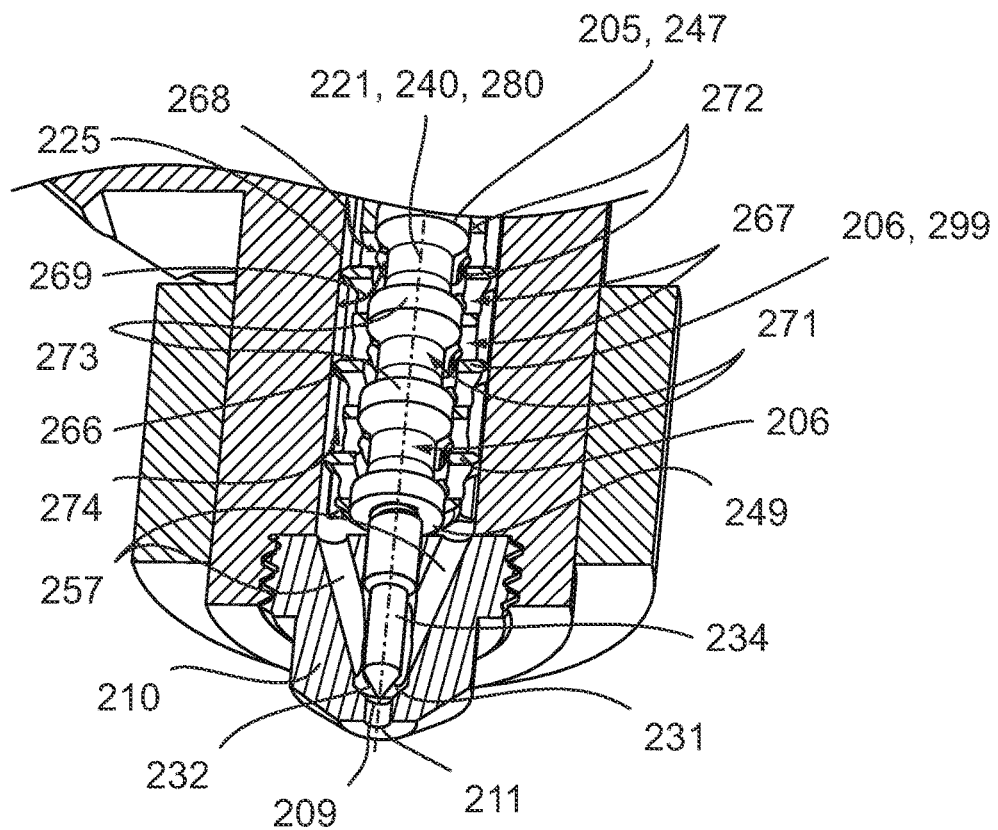
FIG. 26 shows an isometric partial sectional view of an exemplary embodiment of an extruder comprising a mixing rotor and a control valve.

Instead or in addition to being defined by the breaker plate 213, the misaligned passageway 257 may be defined by other parts or assembly units of the extruder. The misaligned passageway 257 may be at least partially defined by the mixing chamber 207, the nozzle 210, a mixer stator 262, a valve stem 205, a valve tip 234, or the like. For example, the misaligned passageway 257 may be defined by the nozzle 210 as shown in FIGS. 25-27. As an example, the misaligned passageway 257 may be partially defined by a surface formed by the breaker plate 213 and partially defined by an inner surface of the nozzle 210 and/or an inner surface of the mixing chamber 207. As yet another example, the misaligned passageway 257 may be defined by the valve stem 205, as shown in FIG. 3. As yet another example, the misaligned passageway 257 may be defined by the valve tip 234 as discussed below in greater detail. As yet another example, the misaligned passageway 257 may be defined by the mixer stator 262 (best shown in FIGS. 28A and 28B).

An extruder of the present invention may include a control valve. The polymer processing space 203 may further include a flow passage or opening such that the control valve can be operated to vary the form (defined by parameters such as dimensions, cross-section, or curvature) of the flow passage or opening. The flow passage or opening is further referred to as the flow passage 231 of the control valve. The flow passage 231 may comprise one or more passages or openings having a boundary (which can possibly be changed dynamically) belonging to the boundary of the polymer processing space 203. States of the control valve with different forms of the flow passage 231 are further referred to as the states of the control valve. In at least one of the states, the flow passage 231 may have a form such that the backpressure of the flow passage 231 is the lowest among all the states (there may be more than one such states). Such a state is further referred to as a fully open state. In at least one of the states, the flow passage 231 may have a form such that the backpressure of the flow passage 231 is the highest among all the states, or the inlet and the outlet become fluidly disconnected (there may be more than one such states). Such a state is further referred to as a fully closed state. In some embodiments, the control valve may have only two states, including the fully open state and the fully closed state. In some embodiments, the control valve may have more than two states. For example, the control valve may be capable of changing the states continuously from the fully open state to the fully closed state. The control valve may be used to adjust the flow of the stream from the outlet 211 depending on the position of the nozzle 210 relative to the build surface. For example, the control valve may be configured to stop the flow before the extruder performs a travel move during the 3D printing process.

Figure 11:
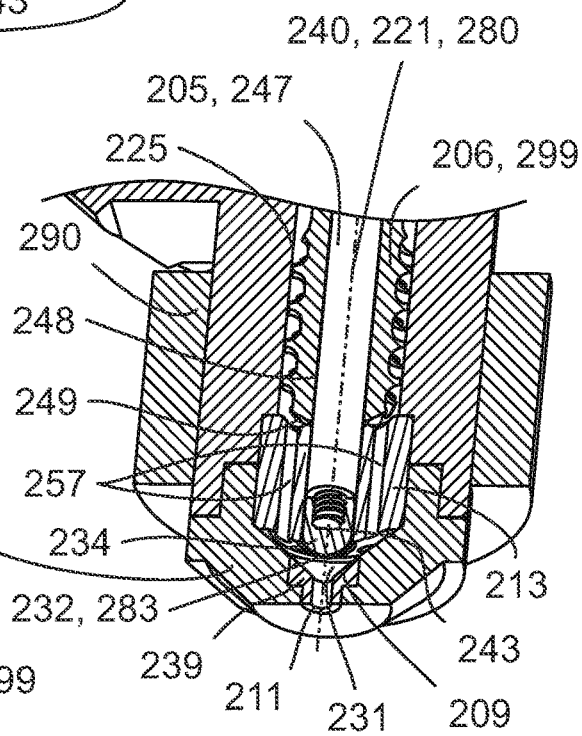
Figure 12:
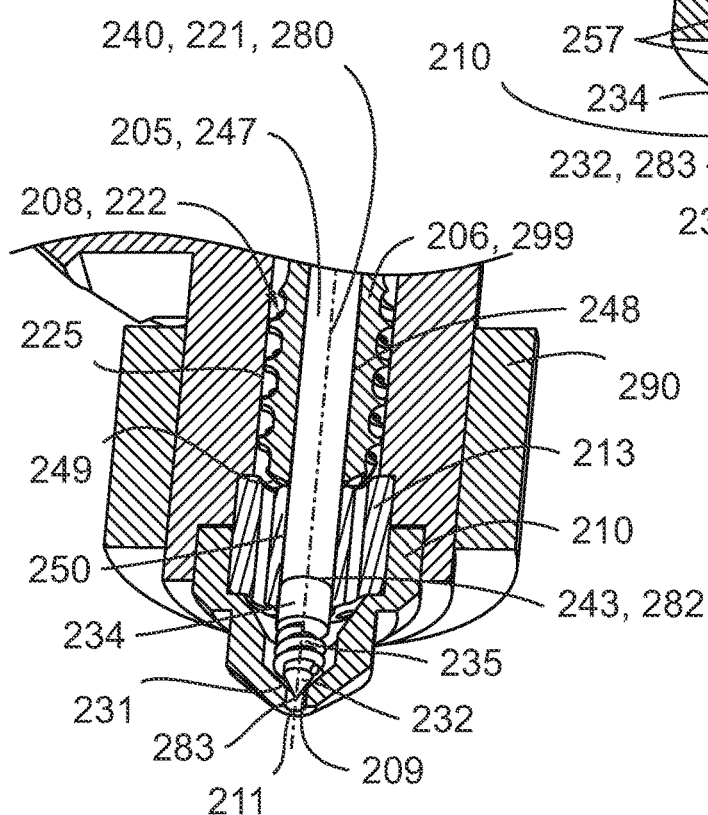
Figure 22A:
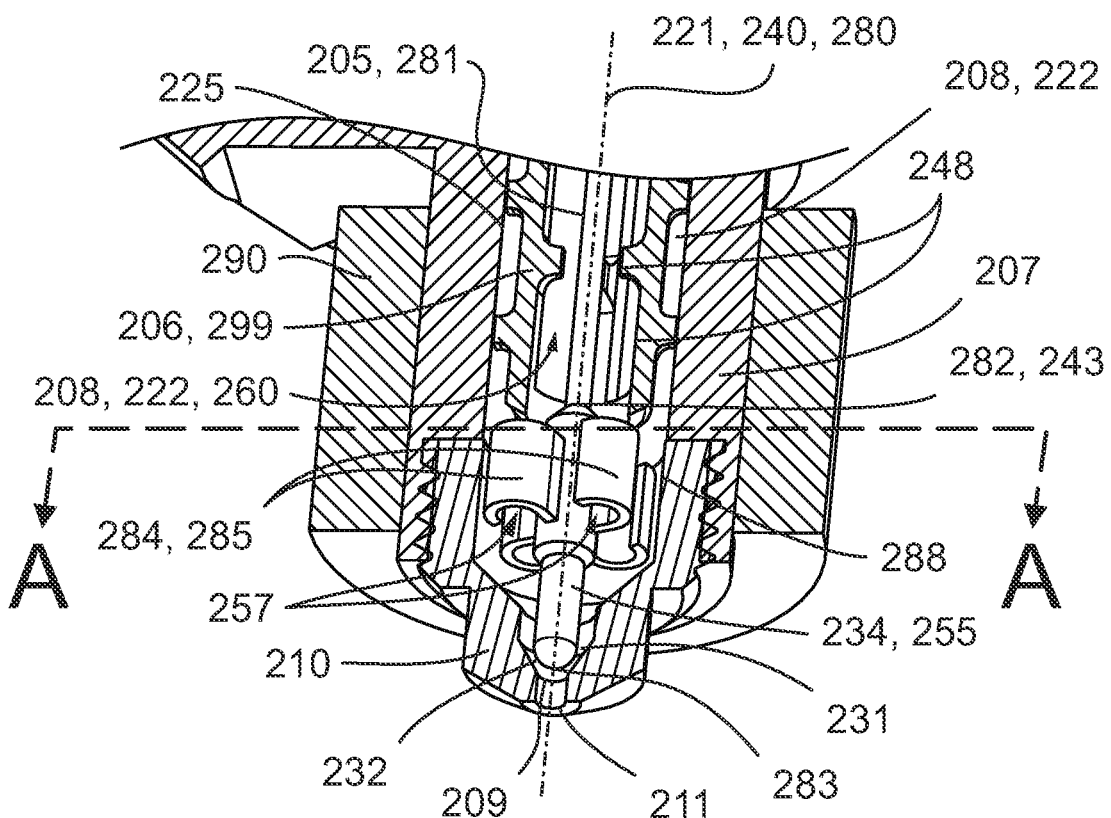
FIG. 22A shows an isometric partial sectional view of an exemplary embodiment of an extruder comprising a control valve with a valve tip having stabilizing elements.

The control valve comprises at least one seat 209 constituted by one or more surfaces and/or edges at least partially defining the boundary of the flow passage 231. The control valve further comprises at least one movable member operably connected to at least one actuator 216 such that the states of the control valve are varied by moving the at least one movable member by the at least one actuator 216. The movement of the movable member could be translated into changes in the cross-sectional area, contour, curvature, or other parameters of the flow passage 231 of the control valve to achieve the desired flow control. The seat 209 may be formed by a separate part or assembly unit of the extruder, such as a seat ring or a seat insert 239. It may also be formed by already discussed parts of the extruder, such as the nozzle 210, the breaker plate 213, the mixing chamber 207, or the barrel 201. For example, as shown in FIGS. 3 and 22A, the seat 209 may be an inner surface of the nozzle 210. As another example, as shown in FIG. 11, the seat 209 may be a surface of a seat insert 239 coupled to the nozzle 210. As yet another example, the seat 209 may be an edge of the inner surface of the nozzle 210 as shown in FIGS. 4-10, 12-21, and 23-35. The control valve may also include additional features such as sensors, controllers, or other components that enable the control valve to function effectively.

Examples of the actuator 216 may include a linear actuator and a rotary actuator. Without limitation, the actuator 216 may be an electric actuator powered by a motor or solenoid, a piezoelectric actuator, a magnetic actuator, a pneumatic actuator, a hydraulic actuator, and combinations thereof. The actuator 216 may be connected to the control system of the 3D printing system that may be also connected to the positioning system of the 3D printing system configured to create a relative motion of the extruder relative to the build surface (shown in FIG. 1). The control valve may be used to adjust the flow of the stream from the outlet 211 depending on the position of the nozzle 210 relative to the build surface. For example, the control valve may be configured to stop the flow before the extruder performs a travel move during the 3D printing process.

The control valve further comprises one or more surfaces and/or edges at least partially defining the boundary of the flow passage 231 such that the form of the flow passage 231 is defined by positions and/or orientations of said surfaces and/or edges relative to the seat 209. In this document, a combination of position and orientation of a first body relative to a second body is referred to as a pose of the first body relative to the second body. Said surface or edge is further referred to as a sealing surface 232. The pose of the sealing surfaces 232 relative to the seat 209 may be varied by moving the at least one movable member of the control valve by the actuator 216. The sealing surface 232 and the seat 209 may define the flow passage 231 therebetween as shown in FIGS. 3-35. The sealing surface 232, when in contact with the seat 209, may provide a sealing preventing a stream from flowing through the flow passage 231. The sealing surface 232 may comprise an edge which, when in contact with the seat 209, may provide a sealing preventing a stream from flowing through the flow passage 232. In embodiments, a state of the control valve where the sealing surface is at a maximum minimum distance to the seat 209 may correspond to the fully open state of the control valve and a state of the control valve where the sealing surface 232 rests against the seat 209 may correspond to the fully closed state of the control valve.

The movable member of the control valve may comprise a valve stem 205 having a longitudinal axis (further referred to as a valve stem axis 240). The valve stem 205 is mounted for linear movement along the valve stem axis 240 and/or for rotation about the valve stem axis 240. The valve stem 205 may have a proximal end 243 (closer to the seat 209) and a distal end 242 (farther from the seat 209) along the valve stem axis 240. The valve stem 205 may comprise one or more members connected together such that the connection transfers the linear and/or the rotational movement from one member to another member. In embodiments, the valve stem 205 may comprise one or more rigid portions or members such as a needle, a plunger, a poppet, a stem, a rod, a shaft, or the like. In embodiments, the valve stem 205 may comprise one or more flexible portions or members such as a wire, a tendon, a torsion, a cable, a spring, or the like. In some embodiments, the sealing surface 232 may be defined by the valve stem 205. For example, as shown in FIGS. 4-8, 18, 20, 25, 27A, 27B, and 29-32, the valve stem 205 may comprise a needle 244 having a generally cylindrical shape extending along the valve stem axis 240 and having a tapered or rounded tip defining the proximal end 243 and the sealing surface 232.

An extruder of the present invention may comprise a plurality of the valve stems 205. For example, a plurality of the valve stems 205 may be partially disposed within a single void 260. In embodiments comprising a plurality of the mixing rotors 206, two or more of the mixing rotors 206 may have the void 260 extending along the rotational axis 221 thereof. The valve stems 205 may be further partially disposed within the separate voids 260. For example, two mixing rotors 206 may be disposed laterally adjacent to each other. Each mixing rotor 206 may have a longitudinally extending through hole with the valve stem 205 partially disposed axially therein. The valve stems 205 may be coupled to a valve tip 234 as discussed below.

An extruder of the present invention may comprise a valve tip 234 defining the sealing surface 232. The valve tip 234 may be made as a portion of a member selected from a group consisting of: the valve stem 205 (best shown in FIGS. 18 and 20), the stator 262; and/or made as separate part or assembly unit operably connected to the at least one movable member of the control valve. In some embodiments, the valve tip 234 may be operably connected to at least one member of the valve stem 205 (possibly not directly but through another member of the valve stem 205) such that the connection transfers the linear and/or the rotational movement from the member to the valve tip 234.

The mixing rotor 206 may comprise a void 260 (best shown in FIGS. 5-7, 9-27B, and 29) extending along the rotational axis 221 of the mixing rotor 206 from the distal end 254 of the mixing rotor 206 to the proximal end 249 of the mixing rotor 206, the void 260 formed symmetrically around the rotational axis 221 and not intersecting the mixing rotor 206 during its rotation about the rotational axis 221 (note that the mixing rotor 206 may define a larger void comprising the void 260). The void 260 may comprise one or more cavities or through holes formed in the mixing rotor 206 extending along the rotational axis 221. A portion or the whole volume of the void 260 may be defined by one or more inwardly facing surfaces 248, for example, as shown in FIGS. 5-7, 9-27B, and 29.

Figure 13:
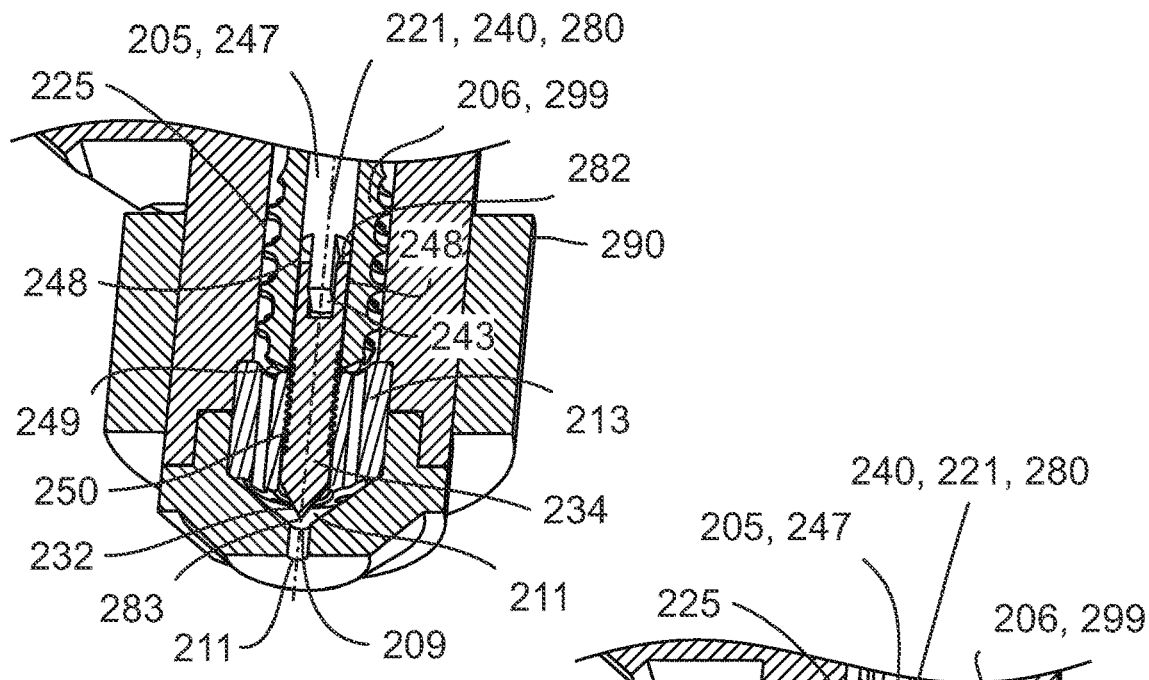

In one set of embodiments of an extruder of the present invention, the valve stem 205 may include a portion disposed in the void 260 of the mixing rotor 206 and extending along the valve stem axis 240. The valve stem axis 240 may be positioned parallel to the rotational axis 221. More preferably, the valve stem axis 240 may coincide with the rotational axis 221, for example, as shown in FIGS. 3, 5-27B, and 29. The valve stem 205 may be mounted for linear movement reciprocally with respect to the valve stem axis 240 and through the void 260. Alternatively, or in addition, the valve stem 205 may be mounted for rotation around the valve stem axis 240, as shown in FIG. 13. One or both ends of the valve stem 205 along the valve stem axis 240 may be disposed within the void 260, as shown in FIGS. 5-12, 14-27B, and 29. The valve tip 234 may be further operably connected to at least one member of the valve stem 205 (possibly not directly but through another member of the valve stem 205) such that the connection transfers the linear and/or the rotational movement from the member to the valve tip 234. In such embodiments, the valve tip 234 made as a separate part or assembly unit should be understood not to be a member of the valve stem 205 but to be a separate member of the control valve if the at least one member of the valve stem 205 operably connected to the valve tip 234 comprises a portion disposed within the void 260 and extending along the valve stem axis 240.

Figure 5:
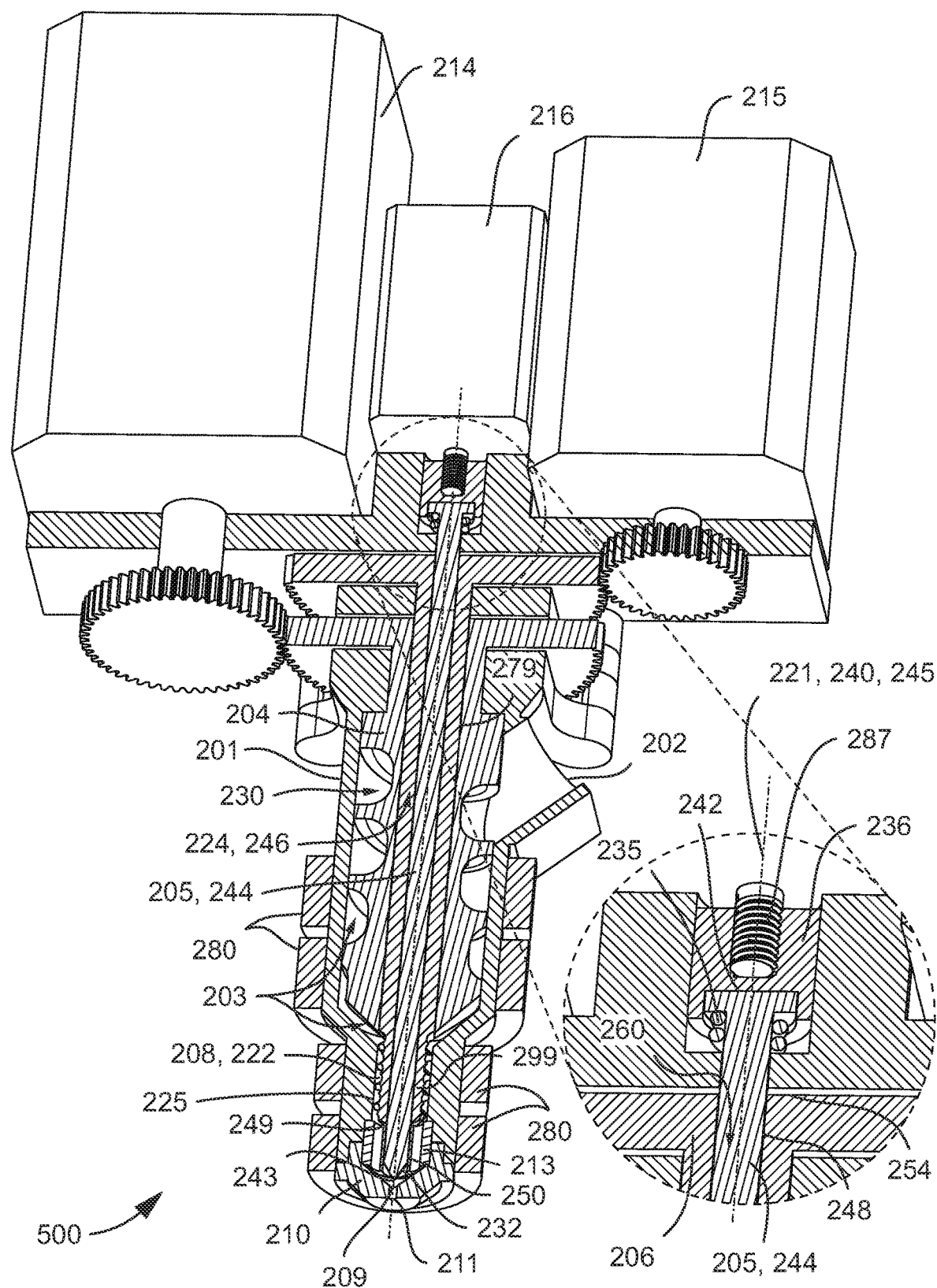
FIG. 5 shows an isometric partial sectional view of an exemplary embodiment of an extruder comprising a mixing rotor and a control valve.

The void 260 may comprise one or more through holes formed in the mixing rotor 206 and extending coaxially with the rotational axis 221. A portion or the whole volume of the through hole may be defined by the inwardly facing surfaces 248, for example, as shown in FIGS. 5 and 7. The valve stem 205 may have a portion extending within the through hole coaxially with respect to the rotational axis 221. This portion may have an outwardly facing outer surface and one or more grooves 241 extending helically with respect to the rotational axis 221 as shown in FIG. 7. Alternatively, or in addition, the inwardly facing surface 248 of the mixing rotor 206 facing the outwardly facing surface of the valve stem 205 may define one or more grooves extending helically (clockwise or anticlockwise) with respect to the rotational axis 221. In embodiments with the grooves 241 formed in the outwardly facing surface of the valve stem 205, the valve stem 205 may be mounted with rotation restriction about the rotational axis 221 in direction of the weaving of the grooves 241 (clockwise or anticlockwise respectively) viewed from the distal end 242 of the valve stem 205. In embodiments with the grooves formed in the inwardly facing surface 248, the valve stem 205 may be mounted with rotation restriction about the rotational axis 221 in a direction opposite to the direction of weaving of the grooves (respectively anticlockwise or clockwise) viewed from the distal end 242 of the valve stem 205. When the mixing rotor 206 rotates in the direction of the restriction, the restriction results in relative rotation of the inwardly facing surface 248 about the valve stem 205. This relative rotation may result in drag pumping of a polymeric melt, which seeps between the outwardly facing surface of the valve stem 205 and the inwardly facing surface 248 under the action of pressure outside the through hole within the polymer processing space 203. The drag pumping may generate pressure opposing the pressure outside the though hole 248 thereby providing a seal to prevent the polymeric melt from leaking further outside the polymer processing space 203 between the valve stem 205 and the inwardly facing inner surface 248. In embodiments, the valve stem 205 may be mounted to move reciprocally and coaxially with respect to the rotational axis 221. In such embodiments, the inwardly facing surface 248 and the outwardly facing surface of the valve stem 205 may have generally cylindrical shapes coaxially extending along the rotational axis 221. In embodiments, the valve stem 205 may be mounted for rotation about the rotational axis 221. In such embodiments, the inwardly facing surface 248 and the outwardly facing surface of the valve stem 205 may have generally cylindrical or conical shapes coaxially extending along the rotational axis 221 and contoured to conform each other.

In one set of embodiments of an extruder of the present invention where the extruder comprises the static mixer 275 instead of or in addition to the mixing rotor 206, the valve stem 240 may include a portion disposed within a void 277 and extending along the valve stem axis 240. The valve stem 205 may be mounted for linear movement reciprocally with respect to the valve stem axis 240 and through the void 277 of the static mixer 275 (best shown in FIGS. 30 and 31). Alternatively, or in addition, the valve stem 205 may be mounted for rotation around the valve stem axis 240. The valve tip 234 may be further operably connected to at least one member of the valve stem 205 (possibly not directly but through another member of the valve stem 205)—such that the connection transfers the linear and/or the rotational movement from the member to the valve tip 234. In such embodiments, the valve tip 234 made as a separate part or assembly unit should be understood not to be a member of the valve stem 205 but to be a separate member of the control valve if at least one member of the valve stem 205 operably connected to the valve tip 234 comprises a portion extending along the valve stem axis 240 and disposed within at least one void selected from: the void 260 of the mixing rotor 206, the void 277 of the static mixer 275.

Figure 33:
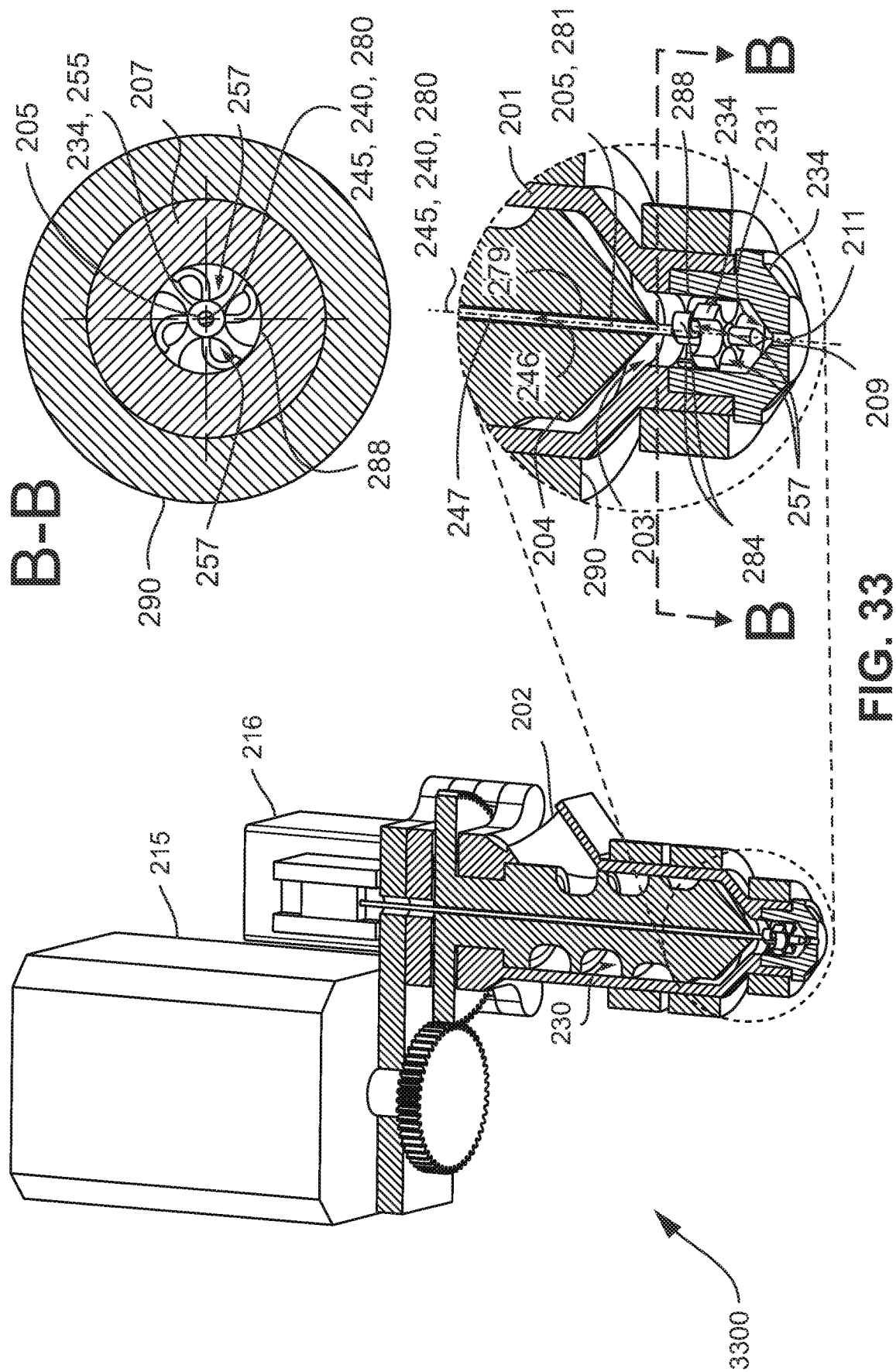
FIG. 33 shows an isometric partial sectional view of an exemplary embodiment of an extruder comprising a control valve with a valve tip and shows a cross-sectional view of the embodiment in accordance with section line B-B.

In one set of embodiments of an extruder of the present invention where the extruder comprises a screw extrusion mechanism, the valve stem 205 may include a portion disposed in the through hole 246 of the screw 204 and extending along the valve stem axis 240. The valve stem axis 240 may be positioned parallel to the rotational axis 245 of the screw 204. More preferably, the valve stem axis 240 may coincide with the rotational axis 245, for example, as shown in FIGS. 31-33. The valve stem 205 may be mounted for linear movement reciprocally with respect to the valve stem axis 240 and through the through hole 246. Alternatively, or in addition, the valve stem 205 may be mounted for rotation about the valve stem axis 240. The valve tip 234 may be further operably connected to at least one member of the valve stem 205 (possibly not directly but through another member of the valve stem 205) such that the connection transfers the linear and/or the rotational movement from the member to the valve tip 234. In such embodiments, the valve tip 234 made as a separate part or assembly unit should be understood not to be a member of the valve stem 205 but to be a separate member of the control valve if the at least one member of the valve stem 205 operably connected to the valve tip 234 comprises a portion extending along the valve stem axis 240 and disposed within at least one void selected from: the void 260 of the mixing rotor 206, the void 277 of the static mixer 275, the through hole 246 of the screw 204).

The valve stem 205 may comprise a rod 247 (best shown FIGS. 10-17, 19, 23, and 26) extending along the valve stem axis 240, the rod 247 may be rigidly connected to the valve tip 234. The valve stem 205 may comprise a rod 247 connected to a flexible element 281, such as a wire or cable. The flexible element 281 may be further connected to the valve tip 234, defining the sealing surface 232 (best shown in FIGS. 16 and 17). The valve stem 205 may include a rod 247 connected to the valve tip 234 with a ball joint 259 (best shown in FIG. 23). The valve stem 205 may consist of the flexible element 281 connected to the valve tip 234 (best shown in FIGS. 9, 21 and 22A). The valve stem 205 may be operably connected to the actuator 216. The valve stem 205 may be further moved by the actuator 216 such that a portion or at least one member of the valve stem 205 is moved linearly along the valve stem axis 240 between a first position and a second position through at least one void selected from: the void 260 of the mixing rotor 206, the void 277 of the static mixer, the through hole 246 of the screw 204. As shown in FIGS. 5-8, 10-12, 25, 27A-27B, and 29, in the second position and, optionally, in the first position, a portion of the valve stem 205, including the proximal end 243 of the valve stem 205, may protrude from the proximal end 249 of the mixing rotor 206. Alternatively, the proximal end 243 of the valve stem 205 may be contained within the void 260 in the second and in the first position, as shown in FIGS. 13-15, and 19.

An extruder of the present invention may further comprise a void or through hole 250 extending along the valve stem axis 240 and formed in one or more of the following: the breaker plate 213 (FIGS. 5-9, 10-17, 21, 23, 29, 32, and 34), the nozzle 210 (FIGS. 25, 26, 27A, 27B, and 30), the mixing chamber 207 (FIG. 20), control valve body 226, or the stator 262. The valve stem 205 may further include a portion disposed within the void or through hole 250 (best shown in FIGS. 5-8, 10-12, 25, 27A, 27B, 29, 30, and 32). The valve stem 205 may be further mounted for linear movement along the valve stem axis 250 and through the void or through hole 250 (best shown in FIGS. 5-8, 10-12, 25, 27A, 27B, 29, 30, and 32).

Figure 6:
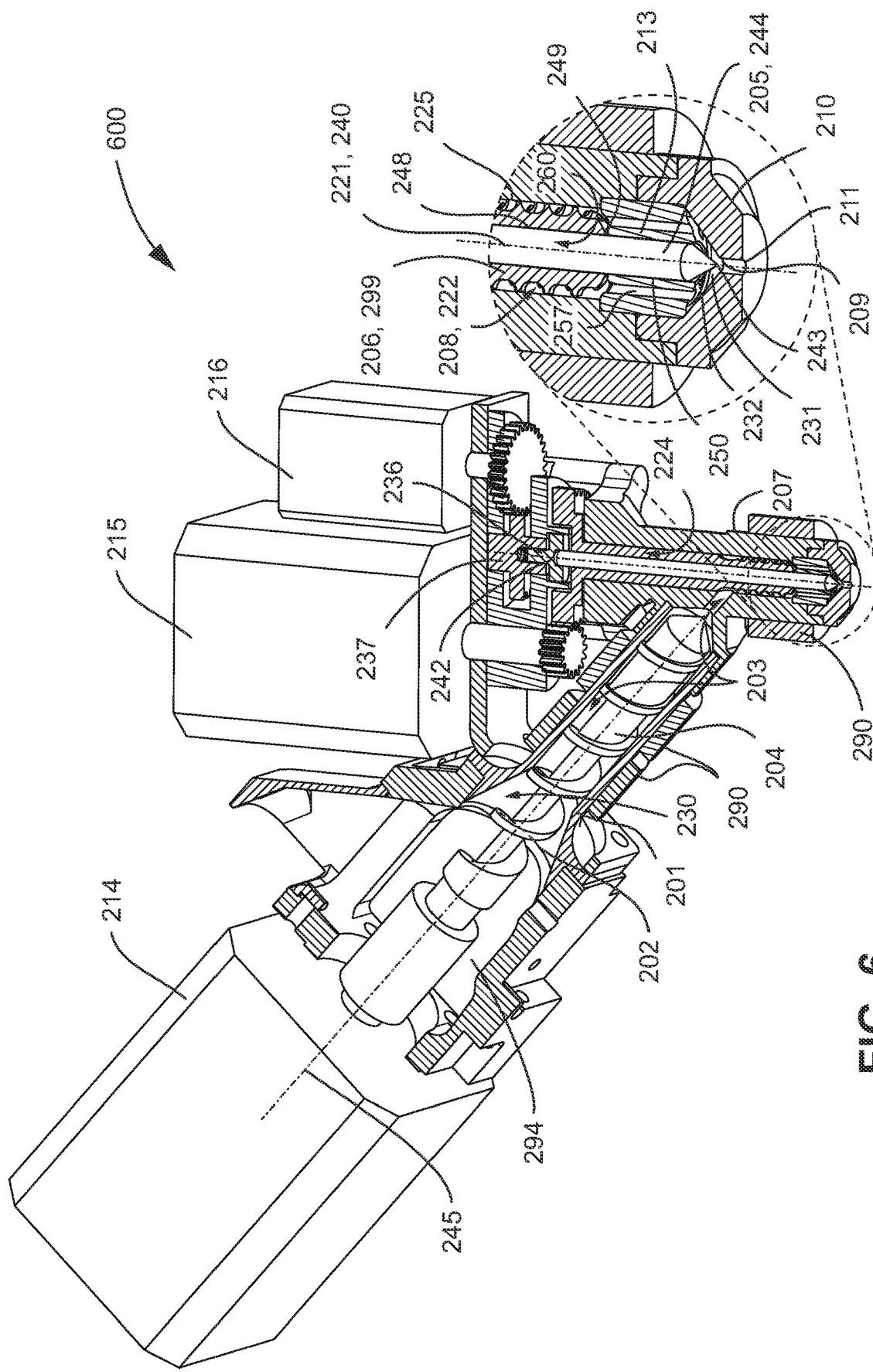
FIG. 6 shows an isometric partial sectional view of an exemplary embodiment of an extruder comprising a mixing rotor and a control valve.

The valve stem 205 may be mounted for linear movement along the valve stem axis 240. The valve stem 205 may have a generally cylindrical portion having a threaded outer surface 238 engaging a threaded inner surface of an annular member 237 surrounding the portion. The annular member 237 may be mounted for rotation about the valve stem axis 240 and may be rotated by a rotary actuator 216 to thereby impart the linear movement to the valve stem 205 through such engagement. As another example, as shown in FIGS. 5 and 6, the valve stem 205 may be moved by a member 236 engaging the valve stem 205 and mounted for linear movement along the valve stem axis 240. The member 236 may be moved by a rotary actuator 216, for example, by using a threaded engagement with a threaded inner surface of an annular member 237 rotated by the actuator 216 as shown in FIG. 6, or with a threaded outer surface of a screw member 287 rotated by the actuator 216 as shown in FIG. 5. Movement of the member 236 imparts the linear movement to the valve stem 205 by pushing or pulling the valve stem 205 along the valve stem axis 240 through the engagement with the valve stem 205. The valve stem 205 may be moved directly by a linear actuator 216. For example, the valve stem 205 may be coupled to a rod of the linear actuator 216, the linear actuator 216 configured to move the rod along the valve stem axis 240 to impart the linear movement to the valve stem 205. The actuator 216 may be a piezoelectric actuator engaged with the valve stem 205 and configured to expand and contract along the valve stem axis 240 to impart the linear movement to the valve stem 205. In some embodiments, the valve stem 205 may be a rod member of a linear actuator 216 configured for linear movement along the valve stem axis 240.

The valve stem 205 and/or the valve tip 234 may be spring-loaded such that the valve stem 205 is moved in one or both directions of the linear movement against a spring 235 engaging the valve stem 205. For example, as shown in FIGS. 12, 14, 15, and 17, the spring 235 may be disposed around the valve tip 205 having a radial extension engaging the spring 235. As shown in FIG. 5, the spring 235 may be disposed around the valve stem 205 having a radial extension engaging the spring.

In addition to the linear movement along the valve stem axis 240, the valve stem 205 may be mounted to be freely rotatable about the rotational axis 221 in one or both directions. For example, the valve stem 205 may be mounted coaxially with respect to the rotational axis 221 and without restriction to rotate in the direction of rotation of the mixing rotor 206 about the rotational axis 221. In this case, the rotation of the mixing rotor 206 may result in the rotation of the valve stem 205 about the rotational axis 221. Alternatively, the valve stem 205 may be mounted with rotation restriction about the rotational axis 221 in one or both directions. For example, the valve stem 205 may be mounted for the linear movement along the valve stem axis 240 with rotation restriction about the rotational axis 221 in one or both directions, wherein the valve stem 205 is slidably coupled to a restricting member 300 promoting the linear movement while restricting the rotation in one or both directions (best shown in FIG. 7). A spline coupling between the valve stem 205 and the restricting member may be employed for this purpose.

Alternatively, or in addition to the linear movement of the valve stem 205 along the valve stem axis 240, the valve stem 205 may be rotated by the actuator 216 about the valve stem axis 240. The valve stem 205 may be rotated by the actuator 216 through an engagement with a separate rotating member. The valve stem 205 may be rotated directly by a rotary actuator 216. For example, the valve stem 205 may be coupled to a shaft of the rotary actuator 216, the rotary actuator 216 configured to rotate the shaft about the valve stem axis 240 to impart the rotary movement to the valve stem 205. In embodiments, the valve stem 205 may have a portion having a threaded outer surface 238 engaging a threaded inner surface of an annular member surrounding the portion and mounted with rotation restriction about the valve stem axis 240. The valve stem 205 may be rotated by the actuator 216 about the valve stem axis 240 while said engagement results in simultaneous linear movement of the valve stem 205 along the valve stem axis 240.

In general, any actuator 216 and coupling of the actuator 216 to the valve stem 205 can be used for moving the valve stem 205 along the valve stem axis 240 and/or about the valve stem axis 240 as long as it provides a controlled linear and/or rotational movement of the valve stem 205.

Figure 14:
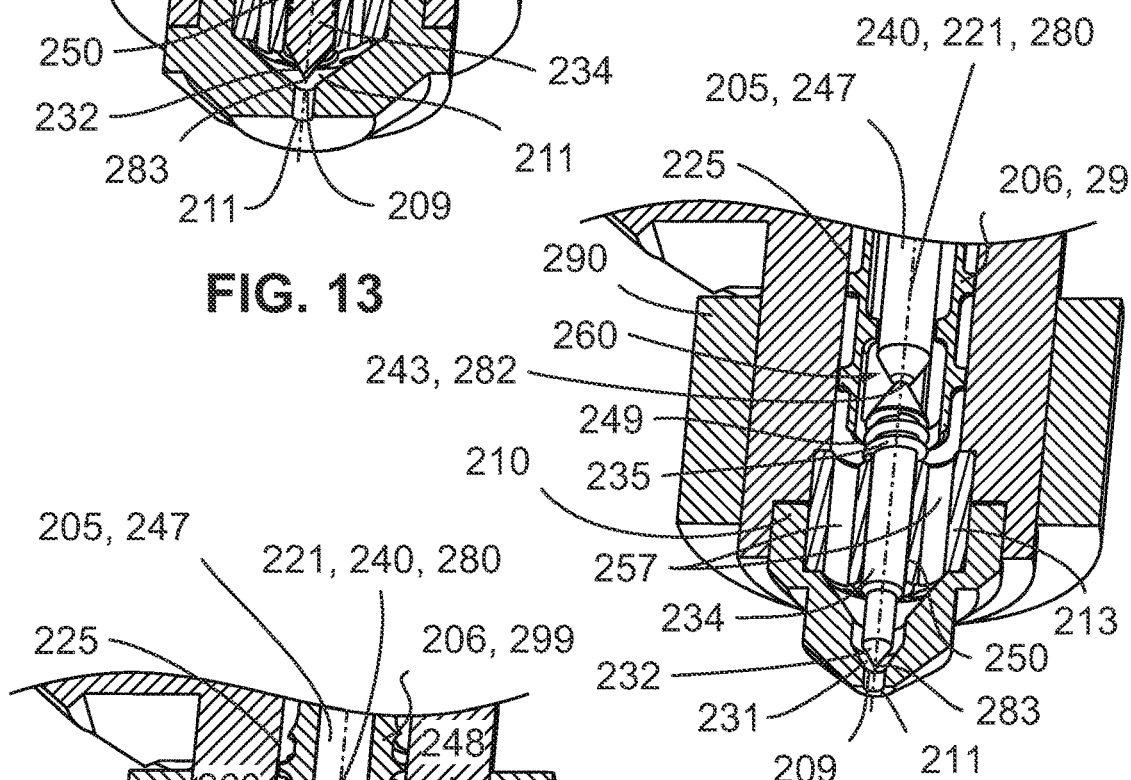
Figure 15:
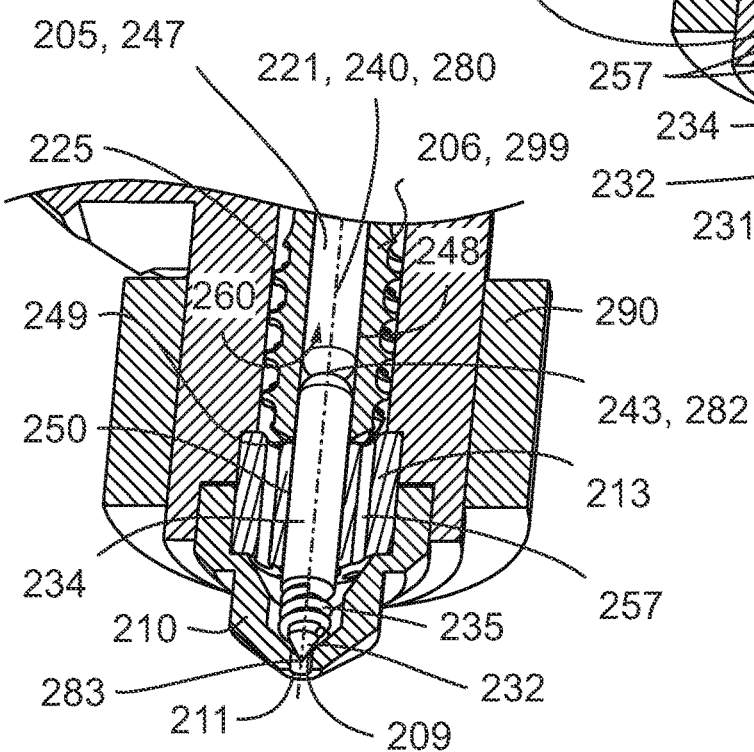
Figure 16:
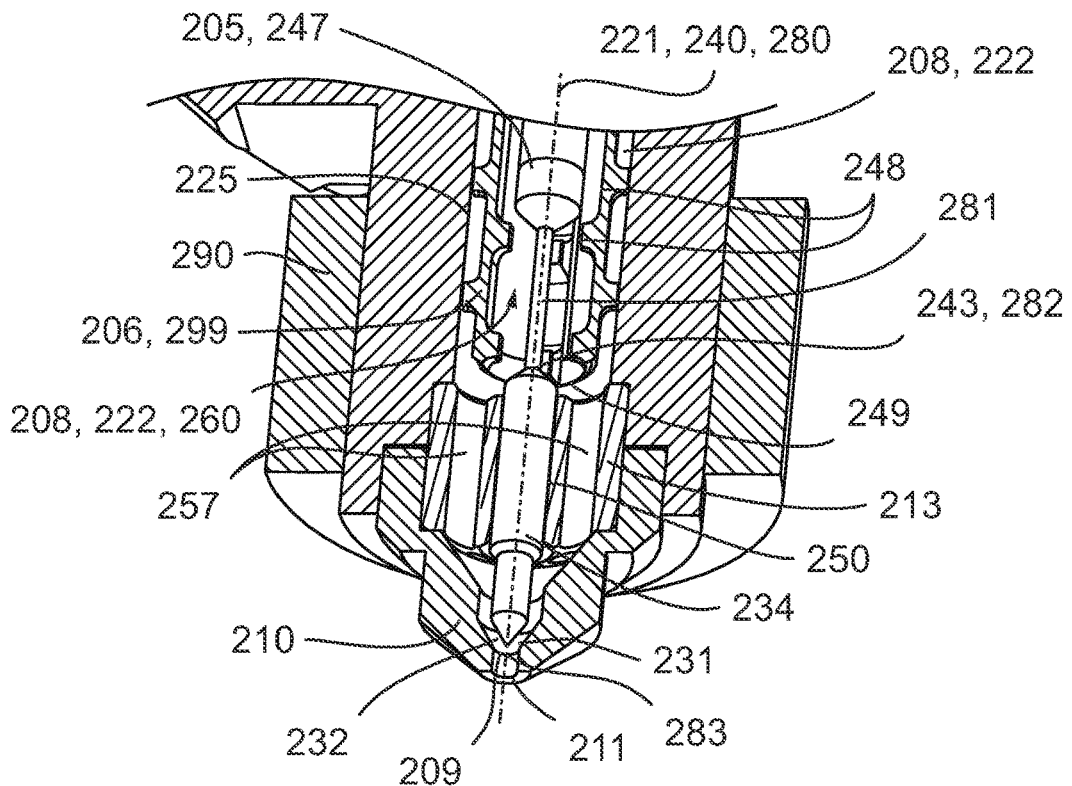
Figure 17:
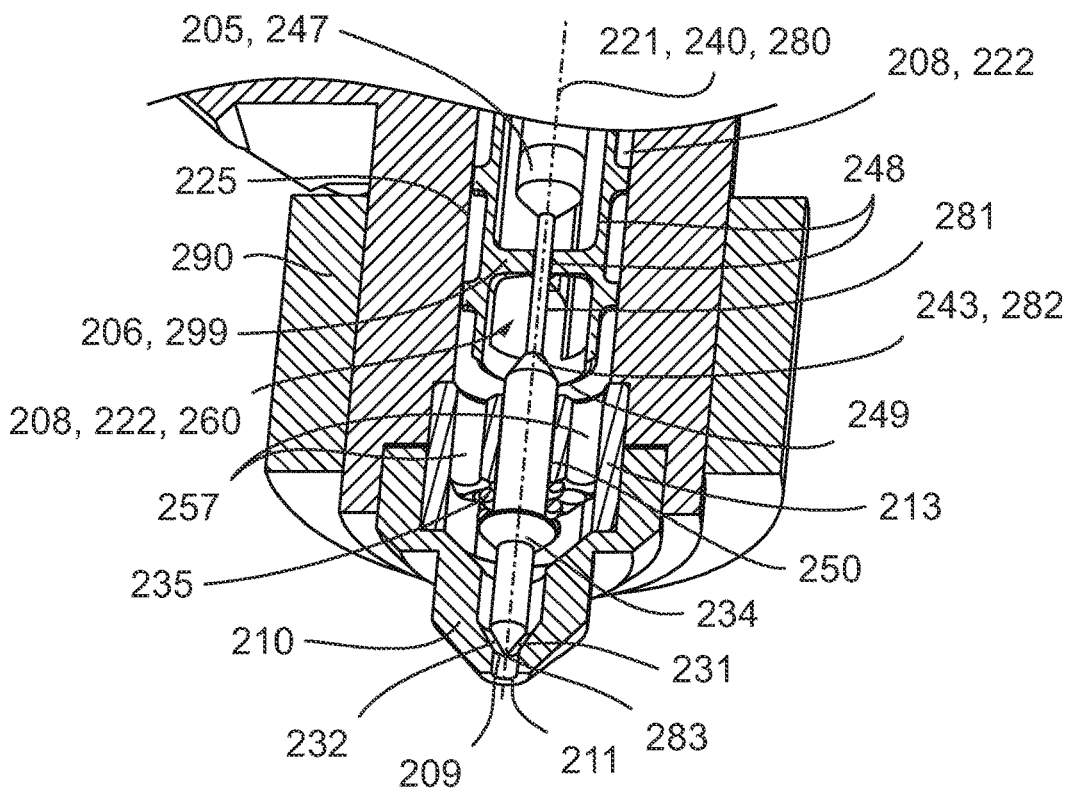
Figure 23:
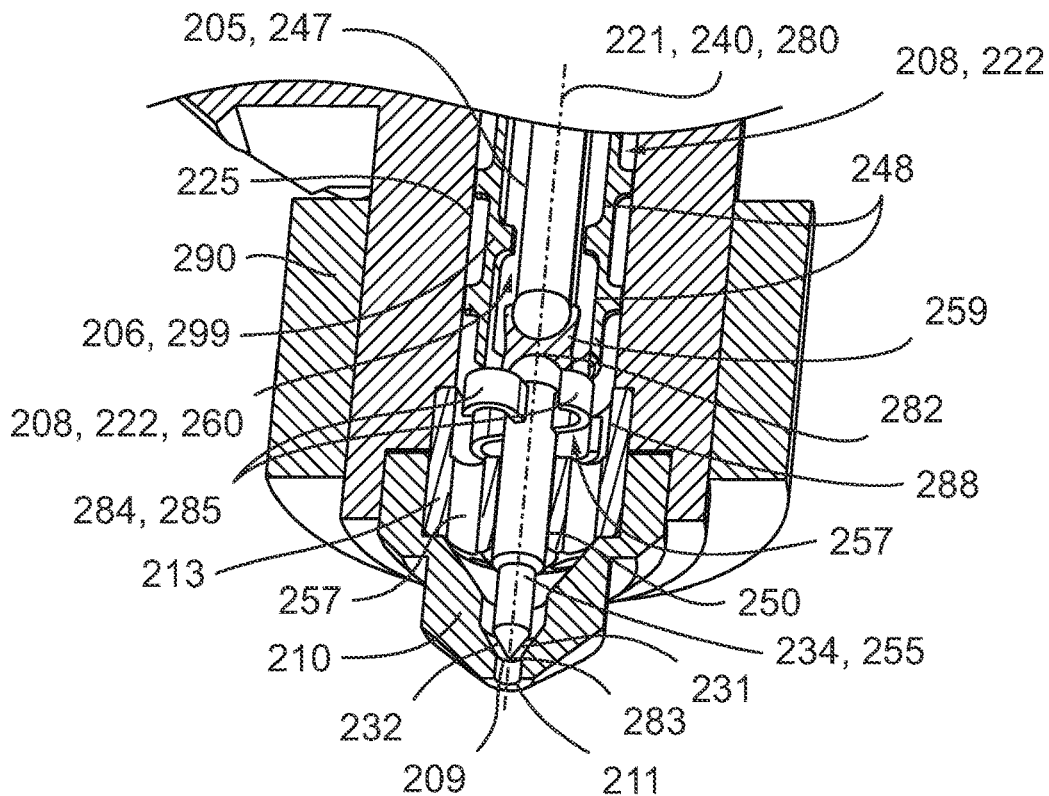
FIG. 23 shows an isometric partial sectional view of an exemplary embodiment of an extruder comprising a control valve with a valve stem connected to a valve tip with a ball joint.

The valve tip 234 may be welded, soldered, glued or otherwise permanently attached to the valve stem 205, for example, as shown in FIGS. 9, 16, 17, 21, 22A, 24, and 33. The valve tip 234 may be threadly coupled to the valve stem 205, for example, as shown in FIGS. 10-12, 19, and 26. The valve tip 234 may be connected to a member of the valve stem 205 with a flexible member 281 such as a wire or cable, for example, as shown in FIGS. 16 and 17. The valve tip 234 may touchingly engage the valve stem 205, for example, as shown in FIGS. 13-15. The valve tip 234 may be connected to the valve stem 205 with a ball joint 259, for example, as shown in FIG. 23.

The valve tip 234 may be operably connected to the actuator 216 through the valve stem 205 and may be moved by the valve stem 205. In embodiments, the valve tip 234 may be moved linearly by the valve stem 205 along the valve stem axis 240 as shown in FIGS. 9-12, 14-24, 26, and 33. The valve tip 234 may be moved linearly along the valve stem axis 240 through the void or through hole 250, as shown in FIGS. 9-12, 14-17, 20, 21, 23, 25, and 26. Alternatively, or in addition, the valve tip 234 may be rotated by the valve stem 205 about the valve stem axis 240 (best shown in FIG. 13). For example, the valve tip 234 may have a threaded outer surface engaging a threading formed in the inner surface of the void or through hole 250, such that the rotation of the valve tip 234 causes simultaneous linear moment thereof along the valve stem axis 240 (best shown in FIG. 13). In general, any coupling between the valve tip 234 and the valve stem 205 may be employed as long as it provides the transfer of linear and/or rotational motion from the actuator 216 to the valve tip 234.

In embodiments, the valve tip 234 may have a longitudinal axis 280 and may further have a distal end 282 and a proximal end 283 along the longitudinal axis 280 (relative to the seat 209). The longitudinal axis 280 may coincide with the valve stem axis 240 or extend parallelly to the valve stem axis laterally offset. Alternatively, the longitudinal axis may extend in direction transverse to the valve stem axis 240. The valve tip 234 may have a portion having a generally circular transverse peripheral profile. For example, the valve tip 234 may have a generally cylindrical or conical shape extending along the longitudinal axis 280. The valve tip 234 may have a portion along the longitudinal axis 280 with a faceted transverse peripheral profile comprising one or more straight segments defining one or more planar outer surfaces. The valve tip 234 may be further slidably mounted in a hole having inner planar surfaces facing said planar outer surfaces. The hole may be formed in the breaker plate 213, in the mixing chamber 207, in the nozzle 210, in the control valve body 226, or in another assembly unit of an extruder of the present invention. The valve tip 234 may be further slidably mounted in the hole such that said planar outer surfaces engage with said inner planar surfaces. For example, the hole and the valve tip 234 may form a spline coupling, where the valve tip 234 defines one or more ridges engaging grooves formed in the inner surface of the hole. The valve tip 234 may have a portion along the longitudinal axis 280 having a transverse peripheral profile comprising a circular arc with respect to the longitudinal axis 280. It may further include a straight or curved segment such that the minimum distance from the longitudinal axis 280 to this straight or curved segment is less than the radius of the circular arc. The surface is defined by the straight or curved segments belonging to the sealing surface 232. The valve tip 234 is mounted for rotation about the longitudinal axis 280 such that the form of the flow passage of the control valve is defined by the angular position of the surface. The valve tip 234 may have a generally spherical or hemispherical shape. For example, instead of the spring-loaded generally elongated valve tip 234 depicted in FIG. 15, a spring-loaded ball touchingly engaging the valve stem 205 may be employed.

Figure 18:
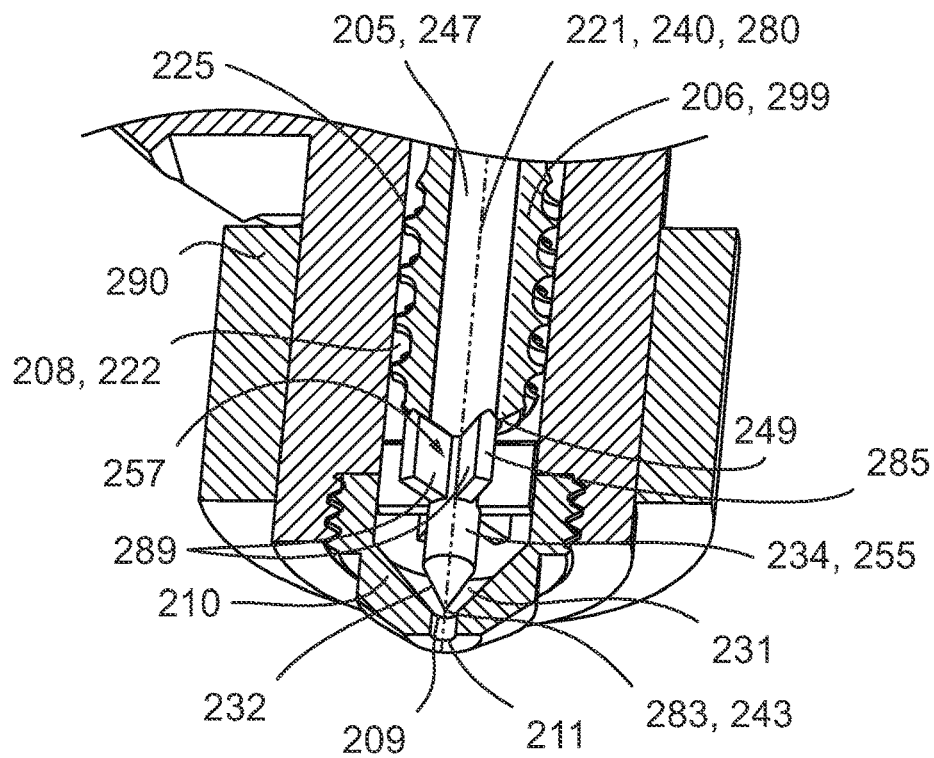
Figure 19:
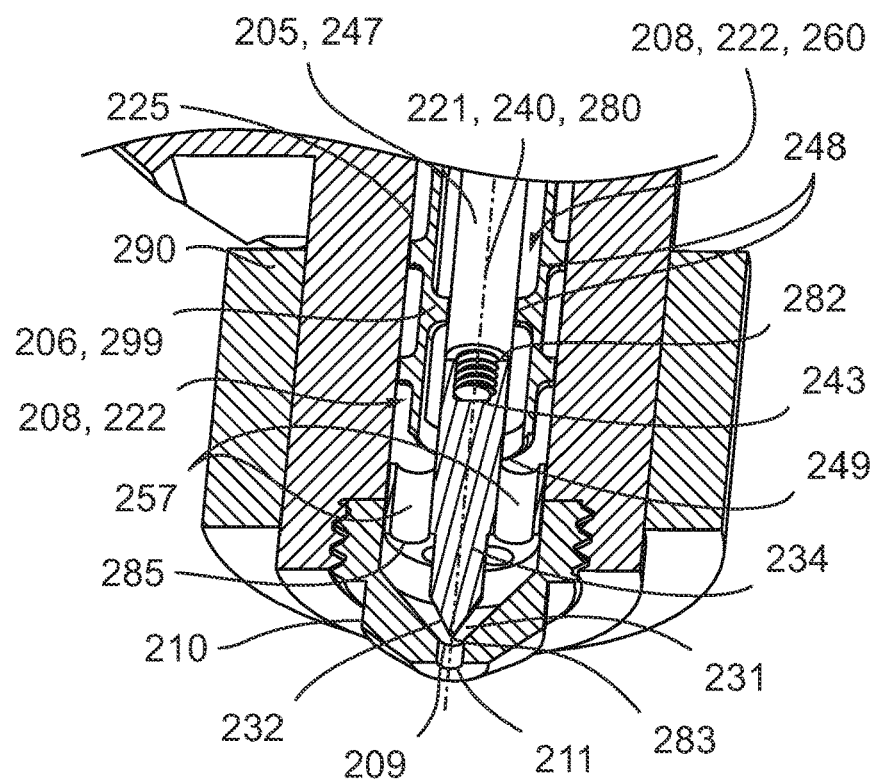
Figure 20:
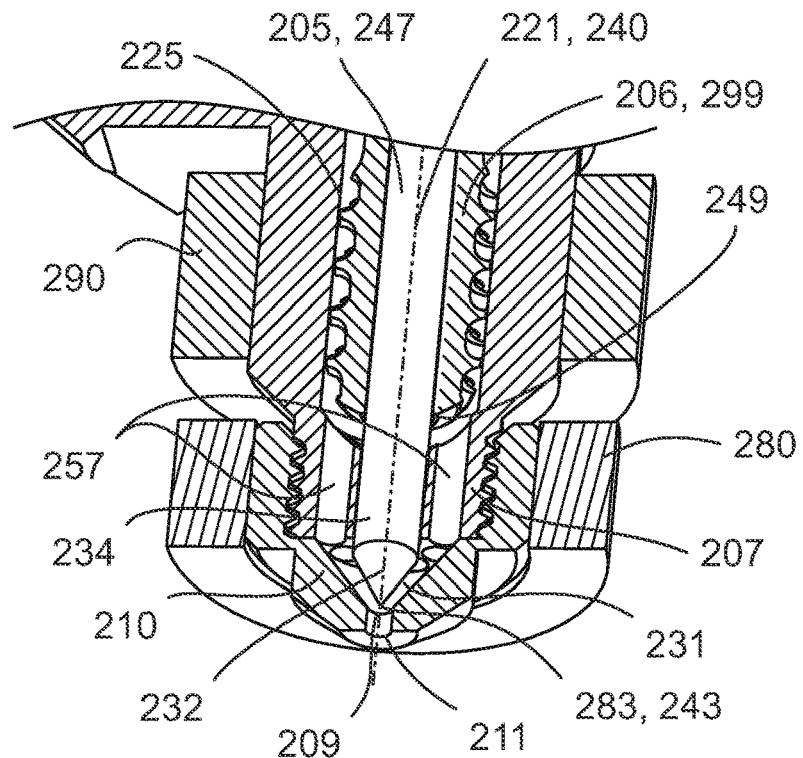
Figure 22B:
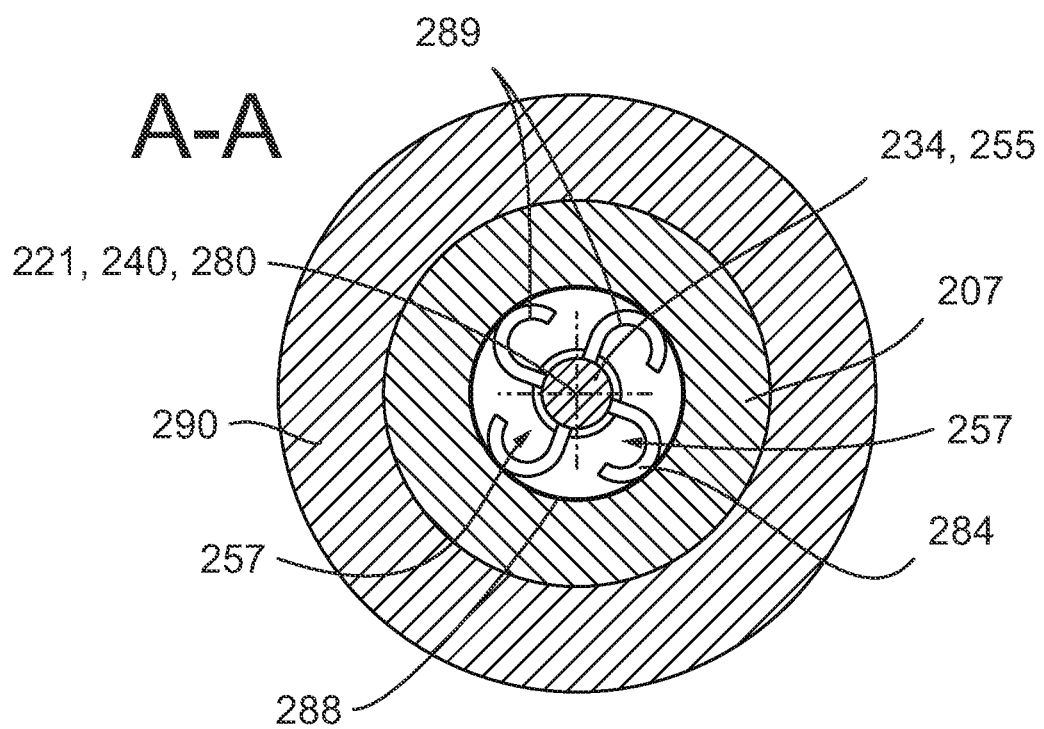
FIG. 22B shows a cross-sectional view of the exemplary embodiment of the extruder shown in FIG. 22A in accordance with section line A-A of FIG. 22A.
Figure 24:
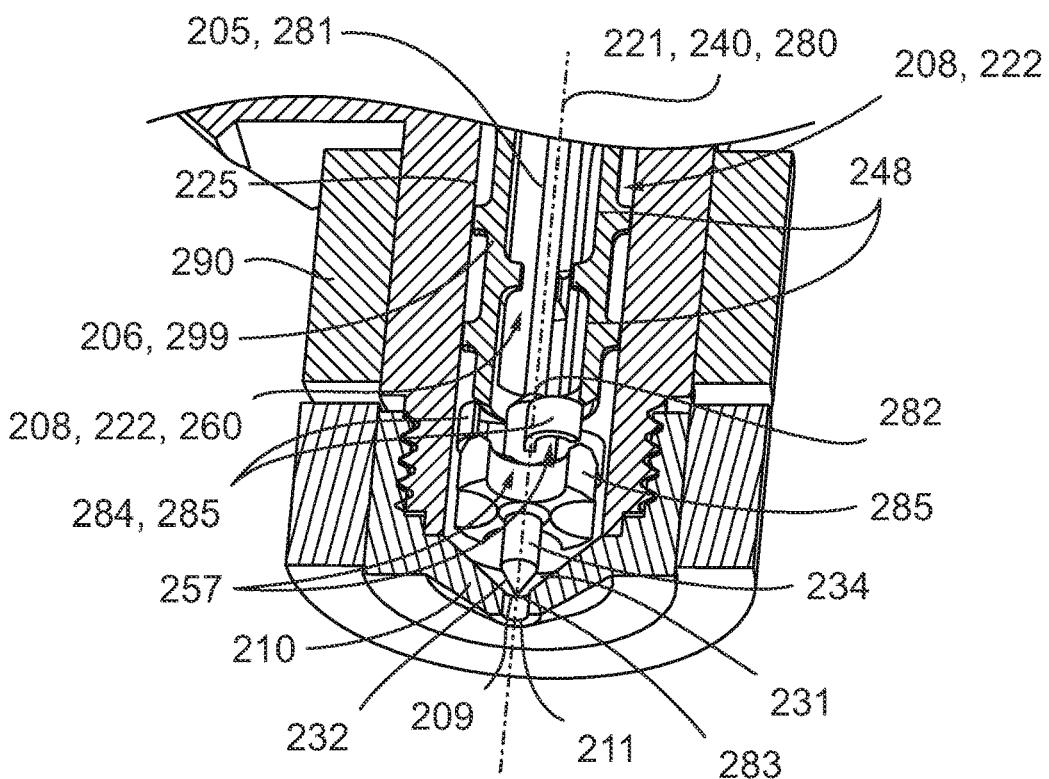
FIG. 24 shows an isometric partial sectional view of an exemplary embodiment of an extruder comprising a control valve with a valve tip having stabilizing elements.

In embodiments, the valve tip 234 may comprise a longitudinal portion 255 extending along the longitudinal axis 280 and may further comprise one or more transverse portions 285 extending transversely from the longitudinal portion 255 and arranged circumferentially around the longitudinal axis 280. The transverse portions 285 may define one or more misaligned flow channels 257. In some embodiments, one or more misaligned flow channels 257 may be formed in the valve tip 234 (best shown in FIG. 19). Alternatively, or in addition, the valve tip 234 may define one or more surfaces 289 partially defining the misaligned flow channels 257 (best shown in FIGS. 18, 22A-24, and 33). As shown in FIG. 18, the misaligned flow channel 257 may be partially bounded by two neighboring surfaces 289. The longitudinal portion 255 may define the sealing surface 232. The transverse portions 285 may define stabilizing elements 284 configured to prevent the longitudinal portion 255 from unwanted movement relative to the seat 209, for example, because of the rotation of the mixing rotor 206. The stabilizing elements 284 may be arranged circumferentially around the longitudinal axis 280 and may engage the inner surface 288. The stabilizing elements 284 may extend outwardly towards the inner surface 288 and then, optionally, inwardly towards the longitudinal axis 280 (best shown in FIGS. 22B and 33). The stabilizing elements 284 may touchingly engage the inner surface 288. For example, the stabilizing elements 284 may extend along a path tangentially touching the inner surface 288 (best shown in FIGS. 22B and 33). The stabilizing elements 284 may further comprise a longitudinally extending surface defined by the path and touchingly engaging the inner surface 288. As best shown in FIG. 22B, in a transverse cross section of the valve tip 234 with respect to the longitudinal axis 280, the stabilizing elements 284 may extend along a curved path and tangentially touch the inner surface 288. The inner surface 288 may be an inner surface of the nozzle 210 as shown in FIGS. 22A-22B, and 33. The inner surface 288 may be an inner surface of the mixing chamber 207 as shown in FIG. 24. The inner surface 288 may be an inner surface of the breaker plate 213 as shown in FIG. 23. The stabilizing elements 280 may at least partially define one or more misaligned flow channels 257 as shown in FIGS. 22A-24, and 33. The stabilizing elements 284 may be made from a spring steel or another suitable metal by bending. The stabilizing elements 284 may be welded to the longitudinal portion 255 and/or inserted into slots (not shown) formed in the longitudinal 255 portion and extending along the longitudinal axis 280. The valve tip 234 may comprise a central longitudinal portion extending along the longitudinal axis and may further comprise one or more side portions extending longitudinally (not shown). The side portions may be laterally offset from the central longitudinal portion and connected to the central longitudinal portion by a transversely extending portion. The central longitudinal portion may define the sealing surface 232. The side portion may define a longitudinal stabilizing element configured to prevent the unwanted movement of the sealing surface 232 relative to the seat 209. The longitudinal stabilizing element may be slidably disposed in a hole. Such a hole may be formed in the breaker plate 213, in the mixing chamber 207, in the nozzle 210, in the control valve body 226, or in another assembly unit of an extruder of the present invention.

In general, any suitable shape of the valve tip 234 may be employed as long as it defines at least one sealing surface 232, and if it can be made as a portion of a member selected from a group consisting of: the valve stem 205, the stator 262; and/or can be coupled to the movable member of the control valve such that the sealing surface 232 can be moved with the movable member relative to the seat 209 using the coupling by the linear and/or rotational movement of the movable member. In embodiments, the control valve may be a ball control valve with the valve tip 234 being the ball of the ball control valve rotated by the stem of the ball control valve, the valve stem 205 being the stem of the ball control valve. In other embodiments, the control valve may be a butterfly control valve with the valve tip 234 being the disk of the butterfly control valve rotated by the stem of the butterfly control valve, the valve stem 205 being the stem of the butterfly control valve. In other embodiments, the control valve may be a membrane control valve with the valve tip 234 in the form of a membrane engaged to the valve stem 205.

In embodiments (best shown in FIGS. 13 and 15), the valve tip 234 may comprise a portion disposed within the void 260 of the mixing rotor 206 and extending coaxially with respect to the rotational axis 221. The portion of the valve tip 234 may have an outwardly facing outer surface facing the inwardly facing surface 248. In such embodiments, similar to the matter discussed above, the valve tip 234 portion may have one or more grooves 241 formed in the outwardly facing outer surface and extending helically with respect to the rotational axis 221. Alternatively, or in addition, the inwardly facing surface 248 of the mixing rotor 206 facing the outwardly facing surface of the portion of the valve tip 234 may define one or more grooves extending helically (clockwise or anticlockwise) with respect to the rotational axis 221. In embodiments with the grooves 241 formed in the outwardly facing surface of the portion, the valve tip 234 may be mounted with rotation restriction about the rotational axis 221 in direction of the weaving of the grooves (clockwise or anticlockwise respectively) viewed from the distal end 282 of the valve tip 234. In embodiments with the grooves formed in the inwardly facing surface 248, the valve tip 234 may be mounted with rotation restriction about the rotational axis 221 in direction opposite to the direction of weaving of the grooves (respectively anticlockwise or clockwise) viewed from the distal end 282 of the valve tip 234. In embodiments, the valve tip 234 may be mounted reciprocally and coaxially with respect to the rotational axis 221. In such embodiments, the inwardly facing surface 248 and the outwardly facing surface of the portion may have generally cylindrical shape coaxially extending along the rotational axis 221. In embodiments, the valve tip 234 may be mounted for rotation about the rotational axis 221. In such embodiments, the inwardly facing surface 248 and the outwardly facing surface of the portion may have generally cylindrical or conical shapes coaxially extending along the rotational axis 221 and contoured to conform to each other.

In embodiments, an annular member 272 may extend along the rotational axis 221 between the inwardly facing surface 248 of the mixing rotor 206 and the valve stem 205. The annular member 272 may be annularly disposed about the valve stem 205. The annular member 272 may be made as a single part or as an assembly unit, or it may comprise a plurality of members disposed circumferentially around the valve stem 205. For example, as shown in FIG. 25, the annular member 272 may have an inner surface facing the outer surface of the valve stem 205 and an outer surface facing the inwardly facing surface 248. There may be further a plurality of flow channels 271 formed by the outer surface of the annular member 272 and extending circumferentially with respect to the rotational axis 221. The flow channels 271 are separated by outwardly extending rings 273 formed by the outer surface of the annular member 272. The mixing rotor 206 may further have a plurality of annular rows of axially and circumferentially extending cavities 274 formed by the outer surface of the mixing rotor 206. The cavities 274 are disposed circumferentially around the rotational axis 221. The cavities 274 in the row are separated by outwardly extending generally longitudinal mixing elements 270 (best shown in FIG. 27B), with the rows separated by outwardly extending rings 266 formed by the outer surface of the mixing rotor 206. The cavities 274 are in fluid communication with the flow channels 271 through a plurality of apertures 267 which extend transversely through the mixing rotor 206. During mixing, a stream flowing axially through a first cavity 274 turns radially inward and enters the flow channel 271 through the apertures 267, as shown by arrow 268. The stream then flows axially and then turns radially outward, and enters a second cavity 274 located downstream of the first cavity 274 through the apertures 267, as shown by arrow 269. The process is then repeated.

The valve stem 205 may be at least partially disposed within the void 260 of the mixing rotor 206 and may further define a plurality of cavities or flow channels 271 within the void 260 that make up a portion of the polymer processing space 203, i.e. a stream flows through the cavities of flow channels 271 during extrusion. As shown in FIG. 26, the outer surface of the valve stem 205 may define a plurality of flow channels extending circumferentially with respect to the rotational axis 221. The flow channels 271 are separated by outwardly extending rings 273 formed by the outer surface of the annular member 272. The mixing rotor 206 may further have a plurality of annular rows of axially extending cavities 274 formed by the outer surface of the mixing rotor 206 and disposed circumferentially around the rotational axis 221. The rows are separated by outwardly extending rings 266 formed by the outer surface of the mixing rotor 206. The cavities 274 are in fluid communication with the flow channels 271 through a plurality of apertures 267, which extend transversely through the mixing rotor 206. During mixing, a stream flowing axially through a first cavity 274 turns radially inward and enters the flow channel 271 through the apertures 267, as shown by arrow 268. The stream then flows axially and then turns radially outward. It then enters a second cavity 274 located downstream of the first cavity 274 through the apertures 267, as shown by arrow 269. The process is then repeated.

Figure 27B:
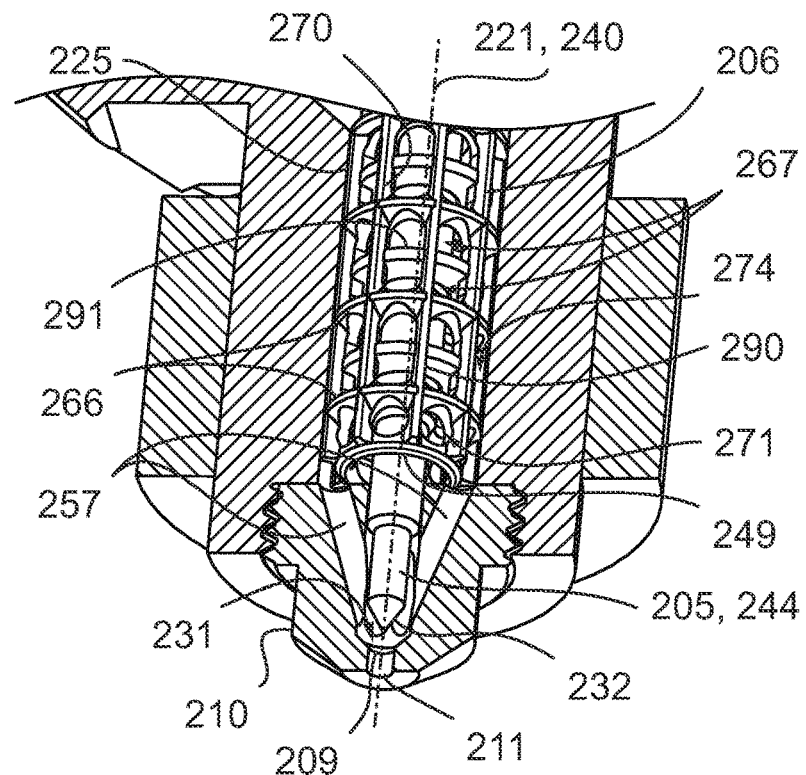
FIG. 27B shows an isometric partial sectional view of the exemplary embodiment of an extruder shown in FIG. 27A.

In embodiments, the inwardly facing surface 248 of the mixing rotor 206 may face the outer surface of the valve stem 205 and the outer surface of the mixing rotor 206 may face the inner surface 225, as shown in FIGS. 27A and 27B. There may further be a plurality of circumferentially extending flow channels 292 formed between the valve stem 205 and the mixing rotor 206 separated by inwardly extending annular portions 291 of the mixing rotor. There may further be a plurality of annular rows of axially and circumferentially extending cavities 274 formed by the outer surface of the mixing rotor 206. The cavities 274 are disposed circumferentially around the rotational axis 221. The cavities 274 are in the row separated by outwardly extending generally longitudinal mixing elements 270 (best shown in FIG. 27B). The rows are separated by outwardly extending annular portions 266 formed by the outer surface of the mixing rotor 206. The cavities 274 may be in fluid communication with the flow channels 292 through a plurality of apertures 267 which extend transversely through the mixing rotor 206. During mixing, a stream flowing axially through a first flow channel 292 turns radially outward and enters one or more cavities 274 through the apertures 267, as shown by arrow 268. The stream then flows axially and then turns radially inward and enters a second flow channel 292 located downstream of the first channel, as shown by arrow 269 (best shown in FIG. 27A). The process is then repeated.

The movable member of the control valve may comprise the mixing rotor 206 (best shown in FIGS. 34 and 35). In addition to being mounted for rotation about the rotational axis 221, the mixing rotor 206 may be mounted for linear movement along its rotational axis 221 between a first position and a second position along the rotational axis 221. In embodiments where the mixing rotor 206 is partially disposed in the through hole 246 of the screw 204, the mixing rotor 206 may be slidably mounted in the through hole 246 of the screw 204 for the linear movement, as shown in FIG. 35. The mixing rotor 206 may comprise a portion disposed within the void or through hole 250. The mixing rotor 206 may be further mounted for linear movement along the rotational axis 221 and through the void or through hole 250. The mixing rotor 206 may be operably connected to the valve tip 234, defining the sealing surface 232. It may be further configured to move the valve tip 234 along the rotational axis 221. For example, the proximal end 249 of the mixing rotor 206 may touchingly engage the valve tip 234 to push it along the rotational axis 221 against the spring 235, engaging the valve tip 234 (best shown in FIG. 34).

In one set of embodiments, the mixing rotor 206 is moved along the rotational axis 221 by the motor 215. In this set of embodiments, the extruder may comprise an actuation mechanism configured to transfer the rotational power to the mixing rotor 206 when the motor 215 rotates in a first direction. It may be further configured to convert the rotational power of the motor 215 into the linear movement of the mixing rotor 206 when the motor 215 rotates in a second direction opposite to the first. The actuation mechanism may include the motor 215 and a coupling of the motor 215 to the mixing rotor 206. The coupling, in turn, may comprise an annular member 253 disposed over a portion of the mixing rotor 206 and having a threaded inner surface. The respective portion having a threaded outer surface may be engaged with the threaded inner surface of the annular member 253 providing a threaded coupling. It also may include a screw member disposed in a hole formed in the mixing rotor 206 coaxially with the rotational axis 221. The hole may have a threaded inner surface engaged with the threaded outer surface of the screw member to provide a threaded coupling. The actuation mechanism may comprise an additional member 252 configured to prevent the rotation of the mixing rotor 206 when the motor 215 rotates in the second direction. This would force the mixing rotor 206 to slide in the coupling and linearly move along the rotational axis 221. The additional member 252 may be a drawn cup clutch having its inner surface engaged with the outer surface of the mixing rotor 206. It may further have its outer surface mounted slidably along the rotational axis 221 with restriction of rotation about the rotational axis 221 in at least the second direction. When the control valve is to close, the motor 215 may rotate in the second direction, stopping the rotation about the rotational axis 221 and moving the mixing rotor 206 to the second position along the rotational axis 221. When the control valve is to open, the motor 215 may rotate in the first direction, at first pulling the mixing rotor 206 along the rotational axis 221 to its first position (possibly simultaneously with the rotational movement of the mixing rotor 206 about the rotational axis 221) and then continuing the rotation about the rotational axis 221. The mixing rotor 206 may be at first pulled by the motor 215 rotating in the first direction until the mixing rotor 206 reaches the end of the threaded coupling or a limiting element 251. The limiting element 251 may be defined by a surface or edge of the shaft of the motor 215, as shown in FIG. 34. Alternatively, or in addition, the limiting element 251 may be defined by a surface or an edge of the annular member 253. This may be done so that the surface or the edge limits the linear movement of the mixing rotor 206 from the second position past the first position along the rotational axis 221. In general, the limiting element 251 may be any element restricting the linear movement of the mixing rotor 206 along the rotational axis 221 from the second position past its first position. The limiting element 251 may be actuated by an additional actuator (not shown) to adjust the state of the control valve in the first position of the mixing rotor 206. Examples of the additional actuator include a linear actuator and a rotary actuator. The additional actuator may be an electric actuator powered by a motor or solenoid, a piezoelectric actuator, a magnetic actuator, a pneumatic actuator, a hydraulic actuator, and combinations thereof.

The additional actuator may be a linear actuator configured to vary the linear position of a rod along the rotational axis 221. The rod may be operably coupled to the additional actuator and mounted for movement along the rotational axis 221. This may further define a surface or an edge engaging the distal end 254 of the mixing rotor 206. The limiting element 251 may be defined by a disposable member to adjust the state of the control valve in the first position of the mixing rotor 206. In embodiments where the motor 215 comprises a shaft, the liming element 251 may be defined by a spacer mounted between the distal end 254 of the mixing rotor 206 and the proximal end of the shaft of the motor 215.

In another set of embodiments, the mixing rotor 206 is rotated about the rotational axis 221 by the motor 215 through a first coupling. It is also moved along its rotational axis 221 by the actuator 216 through a second coupling. The first coupling may comprise an annular member 256 operably coupled to the motor 215. The annular member 256 may have grooves or ridges formed by its inner surface. The annular member may be disposed over a portion of the mixing rotor 206 having ridges or grooves formed by its outer surface and engaged with the grooves or ridges respectively of the annular member 256. As another example, the coupling may comprise a shaft operably coupled to the motor 215 and having grooves or ridges formed by its outer surface. The shaft may be disposed in a hole formed in the mixing rotor 206 coaxially with the rotational axis 221. The hole may have suitable ridges or grooves formed on its inner surface and engaged with grooves or ridges of the shaft. As yet another example, the mixing rotor 206 may have a portion having a smooth outer surface engaging the inner surface of an annular member 256, such as a drawn cup clutch. The annular member 256 may be operably coupled to the motor 215 and configured to transfer the rotational power from the motor 215 to the mixing rotor 206 when rotated in a first direction about the rotational axis 221. It may disengage the mixing rotor 206 to allow its movement along the rotational axis 221 when rotated in a second direction opposite to the first direction.

In embodiments, the actuator 216 may be a linear actuator operably coupled to the mixing rotor 206 through a coupling capable of imparting the linear movement along the rotational axis 221 to the mixing rotor 206 in both directions. Alternatively, the actuator 216 may be a linear actuator operably coupled to the mixing rotor 206 through a coupling capable of imparting the linear movement along the rotational axis 221 to the mixing rotor 206 only in one direction. The mixing rotor 206 may be mounted for movement along the rotational axis 221 against a spring in a direction from the first position toward the second position. The distal end 254 of the mixing rotor 206 may further be in contact (defining a second coupling) with a member linearly moved along the rotational axis 221 by the actuator 216. The actuator 216 is configured to move the mixing rotor 206 towards the second position by pushing it with the member through the second coupling. The actuator may also be configured to move the mixing rotor 206 along the rotational axis 221 towards the first position by releasing the pressure in the second coupling. The rotation of the mixing rotor 206 may be stopped during its positioning along the rotational axis 221 to relax the first coupling. This may be done so that the mixing rotor 206 may be moved along the rotational axis 221 by the actuator 216 through the second coupling. After the positioning is finished, the rotation may be continued. While in the fully closed state of the control valve, the rotation of the mixing rotor 206 may be stopped and continued after opening the control valve.

Figure 28B:
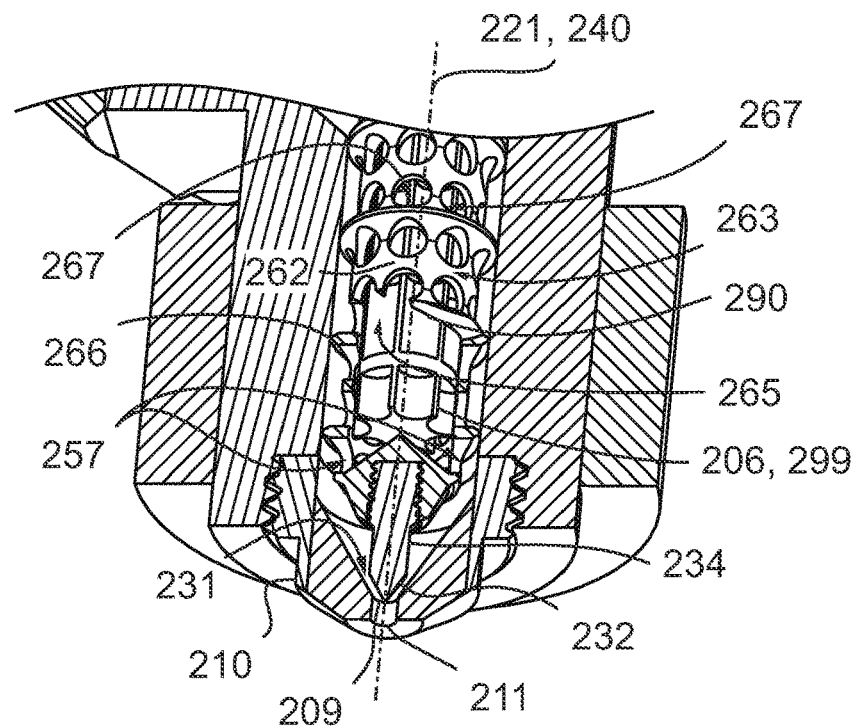
FIG. 28B shows an isometric partial sectional view of the exemplary embodiment of an extruder shown in FIG. 28A.
Figure 28A:
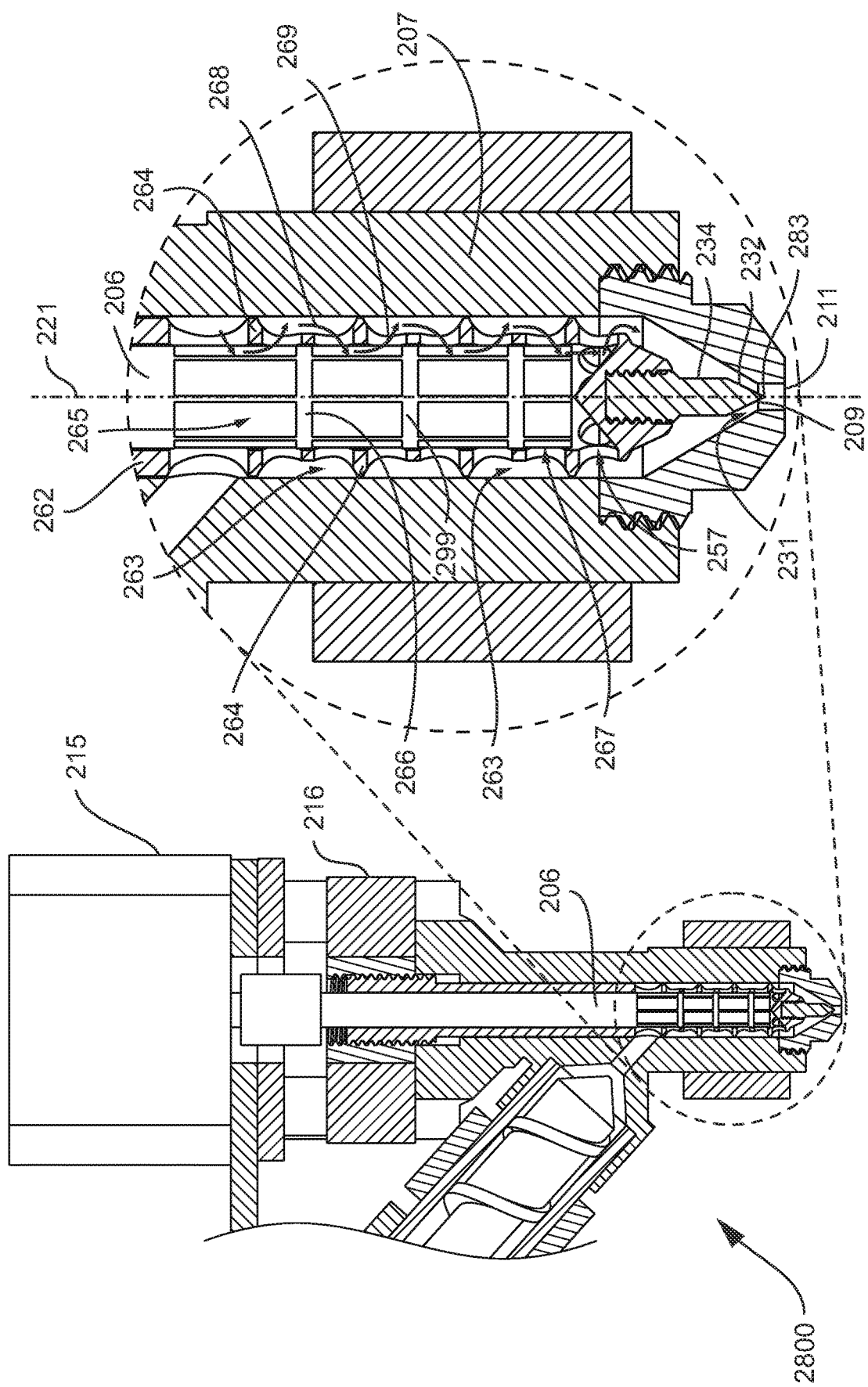
FIG. 28A shows a lateral partial sectional view of an exemplary embodiment of an extruder comprising a mixing rotor and a stator used as a movable member of a control valve.

The movable member may comprise the stator 262 (best shown in FIGS. 28A and 28B). The stator 262 may be mounted for linear movement along the rotational axis 221 between a first position and a second position along the rotational axis 221 by the actuator 216. The stator 262 may be operably connected to the valve tip 234 defining the sealing surface 232 and further configured to move the valve tip 234 along the rotational axis 221. For example, the valve tip 234 may be rigidly connected to the stator 262 as shown in FIGS. 28A and 28B. As another example, the stator 262 may touchingly engage the valve tip 234 to push it against the spring 235 engaging the valve tip 234.

The control valve may be used to adjust the pressure in the polymer processing space 203 and particularly adjust the pressure in the mixing cavity 208. When an extruder of the present invention is employed for extrusion of a polymeric foam form a feedstock material which, in turn, comprises a foaming agent that is thermally expandable microspheres, the control valve may be configured to reduce the size of the flow passage 231. This may be done such that the pressure in the mixing cavity 208 is increased to a level where the microspheres may be admixed at a temperature sufficiently high for mixing and without excessive expansion of the microspheres. In other words, the temperature may need to be at or above temperature where the melt of the base polymer has sufficiently low viscosity for efficient dynamic mixing by the rotating mixing rotor 206. As another example, the control valve may be used to control the density of the extruded polymeric foam by adjusting the pressure in the mixing cavity 208 thereby adjusting the degree of expansion of the microspheres in the extruded polymeric foam. As yet another example, when the feedstock material includes a foaming agent that is a chemical blowing agent, the control valve may be used to increase the solubility of the decomposition products of the chemical blowing agent in the melt of the base polymer by increasing the pressure in the mixing cavity 208.

The extruder of the present invention may have one or more pressure sensors (not shown) connected to the control system of a 3D printing system described in connection with FIG. 1. These one or more pressure sensors may be configured to measure the pressure within the polymer processing space 203 of the extruder. Readings from the pressure sensors may be used by the control system to adjust the mass flow rate of the stream of the granules. This may be done by adjusting the rotational speed of the motor 214, to level off pressure fluctuations within the polymer processing space 203. Pressure fluctuations may naturally arise from non-uniformity of granule sizes, non-uniformity of concentrations of the foaming agents in foaming granules, fluctuations of the contact pressure during the 3D printing process, etc. Alternatively, or in addition, readings from the pressure sensors may be used by the control system to further level off pressure fluctuations by adjusting the position of the control valve.

The extruder of the present invention may further include one or more inlets 295 fluidly coupled to the polymer processing space 203. Inlets 295 may be configured to receive one or more additional raw materials in gaseous, fluid or supercritical form. As shown in FIG. 29, the extruder may comprise the inlet 295 (schematically depicted) formed in the mixing chamber 207 configured to receive the additional raw material from a source 297 (schematically depicted) in fluid communication with the inlet 295 through a passageway 296 (schematically depicted). As shown in FIG. 29, a pressure and metering device 298 (schematically depicted) may be provided between the inlet 295 and the source 297 to feed the additional raw material into the polymer processing space 203. Alternatively, the pressure and metering device 298 may be located upstream the source 297. In general, one or more inlets 295 can be located at any of a variety of locations along the polymer processing space 203. In embodiments, the inlets 295 may be located along the mixing cavity 208. The pressure and metering device 298 may be connected to the control system of a 3D printing system described in connection with FIG. 1 to control the feed rate of the additional raw material in relation to the feed rate of the feedstock material. If the additional raw material contains a colorant, the feed rate of the pressure and metering device 298 may be controlled by the control system of the 3D printing system to vary the color intensity of the extruded polymeric material.

It is contemplated that any embodiment discussed in this specification can be implemented with respect to any system of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the aspects.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no aspects included in the documents are incorporated by reference herein, and any definitions provided in the documents are not incorporated by reference herein unless expressly included herein.

References to items in the singular should be understood to include items in the plural, and vice versa, unless explicitly stated otherwise or clear from the text. The use of the term "or" in the aspects is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and aspect(s), the words "comprising" (and any form of comprising, such as "comprise" and "comprises"), "having" (and any form of having, such as "have" and "has"), "including" (and any form of including, such as "includes" and "include"), "containing" (and any form of containing, such as "contains" and "contain") or "constituting" (and any form of constituting, such as "constitutes" and "constitute") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(s), method/process steps or limitation(s)) only.

The term "and combinations thereof" as used herein refers to all permutations and combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

The words "about," "approximately" or the like, when accompanying a numerical value, are to be construed as indicating a deviation as would be appreciated by one of ordinary skill in the art to operate satisfactorily for an intended purpose. In general, but subject to the preceding discussion, a numerical value herein that is modified by a word of approximation such as "about" may vary from the stated value by at least ±1, 2, 3, 4, 5, 6, 7, 10, 12, 15, 20 or 25%. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose or the like.

The term "transverse" and its derivatives are used herein with respect to some direction or object to refer to intersecting said direction or object not necessarily at a right angle.

In this document, the terms "mounted for linear movement", "mounted for rotation", "mounted for movement along an axis" or the like, as used herein with respect to some object should be understood without precluding the possibility of movement of the object in other ways.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended aspects.

What is claimed is:

1. An extruder for 3D printing comprising:
   a. a mixing cavity fluidly connected to an inlet and an outlet of the extruder;
   b. a mixing rotor mounted for rotation about a rotational axis by a motor, the mixing rotor extending between a proximal end and a distal end thereof along the rotational axis, the mixing rotor further comprising a mixing portion disposed within the mixing cavity and configured to mix at least one polymeric stream received in the mixing cavity, the mixing rotor further comprising a void extending between the proximal end and the distal end along the rotational axis;
   c. a control valve comprising a seat and a valve stem, the valve stem is mounted for a linear movement along the rotational axis and through the void by an actuator operably connected to the valve stem, wherein the control valve is configured to vary the form of a flow passage thereof with the linear movement of the valve stem;
   d. a pressure generating mechanism comprising at least one pressure generating rotary member and configured to advance the polymeric stream in a downstream direction from the inlet into the mixing cavity and further through the flow passage of the control valve towards the outlet of the extruder.

2. The extruder of claim 1, wherein the valve stem defines a sealing surface of the control valve such that the flow passage of the control valve is defined between the sealing surface and the seat.

3. The extruder of claim 1, wherein the control valve comprises a valve tip defining a sealing surface of the control valve, the valve tip operably connected to the valve stem and mounted for movement relative to the seat such that a pose of the valve tip relative to the seat is varied with the position of the valve stem along the rotational axis.

4. The extruder of claim 1, wherein the linear movement of the valve stem is between a first distal position and a second proximal position along the rotational axis.

5. The extruder of claim 4, wherein while in the second position, a portion of the valve stem protrudes from the proximal end of the mixing rotor.

6. The extruder of claim 1, wherein the mixing rotor is configured for rotation separate of that of the at least one pressure generating rotary member of the pressure generating mechanism.

7. The extruder of claim 1, wherein the pressure generating mechanism is selected from a group consisting of: a single-screw extrusion mechanism, a twin-screw extrusion mechanism, a tri-screw extrusion mechanism, a disk extrusion mechanism, a vane extrusion mechanism, a progressive cavity extrusion mechanism, a ram extrusion mechanism, and a filament drive mechanism.

8. An extruder for 3D printing, comprising:
   a. a screw cavity fluidly connected to an inlet of the extruder, the inlet configured to receive raw materials in the form of granules, and a mixing cavity fluidly connected to the screw cavity and to an outlet of the extruder;
   b. a screw mounted for rotation by a screw motor about the first rotational axis, the screw comprising a portion extending along the first rotational axis and disposed within the screw cavity, the screw further comprising a through hole extending through the screw along the first rotational axis, and
   c. a mixing rotor mounted for rotation by a mixer motor about a second rotational axis, the mixing rotor extending between a proximal end and a distal end thereof along the second rotational axis, the mixing rotor comprising a mixing portion disposed within the mixing cavity, the mixing rotor further comprising an inner portion disposed within the through hole of the screw, the inner portion of the mixing rotor configured to transfer the rotational power from the mixer motor to the mixing portion, the mixing portion configured to rotate about the second rotational axis and mix a polymeric stream within the mixing cavity;
   wherein rotation of the screw causes positive displacement conveying of the granules within the screw cavity in a downstream direction toward the mixing cavity, thereby establishing the polymeric stream in the mixing cavity in a downstream direction along the second rotational axis and further toward the outlet of the extruder.

9. The extruder of claim 8, wherein the surface of the screw cavity comprises at least one groove extending along the first rotational axis.

10. The extruder of claim 8, wherein the screw comprises a stator portion extending along the first rotational axis over the mixing portion, the stator portion defining a mixing void extending along the first rotational axis, the mixing portion at least partially disposed within the mixing void.

11. The extruder of claim 8, wherein the mixing rotor further comprises a void extending between the proximal end and the distal end along the second rotational axis.

12. The extruder of claim 11, further comprising a control valve comprising a valve stem, the valve stem is mounted for a linear movement along the second rotational axis and through the void by an actuator operably connected to the valve stem, wherein the form of a flow passage of the control valve varies with the linear movement of the valve stem, the flow passage located downstream of the mixing cavity and upstream of the outlet.

13. The extruder of claim 8, wherein the through hole is formed coaxially with respect to the first rotational axis.

14. The extruder of claim 13, wherein the second rotational axis coincides with the first rotational axis.

15. The extruder of claim 8, further comprising a control valve comprising the mixing rotor, the mixing rotor mounted for a linear movement along the second rotational axis, wherein the control valve is configured to vary the form of a flow passage thereof with the linear movement of the mixing rotor.

16. The extruder of claim 8, further comprising a control valve comprising the stator, the stator mounted for linear movement along the second rotational axis, wherein the control valve is configured to vary the form of a flow passage thereof with the linear movement of the mixing rotor.

17. The extruder of claim 8, wherein during operation of the extruder, a rotation of the mixing rotor driven by the mixer motor occurs separately from, and at a higher rotational speed than a rotation of the screw driven by the screw motor.

18. An extruder for 3D printing comprising:
  a. a mixing cavity fluidly connected to an inlet and an outlet of the extruder;
  b. a mixing rotor mounted for rotation about a rotational axis by a motor, the mixing rotor extending between a proximal end and a distal end thereof along the rotational axis, the mixing rotor further comprising a mixing portion disposed within the mixing cavity and configured to mix at least one polymeric stream received in the mixing cavity, the mixing rotor further comprising a void extending between the proximal end and the distal end along the rotational axis;
  c. a control valve comprising a valve stem, the valve stem comprising a portion disposed within the void and extending along a valve stem axis parallel to the rotational axis, the valve stem mounted for rotation about the valve stem axis by an actuator operably connected to the valve stem, wherein the control valve is configured to vary the form of a flow passage thereof with the rotation of the valve stem;
  d. a pressure generating mechanism comprising at least one pressure generating rotary member and configured to advance the polymeric stream in a downstream direction from the inlet into the mixing cavity and further through the flow passage of the control valve towards the outlet of the extruder.

19. The extruder of claim 18, wherein the control valve comprises a valve tip defining a sealing surface of the control valve, the valve tip operably connected to the valve stem and mounted for movement relative to the seat such that a pose of the valve tip relative to the seat is varied with rotation of the valve stem about the valve stem axis.

20. The extruder of claim 8, wherein the mixing rotor has a balanced configuration that exerts substantially equal pressure in the downstream and upstream directions along the second rotational axis with the rotation of the mixing rotor.

21. The extruder for 3D printing, as in claim 7, wherein the mixing rotor is configured for faster rotation than that of the at least one pressure generating rotary member of the pressure generating mechanism, and the pressure-generating rotary member is selected from the group consisting of: a screw of a single-screw extrusion mechanism, two screws of a twin-screw extrusion mechanism, three screws of a tri-screw extrusion mechanism, a scroll of a scroll extrusion mechanism, a barrel of the scroll extrusion mechanism, a sun screw of a planetary extrusion mechanism, a planetary rotor of a planetary extrusion mechanism, a rotor of a vane extrusion mechanism, a rotor of a single-rotor progressive cavity extrusion mechanism, two rotors of a twin-rotor progressive cavity extrusion mechanism, and three rotors of a tri-rotor progressive cavity extrusion mechanism.

* * * * *